(12) United States Patent
Fukada

(10) Patent No.: US 7,515,770 B2
(45) Date of Patent: Apr. 7, 2009

(54) INFORMATION PROCESSING METHOD AND APPARATUS

(75) Inventor: Toshiaki Fukada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 986 days.

(21) Appl. No.: 10/982,382

(22) Filed: Nov. 5, 2004

(65) Prior Publication Data

US 2005/0102139 A1   May 12, 2005

(30) Foreign Application Priority Data

Nov. 11, 2003   (JP) .............................. 2003-381637

(51) Int. Cl.
G06K 9/36 (2006.01)
G06K 9/62 (2006.01)
G10L 15/26 (2006.01)

(52) U.S. Cl. .................. 382/284; 382/209; 704/235

(58) Field of Classification Search ............... 382/100, 382/181, 209, 218, 284, 254; 348/515; 704/235, 704/E21.02
See application file for complete search history.

(56) References Cited

U.S. PATENT DOCUMENTS

| | | | |
|---|---|---|---|
| 5,880,788 A * | 3/1999 | Bregler | 348/515 |
| 6,307,550 B1 * | 10/2001 | Chen et al. | 345/418 |
| 6,330,023 B1 * | 12/2001 | Chen | 348/14.13 |
| 6,970,185 B2 * | 11/2005 | Halverson | 348/207.1 |
| 7,076,429 B2 * | 7/2006 | Basson et al. | 704/272 |
| 2002/0093591 A1 * | 7/2002 | Gong et al. | 348/515 |

* cited by examiner

*Primary Examiner*—Daniel G Mariam
(74) *Attorney, Agent, or Firm*—Canon U.S.A. Inc., I.P. Division

(57) ABSTRACT

In order to associate image data with speech data, a character detection unit detects a text region from the image data, and a character recognition unit recognizes a character from the text region. A speech detection unit detects a speech period from speech data, and a speech recognition unit recognizes speech from the speech period. An image-and-speech associating unit associates the character with the speech by performing at least character string matching or phonetic string matching between the recognized character and speech. Therefore, a portion of the image data and a portion of the speech data can be associated with each other.

23 Claims, 55 Drawing Sheets

FIG. 6A

| | RECOGNIZED CHARACTER | COORDINATE DATA |
|---|---|---|
| character 1 → | 春 | $(x_1, y_1)$ |
| character 2 → | 夏 | $(x_2, y_2)$ |
| character 3 → | 秋 | $(x_3, y_3)$ |
| character 4 → | 冬 | $(x_4, y_4)$ |

FIG. 6B

| | RECOGNIZED SPEECH | TIME DATA |
|---|---|---|
| character 4 → | 冬 (fuyu) | $(s_1, e_1)$ |
| character 1 → | 春 (haru) | $(s_2, e_2)$ |
| character 3 → | 秋 (aki) | $(s_3, e_3)$ |
| character 2 → | 夏 (natsu) | $(s_4, e_4)$ |

FIG. 11A

| CANDIDATE PHONETIC STRING | | COORDINATE DATA |
|---|---|---|
| haru | shun | $(x_1, y_1)$ |
| natsu | ka | $(x_2, y_2)$ |
| aki | shuu | $(x_3, y_3)$ |
| fuyu | tou | $(x_4, y_4)$ |

FIG. 11B

| CANDIDATE PHONETIC STRING | TIME DATA |
|---|---|
| fuyu | $(s_1, e_1)$ |
| haru | $(s_2, e_2)$ |
| aki | $(s_3, e_3)$ |
| natsu | $(s_4, e_4)$ |

FIG. 13A

| CANDIDATE CHARACTER | COORDINATE DATA |
|---|---|
| character 1 → 春 | $(x_1, y_1)$ |
| character 2 → 夏 | $(x_2, y_2)$ |
| character 3 → 秋 | $(x_3, y_3)$ |
| character 4 → 冬 | $(x_4, y_4)$ |

FIG.13B

| CANDIDATE CHARACTER | | | TIME DATA |
|---|---|---|---|
| character 4 → 冬 | 不輸 | — | $(s_1, e_1)$ |
| character 1 → 春 | 張る | 貼る | $(s_2, e_2)$ |
| 空 | 飽き | 秋 ← character 3 | $(s_3, e_3)$ |
| character 2 → 夏 | 奈津 | 捺 | $(s_4, e_4)$ |

FIG. 14A

| | CANDIDATE CHARACTER | | |
|---|---|---|---|
| n/i | 1 | 2 | 3 |
| 1 | 春 (0.7) | 香 (0.2) | 空 (0.1) |
| 2 | 科 (0.5) | 秋 (0.3) | 和 (0.2) |
| 3 | 夏 (0.6) | 真 (0.3) | 厚 (0.1) |
| 4 | 各 (0.5) | 冬 (0.3) | 尽 (0.2) | character 1
character 2
character 3
character 4
character 5

FIG. 14B

| | CANDIDATE SPEECH | | |
|---|---|---|---|
| m/j | 1 | 2 | 3 |
| 1 | fuyu (冬) (0.5) | furu (古) (0.4) | tsuyu (露) (0.1) |
| 2 | haru (春) (0.7) | taru (樽) (0.2) | haku (白) (0.1) |
| 3 | aki (秋) (0.6) | ashi (足) (0.2) | maki (薪) (0.2) |
| 4 | matsu (松) (0.8) | tsu (津) (0.1) | natsu (夏) (0.1) |

FIG. 15A

| CANDIDATE CHARACTER | | | |
|---|---|---|---|
| n/i | 1 | 2 | 3 |
| 1 | haru (0.7)<br>shun (0.7) | ka (0.2)<br>kou (0.2) | sora (0.1)<br>aki (0.1)<br>kuu (0.1) |
| 2 | ka (0.5)<br>shina (0.5) | aki (0.3)<br>shuu (0.3) | wa (0.2)<br>nago (0.2) |
| 3 | natsu (0.6)<br>ka (0.6) | shin (0.3)<br>ma (0.3) | kou (0.1)<br>atsu (0.1) |
| 4 | kaku (0.5)<br>ono (0.5) | *fuyu (0.3)*<br>tou (0.3) | jin (0.2)<br>*tsu (0.2)* |

FIG. 15B

| CANDIDATE SPEECH | | | |
|---|---|---|---|
| m/j | 1 | 2 | 3 |
| 1 | *fuyu (0.5)* | furu (0.4) | tsuyu (0.1) |
| 2 | haru (0.7) | taru (0.2) | haku (0.1) |
| 3 | aki (0.6) | ashi (0.2) | maki (0.2) |
| 4 | matsu (0.8) | *tsu (0.1)* | natsu (0.1) |

FIG. 16A character 1 → (points to 春 in row 1, column 1)

| n/i | CANDIDATE CHARACTER | | |
|---|---|---|---|
| | 1 | 2 | 3 |
| 1 | 春 (0.7) | 香 (0.2) | 空 (0.1) |
| 2 | 科 (0.5) | 秋 (0.3) | 和 (0.2) |
| 3 | 夏 (0.6) | 真 (0.3) | 厚 (0.1) |
| 4 | 各 (0.5) | 冬 (0.3) | 尽 (0.2) |

FIG. 16B

| m/j | CANDIDATE SPEECH | | |
|---|---|---|---|
| | 1 | 2 | 3 |
| 1 | 冬 (0.5)<br>不輸 (0.5) | 古 (0.4)<br>振る (0.4)<br>降る (0.4) | 露 (0.1)<br>梅雨 (0.1)<br>汁 (0.1) |
| 2 | 春 (0.7)<br>張る (0.7)<br>貼る (0.7) | 樽 (0.2)<br>足る (0.2) | 白 (0.1)<br>吐く (0.1)<br>履く (0.1) |
| 3 | 空 (0.6)<br>飽き (0.6)<br>秋 (0.6) | 足 (0.2)<br>脚 (0.2)<br>芦 (0.2) | 薪 (0.2)<br>巻き (0.2)<br>真希 (0.2) |
| 4 | 松 (0.8)<br>末 (0.8)<br>待つ (0.8) | 津 (0.1) | 夏 (0.1)<br>奈津 (0.1)<br>捺 (0.1) | character 1 → 春 (0.7) in row 2, column 1
character 5 → 空 (0.6) in row 3, column 1

FIG. 25

| RECOGNIZED CHARACTER | FONT INFORMATION | | | | | COORDINATE DATA |
|---|---|---|---|---|---|---|
| | SIZE | TYPE | COLOR | ITALIC | UNDERLINING | |
| character 1 → 春 | 24 | Gothic | Black | N | N | (x₁, y₁) |
| character 2 → 夏 | 44 | Gothic | Black | Y | Y | (x₂, y₂) |
| character 3 → 秋 | 36 | Mincho | Red | N | N | (x₃, y₃) |
| character 4 → 冬 | 12 | Gothic | Black | N | N | (x₄, y₄) |

/we present this study, entitled use of statistical language models for speech and character recognition/

/the purpose of this study is to improve the speech recognition performance and the character recognition performance/

/in the past studies.../

/in this study, therefore, we discuss the use of statistical language models/

| DIVIDED STILL IMAGE (AREA ID) | COORDINATE DATA |
|---|---|
| 1 | $(x_{R11}, y_{R11}, x_{R12}, y_{R12})$ |
| 2 | $(x_{R21}, y_{R21}, x_{R22}, y_{R22})$ |
| 3 | $(x_{R31}, y_{R31}, x_{R32}, y_{R32})$ |
| 4 | $(x_{R41}, y_{R41}, x_{R42}, y_{R42})$ |
| 5 | $(x_{R51}, y_{R51}, x_{R52}, y_{R52})$ |

FIG. 37A

| RECOGNIZED TEXT | COORDINATE DATA |
|---|---|
| Use of Statistical Language Models for Speech and character Recognition | $(x_{11}, y_{11}, x_{12}, y_{12})$ |
| Purpose | $(x_{21}, y_{21}, x_{22}, y_{22})$ |
| Improvement in Speech Recognition Performance | $(x_{31}, y_{31}, x_{32}, y_{32})$ |
| Improvement in Character Recognition Performance | $(x_{41}, y_{41}, x_{42}, y_{42})$ |
| Proposed Method | $(x_{51}, y_{51}, x_{52}, y_{52})$ |
| ... | ... |

FIG. 37B

| RECOGNIZED SPEECH | TIME DATA |
|---|---|
| use of statistical language models for speech and character recognition | $(s_1, e_1)$ |
| improvement in speech recognition performance | $(s_2, e_2)$ |
| improvement in character recognition performance | $(s_3, e_3)$ |
| ... | ... |

FIG. 41A

| RECOGNIZED TEXT | COORDINATE DATA |
|---|---|
| Use of Statistical Language Models for Speech and character Recognition | $(x_{11}, y_{11}, x_{12}, y_{12})$ |
| Purpose | $(x_{21}, y_{21}, x_{22}, y_{22})$ |
| Improvement in Speech Recognition Performance | $(x_{31}, y_{31}, x_{32}, y_{32})$ |
| Improvement in Character Recognition Performance | $(x_{41}, y_{41}, x_{42}, y_{42})$ |
| Proposed Method | $(x_{51}, y_{51}, x_{52}, y_{52})$ |
| ... | ... |

FIG. 41B

| RECOGNIZED SPEECH | TIME DATA |
|---|---|
| we present this study... | $(s_1, e_1)$ |
| the purpose of this study is to... | $(s_2, e_2)$ |
| in the past studies, ... | $(s_3, e_3)$ |
| in this study, therefore, we discuss... | $(s_4, e_4)$ |
| ... | ... |

FIG. 42

| RECOGNIZED SPEECH | TIME DATA |
|---|---|
| * speech recognition * character recognition * statistical language model * | $(s_1, e_1)$ |
| * purposes * speech recognition * character recognition * | $(s_2, e_2)$ |
| NO_RESULTS | $(s_3, e_3)$ |
| * statistical language model * | $(s_4, e_4)$ |
| ... | ... |

FIG. 47

| STILL IMAGE | SPEECH | | |
|---|---|---|---|
| | FIRST CANDIDATE | SECOND CANDIDATE | THIRD CANDIDATE |
| I1 | S2 | S31 | NULL |
| I2 | S3 | S31 | S321 |
| I3 | S4 | S41 | S42 |
| I4 | S3 | S321 | S31 |
| I5 | S1 | S11 | S12 |
| I21 | S31 | NULL | NULL |
| I22 | S3 | S2 | S42 |
| I31 | S12 | S1 | S2 |
| I32 | S322 | S321 | NULL |
| I33 | NULL | NULL | NULL |
| ... | ... | ... | ... |

FIG.52A

| CONVERTED CONCEPT (RECOGNIZED CHARACTER) | COORDINATE DATA |
|---|---|
| $SPRING (春) | $(x_1, y_1)$ |
| $SUMMER (夏) | $(x_2, y_2)$ |
| $AUTUMN (秋) | $(x_3, y_3)$ |
| $WINTER (冬) | $(x_4, y_4)$ | character 1
character 2
character 3
character 4

FIG.52B

| CONVERTED CONCEPT (RECOGNIZED SPEECH) | TIME DATA |
|---|---|
| $WINTER (With the...) | $(s_1, e_1)$ |
| $SPRING (it is an entrance ceremony...) | $(s_2, e_2)$ |
| $AUTUMN (viewing colored leaves...) | $(s_3, e_3)$ |
| $SUMMER (it becomes hotter...) | $(s_4, e_4)$ |

| RECOGNIZED OBJECT | COORDINATE DATA |
|---|---|
| RECTANGLE, BLACK | $(x_{11}, y_{11}, x_{12}, y_{12})$ |
| SQUARE, WHITE | $(x_{21}, y_{21}, x_{22}, y_{22})$ |
| BAR GRAPH, GRAY | $(x_{31}, y_{31}, x_{32}, y_{32})$ |
| CIRCLE, WHITE | $(x_{41}, y_{41}, x_{42}, y_{42})$ |

FIG. 58A

| RECOGNIZED USER | COORDINATE DATA |
|---|---|
| ADULT, MALE | $(x_{11}, y_{11}, x_{12}, y_{12})$ |
| OLDER ADULT, MALE | $(x_{21}, y_{21}, x_{22}, y_{22})$ |
| ADULT, FEMALE | $(x_{31}, y_{31}, x_{32}, y_{32})$ |
| CHILD, FEMALE | $(x_{41}, y_{41}, x_{42}, y_{42})$ |

FIG. 58B

| RECOGNIZED SPEAKER | TIME DATA |
|---|---|
| OLDER ADULT, MALE | $(s_1, e_1)$ |
| CHILD, FEMALE | $(s_2, e_2)$ |
| ADULT, MALE | $(s_3, e_3)$ |
| ADULT, FEMALE | $(s_4, e_4)$ |

INFORMATION PROCESSING METHOD AND APPARATUS

BACKGROUND OF THE INVENTION

1. Field of the Invention

The present invention relates to an information processing method and apparatus for associating image data and audio data.

2. Description of the Related Art

Recently, technologies for associating image data and audio data, e.g., taking a still image using a digital camera and recording comments, etc., for the taken still image using an audio memo function, have been developed. For example, a standard format for digital camera image files, called Exif (EXchangeable Image File Format), allows audio data to be associated as additional information into one still image file. The audio data associated with a still image is not merely appended to the still image, but can be recognized and converted into text information by speech recognition, so that a search for a desired still image can be performed for a plurality of still images using text or audio as a key.

Digital cameras having a voice recorder function or voice recorders having a digital camera function are capable of recording a maximum of several hours of audio data.

In the related art, although one or a plurality of audio data can only be associated with the entirety of a single still image, a particular portion of a single still image cannot be associated with a corresponding portion of audio data. The present inventor has not found a technique for associating a portion of a still image taken by a digital camera with a portion of audio data recorded by a voice recorder.

For example, a presenter gives a presentation of a product using a panel in an exhibition hall. In the presentation, the audience may record the speech of the presenter using a voice recorder and may also take still images of posters exhibited (e.g., the entirety of the posters) using a digital camera. After the presentation, a member of the audience may play back the still images and speech, which were taken and recorded in the presentation, at home, and may listen to the presentation relating to a portion of the taken still images (e.g., the presentation relating to "product features" given in a portion of the exhibited poster).

In this case, the member of the audience must expend some effort to search the recorded audio data for the audio recording of the desired portion, which is time-consuming. A listener who was not a live audience member of the presentation would not know which portion of the recorded audio data corresponds to the presentation of the desired portion of the taken posters, and must therefore listen to the audio recording from the beginning in order to search for the desired speech portion, which is time-consuming.

SUMMARY OF THE INVENTION

The present invention provides an information processing method and apparatus that allows appropriate association between a portion of image data and a portion of audio data.

In one aspect of the present invention, an information processing method for associating image data with speech data includes detecting partial image data from the image data, detecting partial speech data from the speech data, obtaining first information from the partial image data, obtaining second information from the partial speech data, matching the first information obtained and the second information obtained, and associating the first information with the second information.

In another aspect of the present invention, an information processing apparatus that associates image data with speech data includes a first detecting unit that detects partial image data from the image data, a second detecting unit that detects partial speech data from the speech data, a first obtaining unit that obtains first information from the partial image data, a second obtaining unit that obtains second information from the partial speech data, and an associating unit that matches the first information obtained by the first obtaining unit to the second information obtained by the second obtaining unit and that associates the first information with the second information.

According to the present invention, a portion of image data can be associated with a portion of speech data. Therefore, effort is not expended to search for the portion of speech data associated with a portion of image data, and the time required for searching can greatly be saved.

Further features and advantages of the present invention will become apparent from the following description of the preferred embodiments with reference to the attached drawings.

BRIEF DESCRIPTION OF THE DRAWINGS

FIGS. 6A and 6B are tables showing character recognition information and speech recognition information shown in FIGS. 7A and 7B, respectively.

FIGS. 11A and 11B are tables of phonetic strings of recognized characters and speech, respectively, according to the second embodiment.

FIGS. 13A and 13B are tables of character strings of recognized characters and speech, respectively, according to the third embodiment.

FIGS. 14A and 14B are tables showing a plurality of scored character and speech candidates, respectively, according to a fourth embodiment of the present invention.

FIGS. 15A and 15B are tables showing a plurality of scored candidate phonetic strings of recognized characters and speech, respectively, according to the fourth embodiment.

FIGS. 16A and 16B are tables showing a plurality of scored candidate character strings of recognized characters and speech, respectively, according to the fourth embodiment.

FIG. 25 is a table showing recognized characters and font information thereof in the still image shown in FIG. 23.

FIGS. 37A and 37B are tables showing character recognition information and speech recognition information, respectively.

FIGS. 41A and 41B are tables of the character recognition information and the speech recognition information, respectively, of the illustrations shown in FIGS. 31A and 31B.

FIG. 42 is a table showing speech recognition information using word-spotting speech recognition.

FIG. 47 is a table showing the correspondence of tree nodes of a still image and a plurality of divided speech candidates.

FIG. 52A is a table of converted concepts and coordinate data of a still image, and FIG. 52B is a table of converted concepts and time data of speech.

FIGS. 58A and 58B are tables showing user recognition information and speaker recognition information, respectively, according to the fifteenth embodiment.

DESCRIPTION OF THE EMBODIMENTS

Exemplary embodiments of the present invention will now be described in detail with reference to the drawings.

First Embodiment

Figure 1:
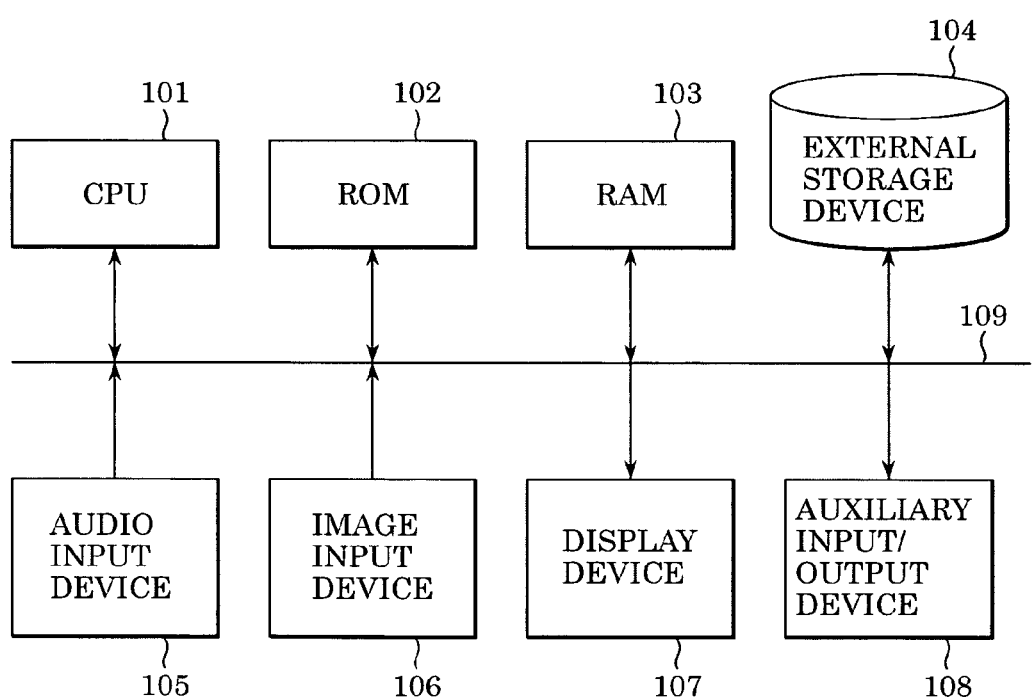
FIG. 1 is a block diagram of a still image and audio processing apparatus that associates a portion of image data with a portion of audio data according to a first embodiment of the present invention.

FIG. 1 is a block diagram of a still image and audio processing apparatus according to a first embodiment of the present invention that associates a portion of image data with a portion of audio data. In FIG. 1, a central processing unit (CPU) 101 performs various controls and processing of the still image and audio processing apparatus according to a control program stored in a read-only memory (ROM) 102 or a control program loaded from an external storage device 104 to a random access memory (RAM) 103. The ROM 102 stores various parameters and the control program executed by the CPU 101. The RAM 103 provides a work area when the CPU 101 executes various controls, and stores the control program to be executed by the CPU 101.

The external storage device 104 is a fixed storage device or a removable portable storage device, such as a hard disk, a flexible disk, a compact disk-read-only memory (CD-ROM), a digital versatile disk-read-only memory (DVD-ROM), or a memory card. The external storage device 104, which is, for example, a hard disk, stores various programs installed from a CD-ROM, a flexible disk, or the like. The CPU 101, the ROM 102, the RAM 103, and the external storage device 104 are connected via a bus 109. The bus 109 is also connected with an audio input device 105, such as a microphone, and an image input device 106, such as a digital camera. An image captured by the image input device 106 is converted into a still image for character recognition or object recognition. The audio captured by the audio input device 105 is subjected to speech recognition or acoustic signal analysis by the CPU 101, and speech related to the still image is recognized or analyzed.

The bus 109 is also connected with a display device 107 for displaying and outputting processing settings and input data, such as a cathode-ray tube (CRT) or a liquid crystal display. The bus 109 may also be connected with one or more auxiliary input/output devices 108, such as a button, a ten-key pad, a keyboard, a mouse, a pen, or the like.

A still image and audio data to be associated with the still image may be input by the image input device 106 and the audio input device 105, or may be obtained from other devices and stored in the ROM 102, the RAM 103, the external storage device 104, or an external device connected via a network.

Figure 2A:
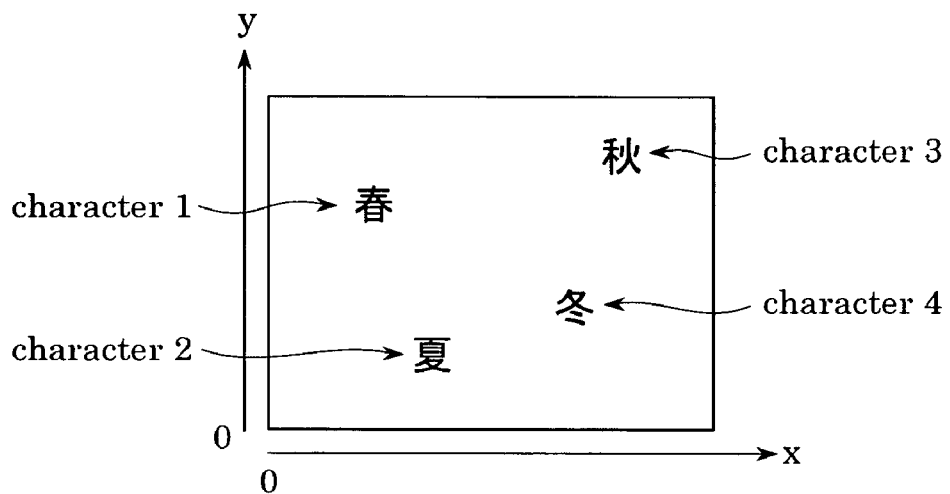
FIGS. 2A and 2B are illustrations of a still image and speech related to the still image.
Figure 2B:
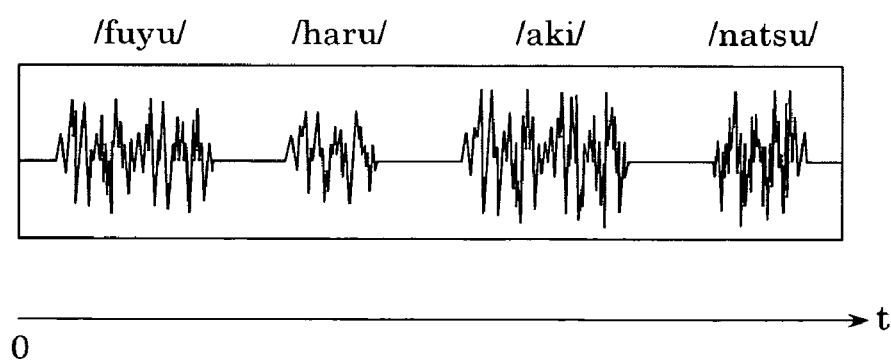

FIGS. 2A and 2B show a still image and speech related to the still image, respectively. In the first embodiment, a portion of the still image and a portion of the speech are to be associated with each other. The still image includes four characters, i.e., characters 1 to 4, on a white background. In the following description, the still image is represented by the coordinates using the horizontal x axis and the vertical y axis, whose origin resides at the lower left point of the still image. The characters 1 to 4 are Chinese characters (kanji), meaning "spring", "summer", "autumn", and "winter", respectively. The image coordinate units may be, but are not limited to, pixels. Four speech portions "fuyu", "haru", "aki", and "natsu" related to the still image are recorded in the stated order. In the following description, speech is represented by the time axis, on which the start time of speech is indicated by 0. The time units may be, but are not limited to, the number of samples or seconds. In this example, the audio data includes sufficient silent intervals between the speech portions.

The speech may be given by any speaker at any time in any place. The photographer, photographing place, and photographing time of the still image may be or may not be the speaker, speaking place, and speaking time of the speech, respectively. The audio data may be included as a portion of a still image file, such as Exif data, or may be included in a separate file from the still image. The still image data and the audio data may be stored in the same device or storage medium, or may be stored in different locations over a network.

Figure 3:
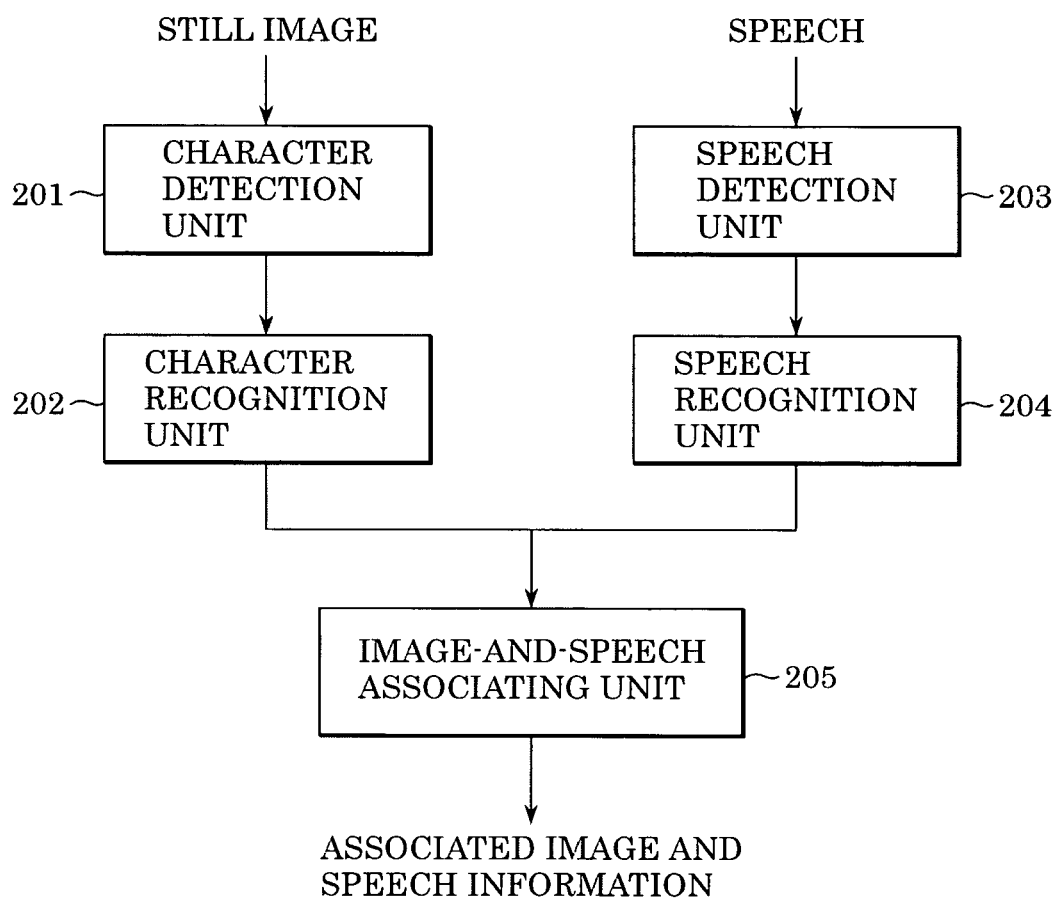
FIG. 3 is a block diagram showing the structure of modules for obtaining the correspondence (associated image and speech information) of an input still image and speech according to the first embodiment.
Figure 7A:
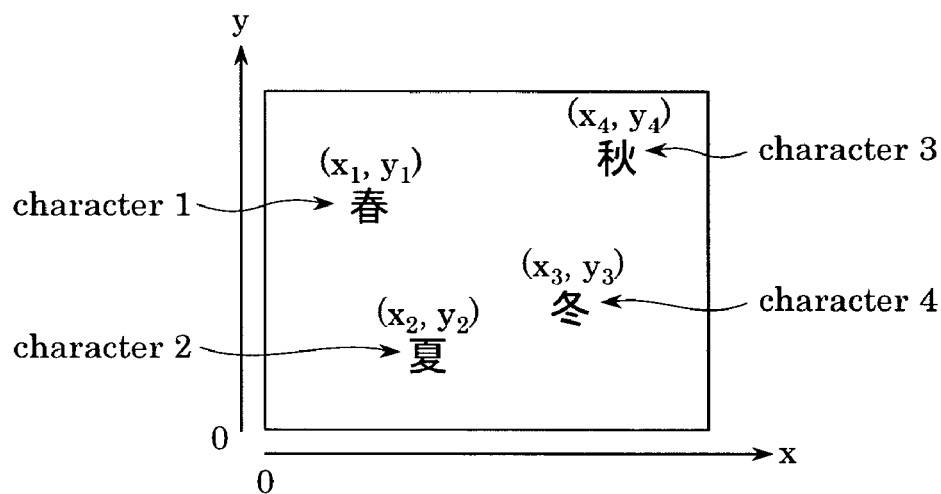
FIGS. 7A and 7B are illustrations of character recognition information and speech recognition information, respectively, applied to the still image and speech shown in FIGS. 2A and 2B.
Figure 7B:
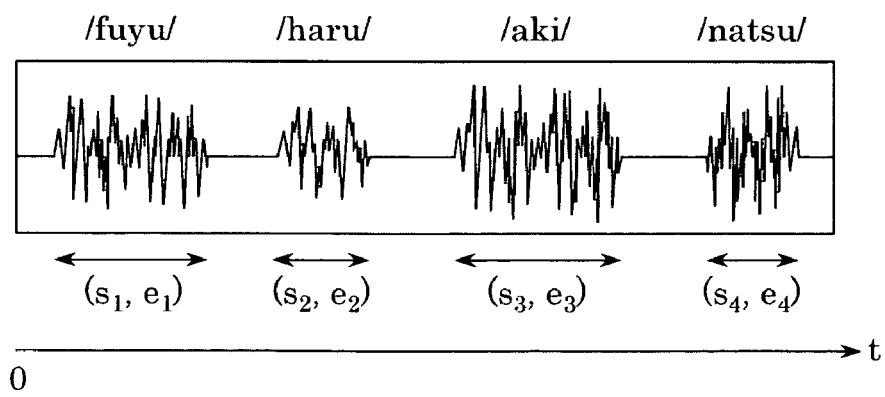

FIG. 3 is a block diagram showing the structure of modules for obtaining the association (associated image and speech information) of an input still image and speech according to the first embodiment. A character detection unit 201 detects a predetermined region (text region) including a text portion from the still image. In the example shown in FIG. 2A, four text regions including the characters 1 to 4 are detected as rectangular images with coordinate data (defined by the x and y values in FIG. 2A). The partial images detected by the character detection unit 201 are image data but are not text data. FIGS. 7A and 7B show character recognition information and speech recognition information applied to the still image and speech portions shown in FIGS. 2A and 2B, respectively. In FIG. 7A, the coordinate data of each partial image data designates the center coordinates of each text region (partial image).

In FIG. 3, a character recognition unit 202 performs character recognition on the text regions detected by the character detection unit 201 using any known character recognition technique. In the example shown in FIG. 2A, text data indicating the characters 1 to 4 is recognized by the character recognition unit 202 from the partial image data of the four text regions. FIGS. 6A and 6B are tables of the character recognition information and speech recognition information shown in FIGS. 7A and 7B, respectively. As shown in FIG. 6A, the text data of each recognized character is associated with the center coordinates by the character recognition unit 202.

A speech detection unit 203 detects, for example, a voiced portion (speech period) of a user from the audio data. In the example shown in FIG. 2B, the four speech periods indicating [fuyu], [haru], [aki], and [natsu] are detected as partial audio data with time data (defined by the value t in FIG. 2B). In FIG. 7B, the time data of each speech period designates the start time and end time of each speech period.

A speech recognition unit 204 performs speech recognition on the speech periods detected by the speech detection unit 203 using any known speech recognition technique. For ease of illustration, isolated-word speech recognition wherein the recognition vocabulary is set up by only four words, i.e., the character 1 (haru), the character 2 (natsu), the character 3 (aki), and the character 4 (fuyu), is performed, by way of example. In the example shown in FIG. 2B, the audio data in the four speech periods is converted into text data indicating four words, i.e., the character 4, the character 1, the character 3, and the character 2, by the speech recognition unit 204. As shown in FIG. 6B, the audio data in the speech periods is associated with the time data by the speech recognition unit 204.

An image-and-speech associating unit 205 associates the still image with the audio data using the character recognition information (i.e., the recognized characters and the coordinate data of the still image) obtained by the character detection unit 201 and the character recognition unit 202, and the speech recognition information (i.e., the recognized speech and the time data of the audio data) obtained by the speech detection unit 203 and the speech recognition unit 204. For example, the still image and speech shown in FIGS. 2A and 2B are associated by matching a character string of the character recognition information shown in FIG. 6A to a character string obtained based on the speech recognition information shown in FIG. 6B. Thus, the still image is associated with the speech; for example, (x1, y1) is associated with (s2, e2), (x2, y2) with (s4, e4), (x3, y3) with (s3, e3), and (x4, y4) with (s1, e1).

Figure 9:
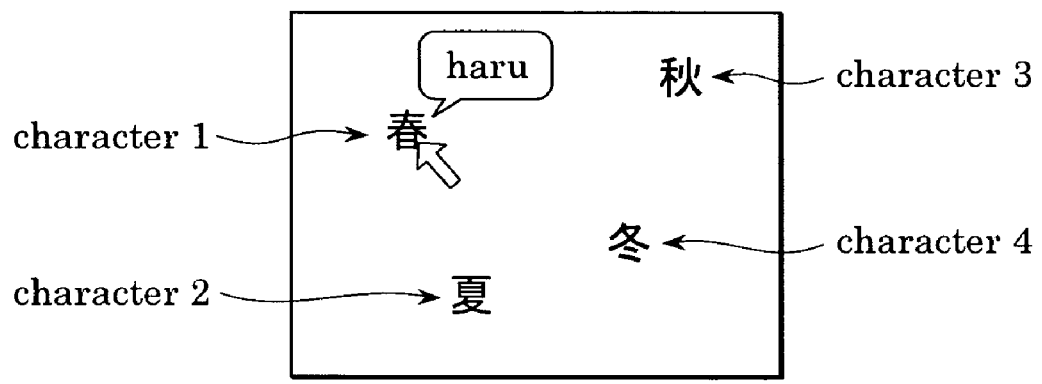
FIG. 9 is an illustration of a still image associated with speech according to an application.

FIG. 9 shows a still image associated with speech according to an application. When a mouse cursor (or an arrow cursor in FIG. 9) is brought onto a character portion of the still image, e.g., around the coordinates (x1, y1), the audio data associated with this character (i.e., the audio data indicated by the time data (s2, e2) shown in FIG. 7B) is reproduced and output from an audio output device such as a speaker.

Figure 33A:
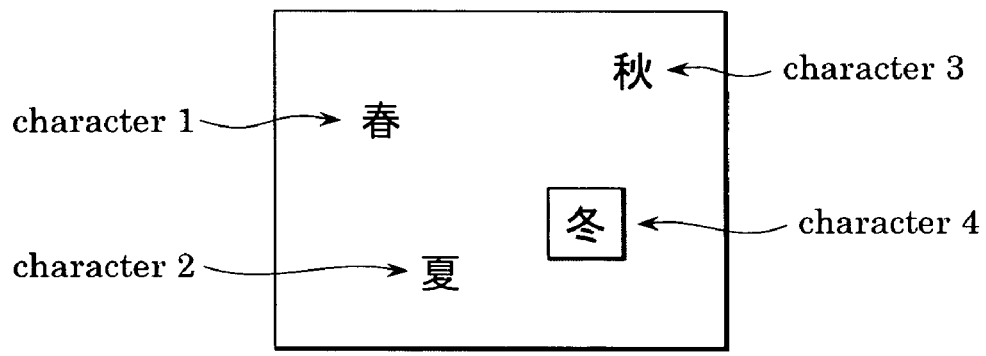
FIGS. 33A and 33B are illustrations of the still image and speech shown in FIGS. 2A and 2B associated with each other according to another application.
Figure 33B:
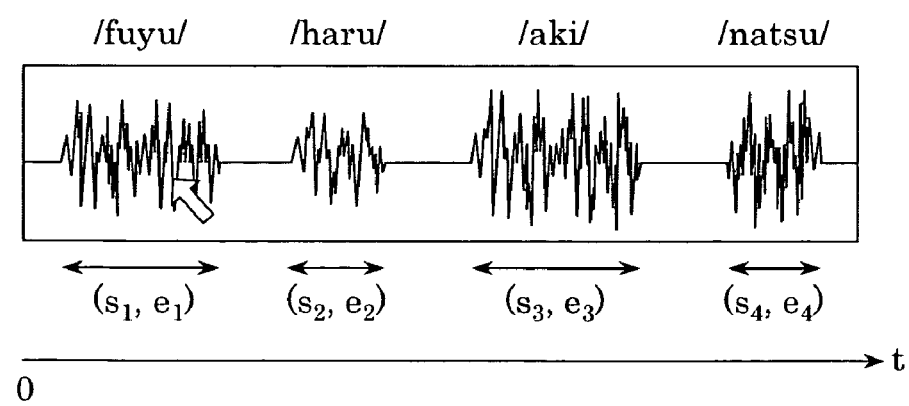

Conversely, the speech may be reproduced from the beginning or for a desired duration specified by a mouse, a keyboard, or the like, and the portion of the still image corresponding to the reproduced speech period may be displayed with a frame. FIGS. 33A and 33B show the still image and speech shown in FIGS. 2A and 2B associated with each other according to another application. When the user brings a mouse cursor (or an arrow cursor in FIG. 33B) onto the speech period (the duration from s1 to e1) where the speech "fuyu" is recognized, the text region corresponding to this speech period, i.e., the character 4, is displayed surrounded by a frame. Therefore, the operator of this apparatus can easily understand which portion of the still image corresponds to the output speech.

The operation of the modules shown in FIG. 3 is described in further detail below.

The character detection unit 201 employs a segmentation technique for segmentating a predetermined area of a still image, such as a photograph, a picture, text, a graphic, and a chart. For example, a document recognition technique for identifying a text portion from other portions, such as a chart and a graphic image, in a document may be employed as one segmentation technique. In the foregoing description of detection of a text region, for ease of illustration, the center coordinates of the text regions shown in FIG. 7A are used as coordinate data of the text regions. In general, coordinates (two point coordinates) capable of designating a rectangular region are suitable in view of flexibility.

The character recognition unit 202 receives the partial image data composed of the text regions detected by the character detection unit 201, and recognizes characters included in the partial image data. The character may be recognized using a known character recognition technique. In the first embodiment, an on-line character recognition technique is not used because the input image is a still image, and an off-line character recognition technique or an optical character recognition (OCR) technique is used. If the character type is known prior to character recognition, or if the character type can be given by the user or the like during character recognition, a character recognition technique adapted to the character type may be used.

The character type means, for example, handwritten characters and printing characters. Handwritten characters may further be classified into limited handwritten characters (such as characters written along a dotted line), commonly used characters written by hand, and free handwritten characters. The printing characters may further be classified into single-font text having one font type, and multi-font text having multiple font types. If the character type is not known in advance, all techniques described above may be used in order to use the most reliable or best scored result, or the character type of each character may be determined prior to character recognition and the character recognition technique determined based on the determined character type may be used.

Figure 4:
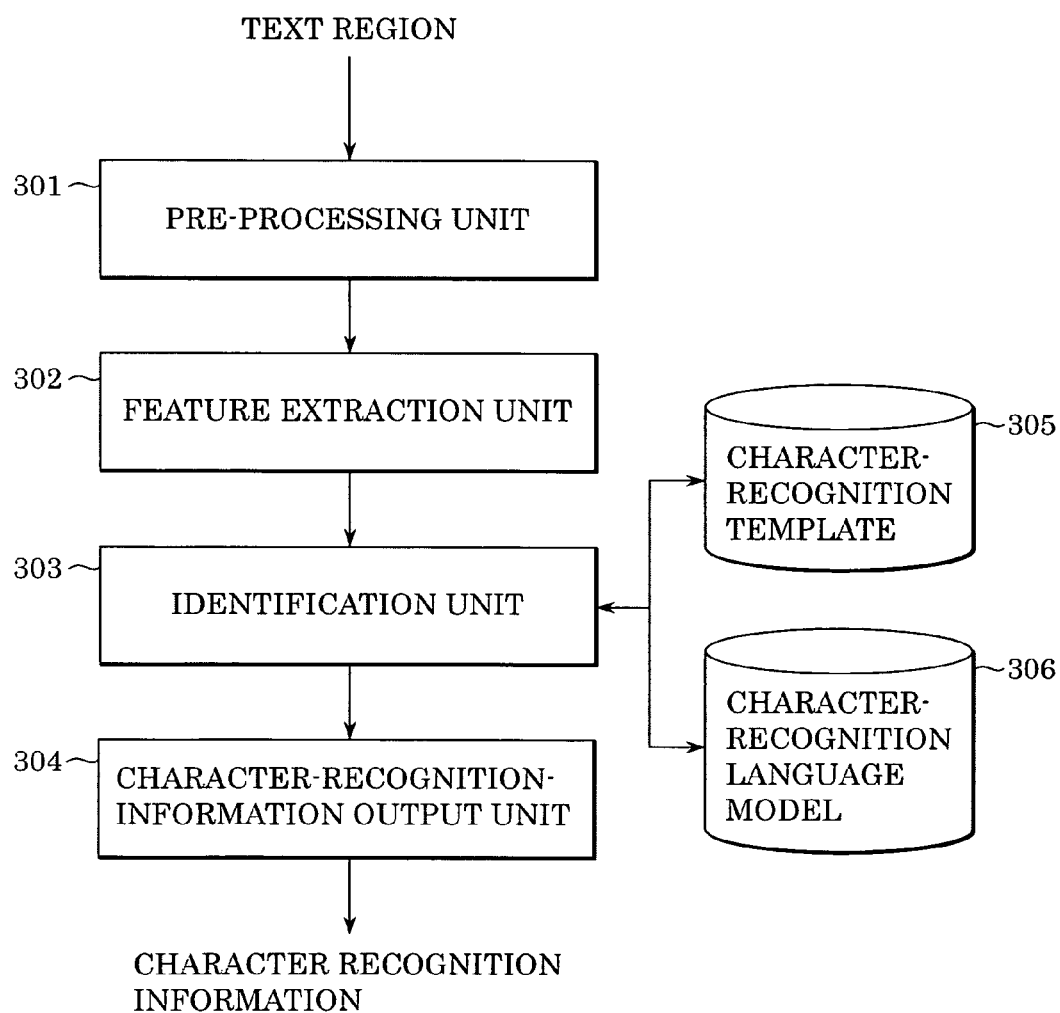
FIG. 4 is a block diagram showing the detailed modular structure of a character recognition unit 202 of the first embodiment.

FIG. 4 is a block diagram showing the detailed modular structure of the character recognition unit 202 of the first embodiment. A pre-processing unit 301 performs pre-processing to facilitate character recognition, and outputs normalized data. Specifically, the pre-processing unit 301 removes a noise component, and normalizes the font size. A feature extraction unit 302 extracts features of the character by converting and compressing the normalized data into lower-order data in which the features of the character are emphasized. For example, a chain code in the outline of a binary image is extracted as a feature.

An identification unit 303 matches the features input from the feature extraction unit 302 to a character-recognition template 305, and identifies the character corresponding to the input features. A matching technique such as DP matching or a two-dimensional hidden Markov model (HMM) may be used. In some cases, the linguistic relation between characters may be stochastically used as language knowledge to thereby improve the character recognition performance. In such cases, a character-recognition language model 306, which is, for example, a character bigram model represented by a character pair, is used. The character-recognition language model 306 is not essential. A character-recognition-information output unit 304 outputs character recognition information including the character recognized by the identification unit 303 and the coordinate data of the recognized character in the still image.

The speech recognition unit 204 receives the audio data composed of the speech periods detected by the speech detection unit 203, and recognizes speech using any known speech recognition technique, such as HMM-based speech recognition. Known speech recognition approaches include isolated-word speech recognition, grammar-based continuous speech recognition, N-gram-based large vocabulary continuous speech recognition, and non-word-based phoneme or syllable recognition. In the foregoing description, for ease of illustration, isolated-word speech recognition is used; actually, large vocabulary continuous speech recognition or phoneme recognition (syllable recognition) is preferably used because speech is not always given on a word basis and the speech content is not known beforehand.

Figure 5:
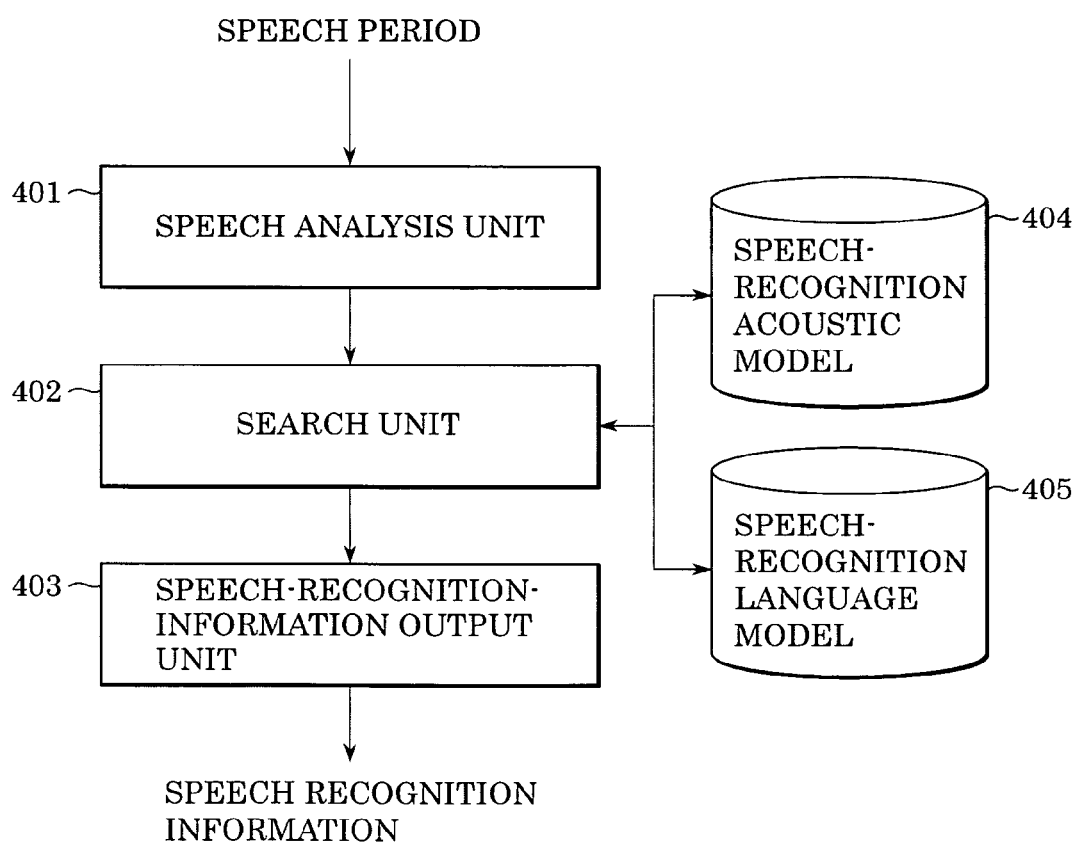
FIG. 5 is a block diagram showing the detailed modular structure of a speech recognition unit 204 of the first embodiment.

FIG. 5 is a block diagram showing the detailed modular structure of the speech recognition unit 204 of the first embodiment. A speech analysis unit 401 analyzes the spectrum of speech and determines features. A speech analysis method, such as Mel-frequency cepstrum coefficient (MFCC) analysis or linear prediction analysis, may be used. A speech-recognition language model database 405 stores a dictionary (notation and pronunciation) for speech recognition and linguistic constraints (probability values of word N-gram models, phoneme N-gram models, etc.). A search unit 402 searches for and obtains recognized speech using a speech-recognition acoustic model 404 and the speech-recognition language model 405 based on the features of the input speech determined by the speech analysis unit 401. A speech-recognition-information output unit 403 outputs speech recognition information including the recognized speech obtained by the search unit 402 and time data of the corresponding speech period.

The image-and-speech associating unit 205 associates the character recognition information determined by the character recognition unit 202 with the speech recognition information determined by the speech recognition unit 204, and outputs associated still image and speech information. The still image and speech are associated by matching the recognized character or character string to the character or character string determined from the notation (word) of the recognized speech. Alternatively, the still image and speech are associated by matching a phonetic string of the recognized character string to a phonetic string of the recognized speech. The details of the matching are described below with reference to specific embodiments. In the example shown in FIGS. 2A and 2B, for ease of illustration, the characters in the still image and the speech periods are in one-to-one correspondence.

In this way, character string matching is performed by searching for completely matched character strings. However, actually, the speech recorded in a presentation is not completely identical to the text of a still image, and a character string obtained by character recognition is partially matched to a character string obtained by speech recognition. For example, when the speech "Spring is the cherry blossom season, . . . " is given, the character 1 as a result of character recognition is matched to a partial character string, i.e., "Spring", of the recognized speech, and these character strings are associated with each other. There are cases including no speech period corresponding to a text region, a speech period that is not related to any text region, a recognized character including an error, and recognized speech including an error. In such cases, probabilistic matching is preferably performed rather than deterministic matching.

According to the first embodiment, therefore, a partial image area extracted from still image data and a partial speech period extracted from audio data can be associated so that the related image area and speech period are associated with each other. Thus, a time-consuming operation to search for a speech period (partial audio data) of the audio data that is related to a partial image area of the image data can be avoided, which is greatly time saving.

Second Embodiment

In the first embodiment, the image-and-speech associating unit 205 directly compares a character string recognized in character recognition with a character string obtained by speech recognition. The character strings cannot be directly compared if phoneme (or syllable) speech recognition is employed or a word with the same orthography but different phonology, i.e., homograph, is output (e.g., the word "read" is recognized and the speech [reed] and [red] are recognized). In speech recognition, generally, pronunciation information (phonetic string) of input speech is known, and, after recognized characters are converted into pronunciation information (phonetic string), these phonetic strings are matched. Thus, character recognition information and speech recognition information can be associated in a case where character strings cannot be compared.

Figure 10:
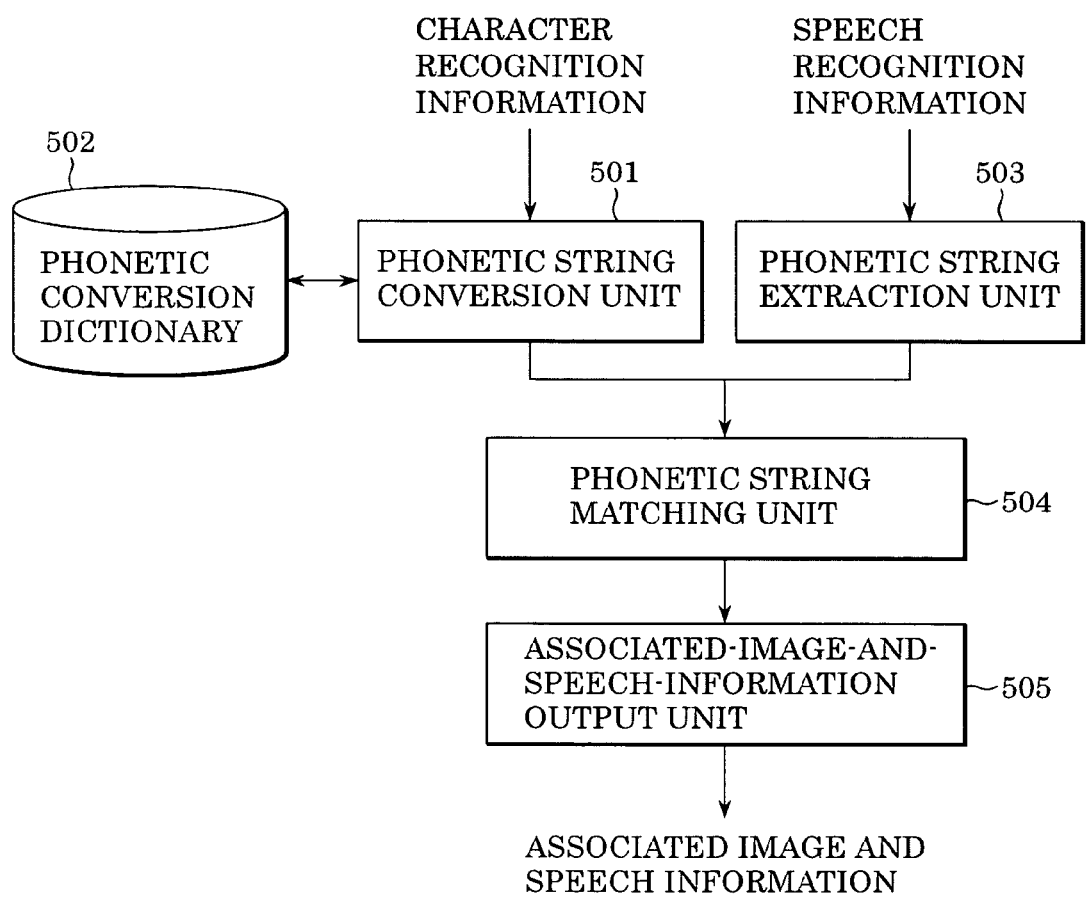
FIG. 10 is a block diagram showing the detailed modular structure of an image-and-speech associating unit according to a second embodiment of the present invention that uses phonetic string matching.

FIG. 10 is a block diagram showing the detailed modular structure of an image-and-speech associating unit according to a second embodiment of the present invention that performs phonetic string matching. A phonetic string conversion unit 501 converts recognized characters of the character recognition information obtained from the character recognition unit 202 into a phonetic string using a phonetic conversion dictionary 502. One character string can have multiple pronunciations rather than one pronunciation, and one or a plurality of candidate phonetic strings can be output from one character string.

In a specific example, candidate phonetic strings [haru/shun], [natsu/ka], [aki/shuu], and [fuyu/tou] are generated from the characters 1, 2, 3, and 4, respectively, in the character recognition information shown in FIG. 6A. In Japanese, one Chinese character has a plurality of pronunciations. The character 1 can be pronounced [haru] or [shun]. This is analogous to "read", which can be pronounced [reed] or [red] in English.) FIGS. 11A and 11B are tables of phonetic strings of recognized characters and speech, respectively, according to the second embodiment. The character recognition information shown in FIG. 6A is converted into candidate phonetic strings shown in FIG. 11A.

In FIG. 10, a phonetic string extraction unit 503 extracts a phonetic string from the speech recognition information obtained from the speech recognition unit 204. The phonetic strings [fuyu], [haru], [aki], and [natsu] shown in FIG. 11B are extracted from the speech recognition information shown in FIG. 6B.

A phonetic string matching unit 504 matches the phonetic strings converted from the character strings recognized in character recognition and the phonetic strings of the recognized speech. As a result of matching, the phonetic strings [haru], [natsu], [aki], and [fuyu] are selected from the plurality of candidate phonetic strings of the recognized characters shown in FIG. 11A, and are associated with the phonetic strings of the recognized speech.

An associated-image-and-speech-information output unit 505 outputs associated image and speech information as a matching result. In the illustrated example, the phonetic strings are generated based on the Japanese "kana" system; however, any other writing system, such as phonemic expression, may be employed. In the illustrated example, candidate phonetic strings, such as [tou], are generated from recognized characters according to the written-language system. Candidate phonetic strings, such as [too], may be generated according to the spoken-language system, or the spoken-language-based phonetic strings may be added to the written-language-based phonetic strings.

According to the second embodiment, therefore, a still image and speech can be associated with each other in a case where a character string recognized in character recognition and a character string of recognized speech cannot be directly compared.

Third Embodiment

In the second embodiment, a character string recognized in character recognition is converted into a phonetic string, which is then matched to a phonetic string of recognized speech. Conversely, a phonetic string of recognized speech may be converted into a character string, which is then matched to a character string recognized in character recognition.

Figure 12:
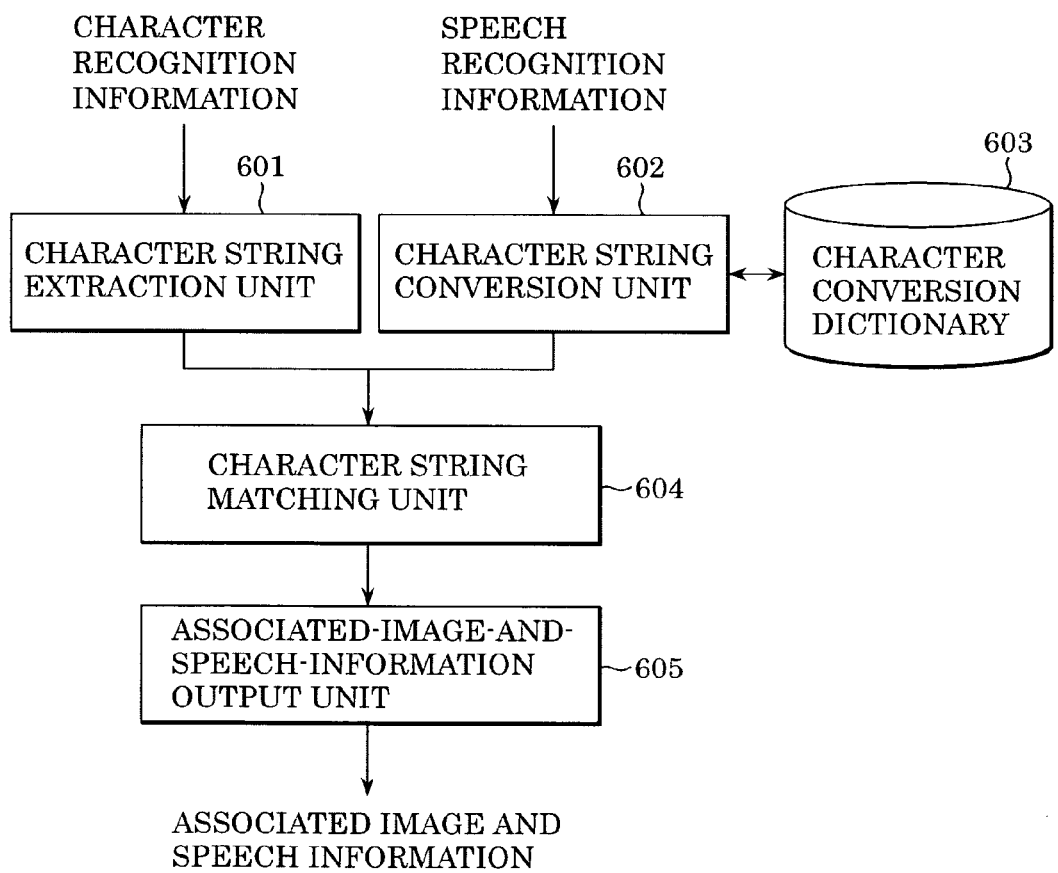
FIG. 12 is a block diagram showing the detailed modular structure of an image-and-speech associating unit according to a third embodiment of the present invention that uses character string matching.

FIG. 12 is a block diagram showing the detailed modular structure of an image-and-speech associating unit according to a third embodiment of the present invention that uses character string matching. A character string extraction unit 601 extracts a character string from the character recognition information obtained from the character recognition unit 202. For example, characters 1, 2, 3, and 4 shown in FIG. 13A are extracted from the character recognition information shown in FIG. 6A.

FIGS. 13A and 13B are tables of character strings of recognized characters and speech, respectively, according to the third embodiment.

In FIG. 12, a character string conversion unit 602 converts recognized speech (phonetic string) of the speech recognition information obtained from the speech recognition unit 204 into a character string using a character conversion dictionary 603. One pronunciation can have multiple characters rather than one character, and a plurality of character strings can be output as candidates from one phonetic string.

In a specific example, candidate character strings shown in FIG. 13B are generated from the phonetic strings [fuyu], [haru], [aki], and [natsu] in the speech recognition information shown in FIG. 6B. The words shown in FIG. 13B are homonyms, which is analogous to "son" and "sun", "hour" and "our", "knead" and "need", etc., in English.

A character string matching unit 604 matches the character strings recognized in character recognition to the character strings converted from the phonetic strings of the recognized speech. As a result of the matching, the characters 4, 1, 3, and 2 are selected from the plurality of candidate character strings of the recognized speech shown in FIG. 13B, and are associated with the recognized character strings. An associated-image-and-speech-information output unit 605 outputs associated image and speech information as a matching result of the character string matching unit 604.

According to the third embodiment, therefore, a still image and speech can be associated with each other by phonetic string matching in a case where a character string recognized in character recognition and a character string of recognized speech cannot be directly compared.

Fourth Embodiment

In the embodiments described above, one character recognition result and one speech recognition result are obtained, and only character strings or phonetic strings as a result of recognition are used to associate a still image and speech. Alternatively, a plurality of candidates having score information, such as likelihood and probability, may be output as a result of recognition, and a recognized character and speech may be associated with each other using the plurality of scored candidates.

If N text regions I1, ..., IN and M speech periods S1, ..., SM are associated with each other, and results C1, ..., CN are determined. The result Cn is given below, where Cn=(In, Sm), where $1 \leq n \leq N$ and $1 \leq m \leq M$:

$$Cn = \mathrm{argmax}\{PIni*PSmj*\delta(RIni, RSmj)\}$$

where PIni indicates the score of the i-th character candidate in the text region In, where $1 \leq i \leq K$, where K is the number of character candidates, and PSmj indicates the score of the j-th speech candidate in the speech period Sm, where $1 \leq j \leq L$, where L is the number of speech candidates. If the character string (or phonetic string) of the i-th character candidate in the text region In is indicated by RIni, and the character string (or phonetic string) of the j-th speech candidate in the speech period Sm is indicated by RSmj, then "$\delta(RIni, RSmj)$" are given by the function $\delta(RIni, RSmj)=1$ when RIni=RSmj otherwise by the function $\delta(RIni, RSmj)=0$. In the equation above, argmax denotes the operation to determine a set of i, m, and j that attains the maximum value of $\{PIni*PSmj*\delta(RIni, RSmj)\}$. Therefore, the speech period Sm corresponding to the text region In, that is, Cn, can be determined.

A specific example is described next with reference to FIGS. 14A to 16B.

FIGS. 14A and 14B are tables showing a plurality of scored character and speech candidates, respectively, according to a fourth embodiment of the present invention. In the example shown in FIGS. 14A and 14B, N=4, M=4, K=3, and L=3. As described above in the first embodiment, a still image and speech are associated by directly comparing a character string recognized in character recognition and a character string of recognized speech. For example, in FIGS. 14A and 14B, I1 is the character 1, S1 is the character 4, PI11 is 0.7, PS43 is 0.1, RI13 is a character 5, and RS32 is [ashi].

At n=1, that is, in the first row of character candidates, if i=1, m=2, and j=1, then PI11 is 0.7, PS21 is 0.7, RI11 is the character 1, and RS21 is "haru". In this case, "$\delta(RI11, RS21)$" is 1, and in the argmax function, the maximum value, i.e., 0.49 (=0.7×0.7×1), is obtained. In other sets, "$\delta(RIni, RSmj)$" is 0, and, in the argmax function, 0 is given. Therefore, C1=(I1, S2) is determined. Likewise, associations C2=(I2, S3), C3=(I3, S4), and C4=(I4, S1) are determined.

As described above in the second embodiment, a recognized character is converted into a phonetic string, and the converted phonetic string is matched to a phonetic string of recognized speech to associate a still image and speech. In this case, a plurality of scored candidates may be used.

FIGS. 15A and 15B are tables showing a plurality of scored candidate phonetic strings of recognized characters and speech, respectively, according to the fourth embodiment. The score information of a recognized character may be directly used as the score information of the phonetic string thereof. If a plurality of phonetic strings are generated from one recognized character, the phonetic strings have the same score information.

For example, at n=1, two phonetic strings [haru] and [shun] with i=1, two phonetic strings [ka] and [kou] with i=2, and three phonetic strings [sora], [aki], and [kuu] with i=3 are obtained. These phonetic strings undergo a similar calculation to that described with reference to FIGS. 14A and 14B. For example, in the argmax function for "haru" at n=1 and i=1 and [haru] at m=2 and j=1, 0.49 (=0.7×0.7×1) is obtained, and in the argmax function for "aki" at n=1 and i=3 and [aki] at m=3 and j=1, 0.06 (=0.1×0.6×1) is obtained. Thus, an association C1=(I1, S2) is determined. In the argmax function for "fuyu" at n=4 and i=2 and [fuyu] at m=1 and j=1, 0.15 (=0.3×0.5×1) is obtained, and in the argmax function for "tsu" at n=4 and i=3 and [tsu] at m=4 and j=2, 0.02 (=0.2×0.1×1) is obtained. Thus, an association C4=(I4, S1) is determined. Likewise, associations C2=(I2, S3) and C3=(I3, S4) are determined.

As described in the third embodiment, recognized speech is converted into a character string, and the converted character string is matched to a character string recognized in character recognition to associate a still image and speech. In this case, a plurality of scored candidates may be used.

FIGS. 16A and 16B are tables showing a plurality of scored candidate character strings of recognized characters and speech, respectively, according to the fourth embodiment. As in association of phonetic strings shown in FIGS. 15A and 15B, for example, in the argmax function for the character 1 at n=1 and i=1 and the character 1 at m=2 and j=1, 0.49 (=0.7×0.7×1) is obtained, and in the argmax function for the character 5 at n=1 and i=3 and the character 5 at m=3 and j=1, 0.06 (=0.1×0.6×1) is obtained. Thus, an association C1=(I1, S2) is determined.

As described above, in the fourth embodiment, the δ function takes, but is not limited to, a binary value of 1 for complete matching and 0 for mismatching. For example, the δ function may take any other value, such as the value depending upon the matching degree. In the fourth embodiment, the scores of recognized characters are regarded to be equivalent to the scores of recognized speech; however, the scores may be weighted, e.g., the scores of recognized characters may be weighted relative to the scores of recognized speech.

According to the fourth embodiment, therefore, a plurality of scored character and speech candidates are output. Thus, in a case where the first candidate does not include a correct recognition result, a still image and speech can accurately be associated with each other.

Fifth Embodiment

In the second to fourth embodiments described above, the image-and-speech associating unit associates a still image with speech based on a phonetic string or a character string. A still image may be associated with speech using both a phonetic string and a character string. In a fifth embodiment of the present invention, both phonetic string matching and character string matching between a recognized character and recognized speech are employed. This can be implemented by a combination of the modular structures shown in FIGS. 10 and 12.

Sixth Embodiment

In the embodiments described above, character recognition and speech recognition are independently carried out. A character recognition result may be used for speech recognition.

Figure 17:
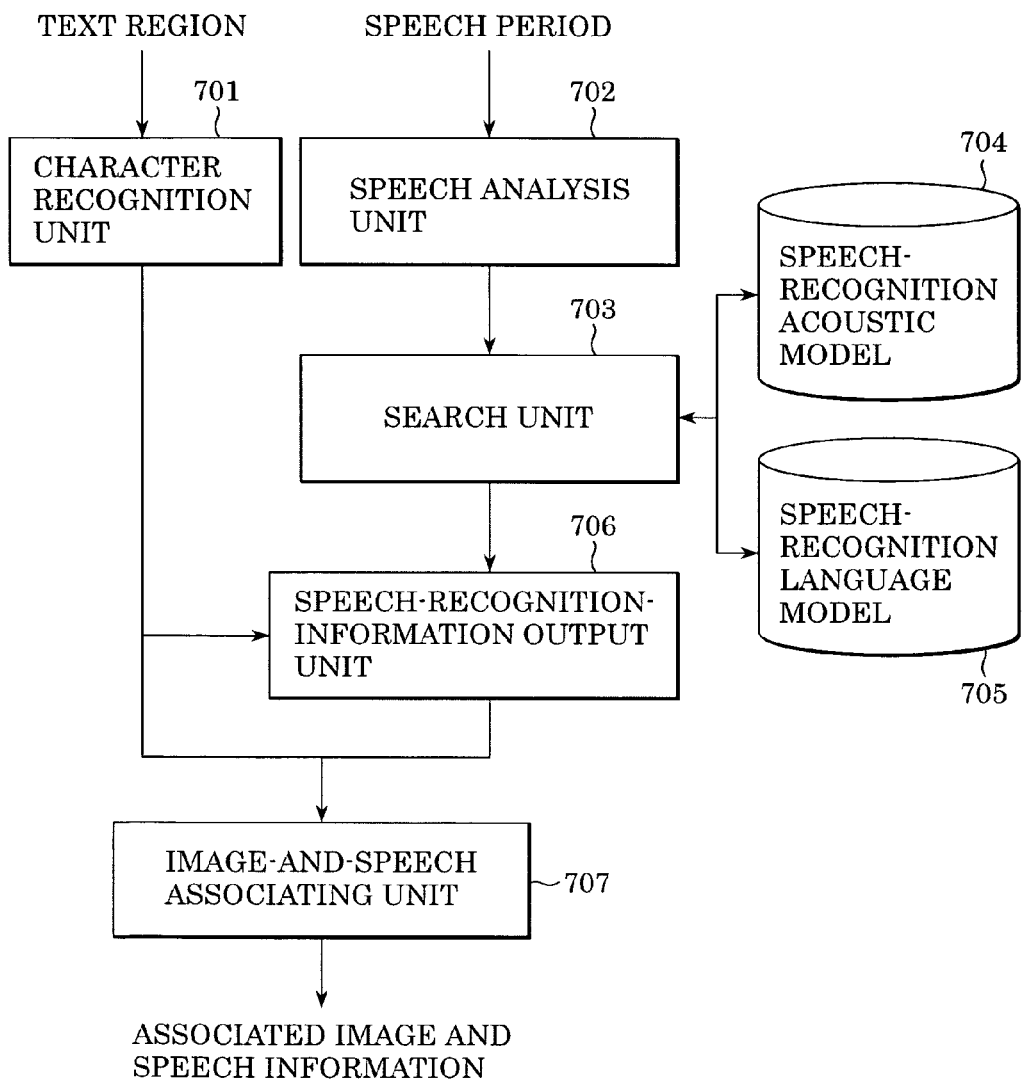
FIG. 17 is a block diagram showing the modular structure of a still image and speech recognition apparatus according to a sixth embodiment of the present invention.

A character recognition result may be used by a speech-recognition-information output unit. FIG. 17 is a block diagram showing the modular structure of a still image and speech recognition apparatus according to a sixth embodiment of the present invention. A character recognition unit 701 is equivalent to the character recognition unit 202 shown in FIG. 3, and a speech analysis unit 702, a search unit 703, a speech-recognition acoustic model 704, and a speech-recognition language model 705 are equivalent to the speech analysis unit 401, the search unit 402, the speech-recognition acoustic model 404, and the speech-recognition language model 405, respectively, shown in FIG. 5. An image-and-speech associating unit 707 is equivalent to the image-and-speech associating unit 205 shown in FIG. 3. Therefore, a description of these modules is omitted.

A speech-recognition-information output unit 706 uses a search result of the search unit 703 and a character recognition result of the character recognition unit 701. For example, the eight character strings shown in FIG. 14B, given by RS12, RS13, RS22, RS23, RS32, RS33, RS41, and RS42, which are not included in the results shown in FIG. 14A, are not regarded as speech candidates. These eight character strings need not undergo the calculation described above in the fourth embodiment, and the processing efficiency is thus improved.

Figure 18:
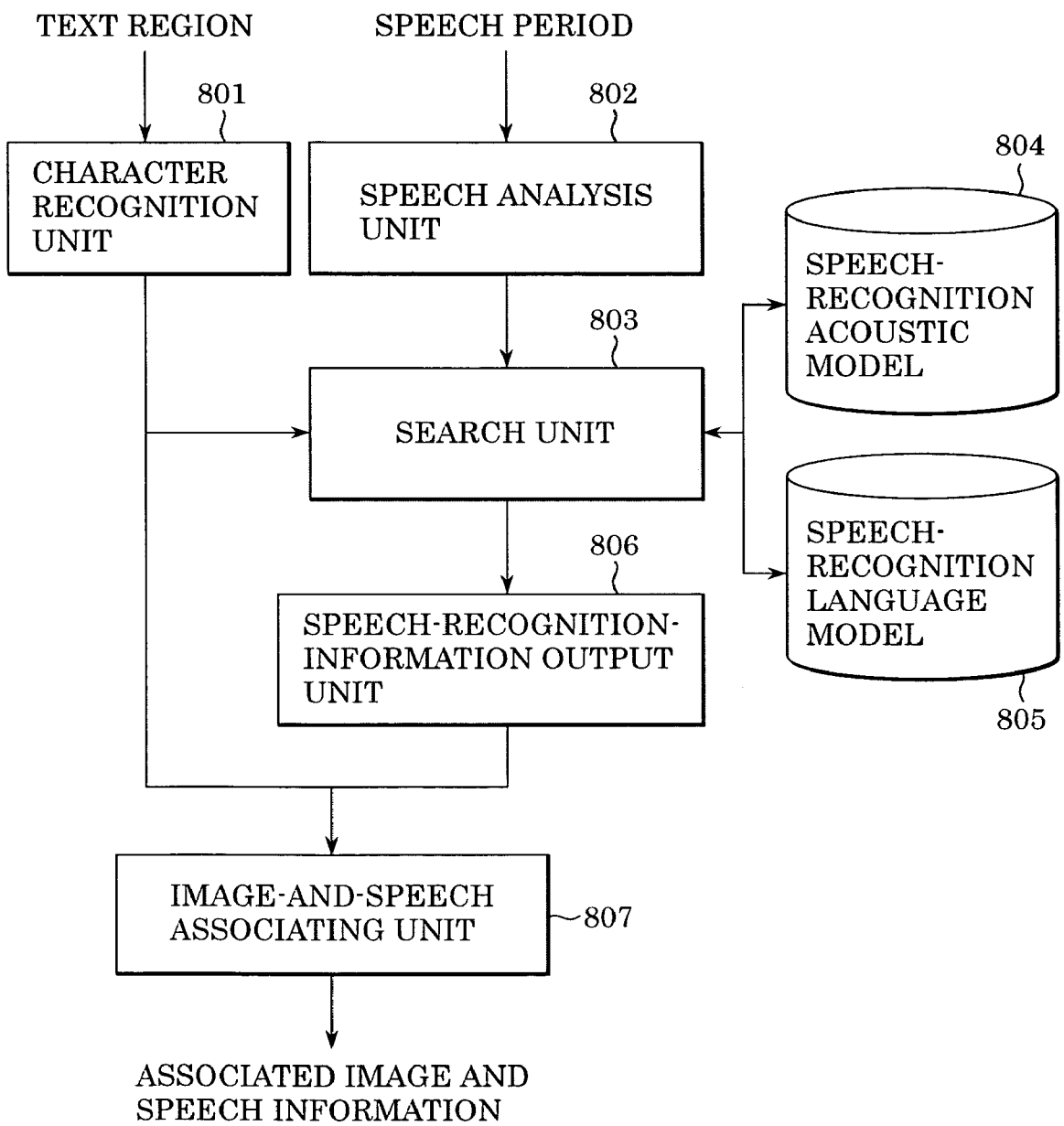
FIG. 18 is a block diagram showing the modular structure of a still image and speech recognition apparatus that uses a character recognition result for speech recognition according to the sixth embodiment.

A character recognition result may also be used by a speech-recognition search unit. FIG. 18 is a block diagram showing the modular structure of a still image and speech recognition apparatus that uses a character recognition result for speech recognition according to the sixth embodiment.

A character recognition unit 801 is equivalent to the character recognition unit 202 shown in FIG. 3, and a speech analysis unit 802, a speech-recognition acoustic model 804, a speech-recognition language model 805, and a speech-recognition-information output unit 806 are equivalent to the speech analysis unit 401, the speech-recognition acoustic model 404, the speech-recognition language model 405, and speech-recognition-information output unit 403, respectively, shown in FIG. 5. An image-and-speech associating unit 807 is equivalent to the image-and-speech associating unit 205 shown in FIG. 3. Therefore, a description of these modules is omitted.

A search unit 803 performs speech recognition using two models, that is, the speech-recognition acoustic model 804 and the speech-recognition language model 805, and also using a result of the character recognition unit 801. For example, when the twelve results shown in FIG. 14A are obtained as recognized characters, the search unit 803 searches the speech-recognition language model 805 for the words corresponding to these twelve character strings (words), and performs speech recognition using the twelve character strings. Therefore, the amount of calculation to be performed by the search unit 803 is greatly reduced, and if a correct word is included in character candidates, the speech recognition performance can generally be improved compared to character recognition and speech recognition that are independently carried out.

Figure 19:
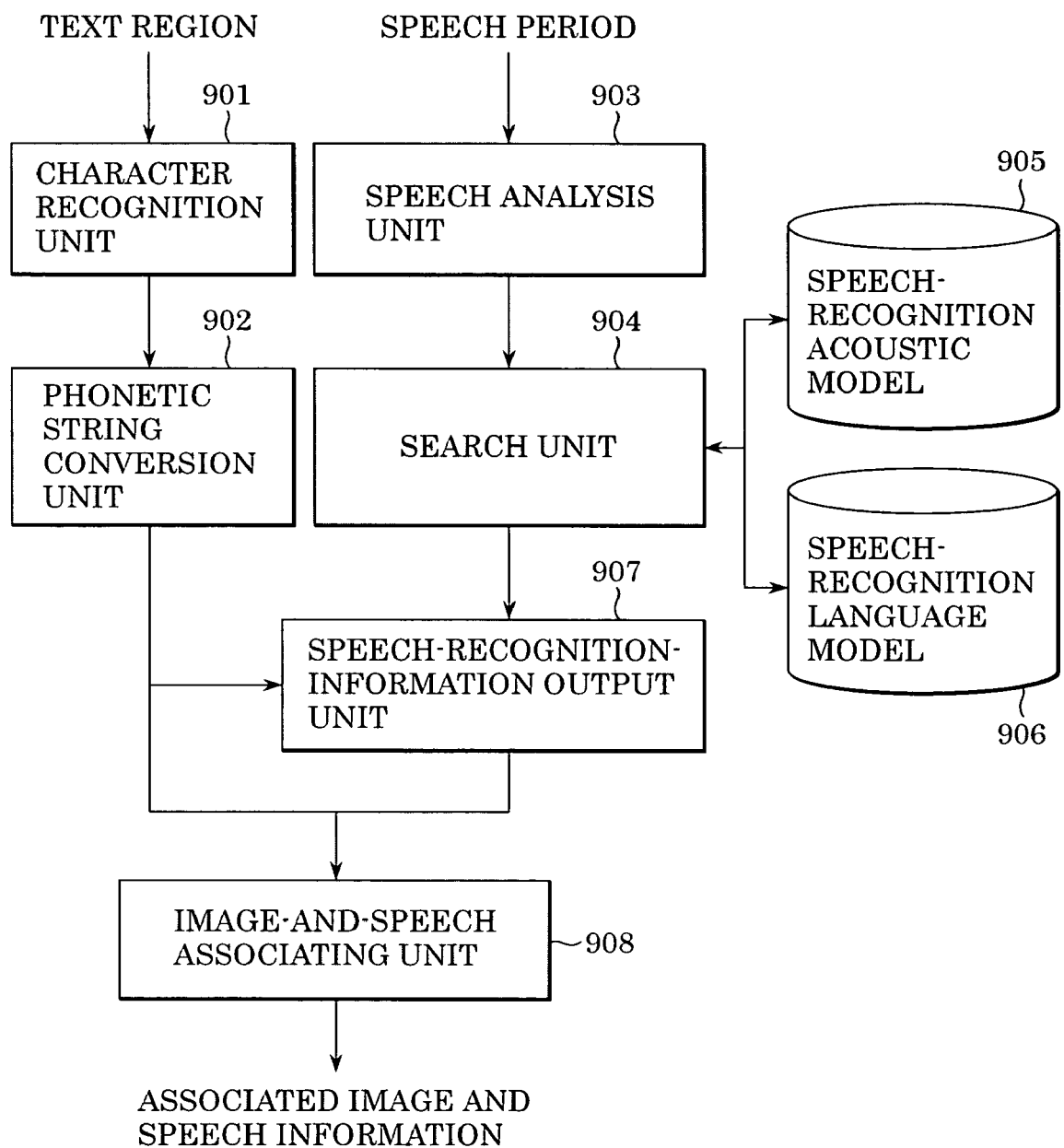
FIG. 19 is a block diagram showing the modular structure of a still image and speech recognition apparatus that converts a character recognition result into a phonetic string according to the sixth embodiment.

A character recognition result may be converted into a phonetic string, and the converted phonetic string may be used by a speech-recognition-information output unit. FIG. 19 is a block diagram showing the modular structure of a still image and speech recognition apparatus that converts a character recognition result into a phonetic string according to the sixth embodiment.

A character recognition unit 901 is equivalent to the character recognition unit 202 shown in FIG. 3, and a phonetic string conversion unit 902 is equivalent to the phonetic string conversion unit 501 shown in FIG. 10. A speech analysis unit 903, a search unit 904, a speech-recognition acoustic model 905, and a speech-recognition language model 906 are equivalent to the speech analysis unit 401, the search unit 402, the speech-recognition acoustic model 404, and the speech-recognition language model 405, respectively, shown in FIG. 5. An image-and-speech associating unit 908 is equivalent to the image-and-speech associating unit 205 shown in FIG. 3. Therefore, a description of these modules is omitted. In FIG. 19, the phonetic conversion dictionary 502 shown in FIG. 10 necessary for the processing of the phonetic string conversion unit 902 is not shown.

A speech-recognition-information output unit 907 uses a result of the search unit 903 and a phonetic string converted from a character recognition result by the character recognition unit 901. For example, the seven phonetic strings [furu], [tsuyu], [taru], [haku], [ashi], [maki], and [matsu] shown in FIG. 15B, which are not included in the results shown in FIG. 15A, are not regarded as speech candidates. These seven phonetic strings need not undergo the calculation described above in the fourth embodiment.

Figure 20:
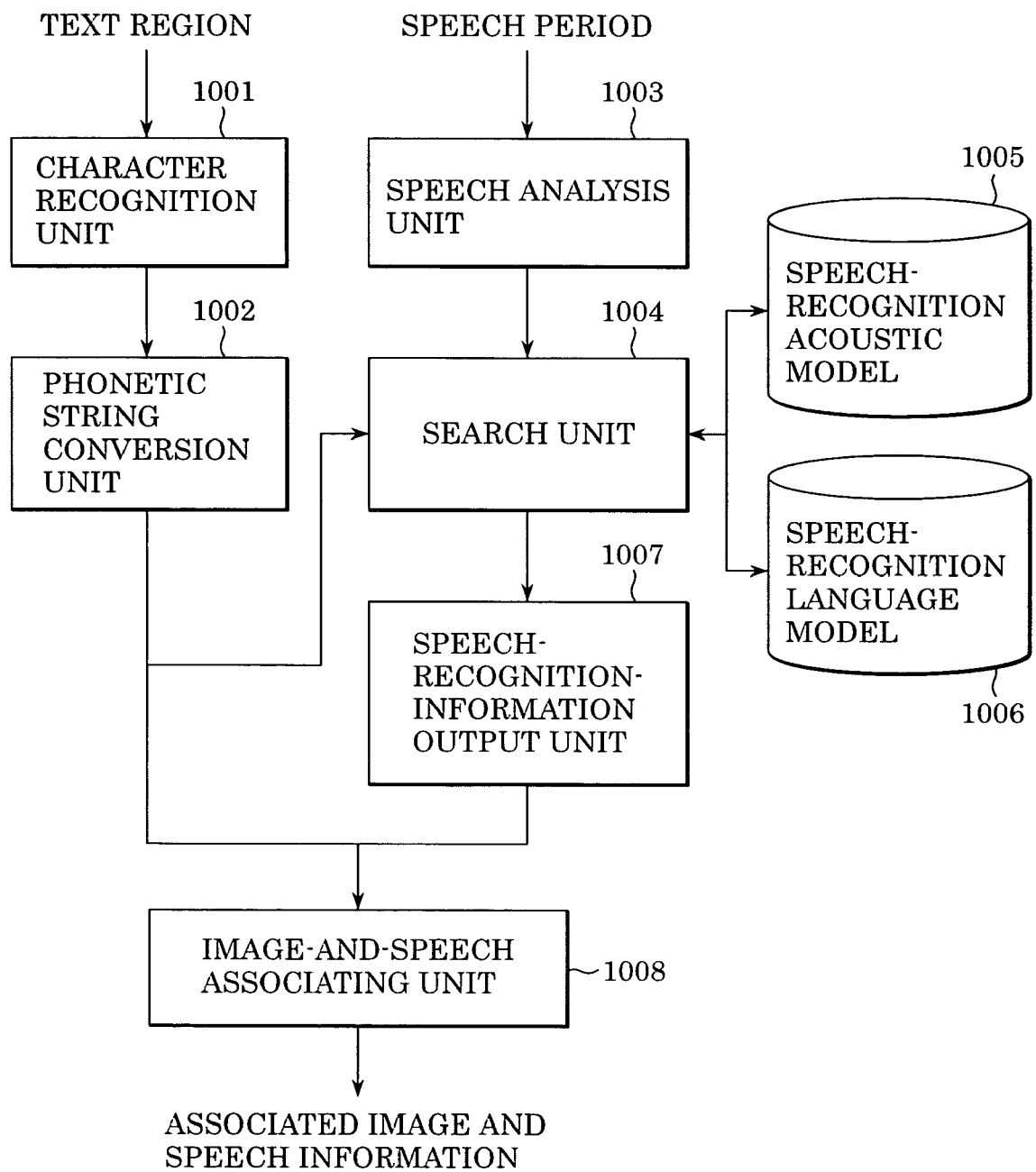
FIG. 20 is a block diagram showing the modular structure of a still image and speech recognition apparatus that converts a recognized character into a phonetic string, which is used by a search unit, according to the sixth embodiment.

A phonetic string generated from a character recognition result may be used by a speech-recognition search unit. FIG. 20 is a block diagram showing the modular structure of a still image and speech recognition apparatus that converts a recognized character into a phonetic string, which is used by a search unit, according to the sixth embodiment.

A character recognition unit 1001 is equivalent to the character recognition unit 202 shown FIG. 3, and a phonetic string conversion unit 1002 is equivalent to the phonetic string conversion unit 501 shown in FIG. 10. A speech analysis unit 1003, a speech-recognition acoustic model 1005, a speech-recognition language model 1006, and a speech-recognition-information output unit 1007 are equivalent to the speech analysis unit 401, the speech-recognition acoustic model 404, the speech-recognition language model 405, and the speech-recognition-information output unit 403, respectively, shown in FIG. 5. An image-and-speech associating unit 1008 is equivalent to the image-and-speech associating unit 205 shown in FIG. 3. Therefore, a description of these modules is omitted. In FIG. 20, the phonetic conversion dictionary 502 shown in FIG. 10 necessary for the processing of the phonetic string conversion unit 1002 is not shown.

A search unit 1004 performs speech recognition using two models, that is, the speech-recognition acoustic model 1005 and the speech-recognition language model 1006, and also using a phonetic string converted from a character recognition result by the phonetic string conversion unit 1002. For example, when the 25 phonetic strings shown in FIG. 15A are obtained by character recognition, the search unit 1004 searches the speech-recognition language model 1006 for the words corresponding to these 25 phonetic strings, and performs speech recognition using the 25 phonetic strings.

Therefore, the amount of calculation to be performed by the search unit 1004 is greatly reduced, and if a correct word is included in phonetic string candidates obtained as a result of character recognition, the speech recognition performance can generally be improved compared to character recognition and speech recognition that are carried out independently.

An image-and-speech associating unit may use a character string recognized in character recognition to convert recognized speech into a character string.

Figure 21:
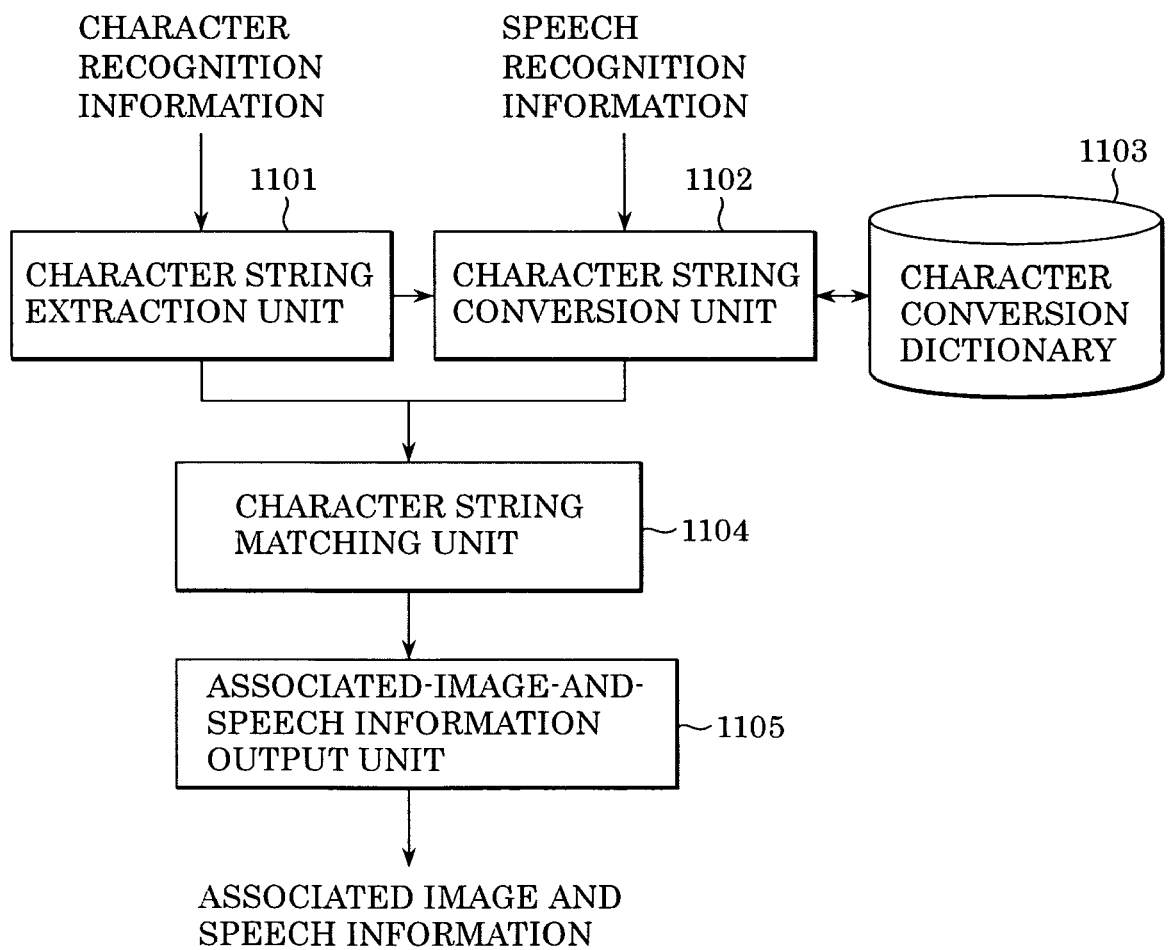
FIG. 21 is a block diagram showing the modular structure of a still image and speech recognition apparatus that converts recognized speech into a character string using a character string recognized in character recognition according to the sixth embodiment.

FIG. 21 is a block diagram showing the modular structure of a still image and speech recognition apparatus that converts recognized speech into a character string using a character string recognized in character recognition according to the sixth embodiment. A character string extraction unit 1101, a character conversion dictionary 1103, a character string matching unit 1104, and an associated-image-and-speech-information output unit 1105 are equivalent to the character string extraction unit 601, the character conversion dictionary 603, the character string matching unit 604, and the associated-image-and-speech-information output unit 605, respectively, shown in FIG. 12, and a description of these modules is thus omitted.

A character string conversion unit 1102 converts recognized speech into a character string using speech recognition information and a character string extracted from recognized characters by the character string extraction unit 1101. For example, when the twelve character strings shown in FIG. 16A are extracted from recognized characters, the character string conversion unit 1102 selects the recognized speech portions that can be converted into these twelve character strings as character string candidates, and converts only the selected speech portions into character strings.

According to the sixth embodiment, therefore, a character recognition result can be used for speech recognition. Thus, the amount of calculation can be reduced, and the speech recognition performance can be improved.

Seventh Embodiment

In the sixth embodiment described above, a character string recognized in character recognition is directly used by a speech-recognition search unit. Speech is not always identical to recognized characters, and, preferably, an important word that it is expected is spoken as speech is extracted from recognized characters, and the extracted word is used by a speech-recognition search unit.

Figure 22:
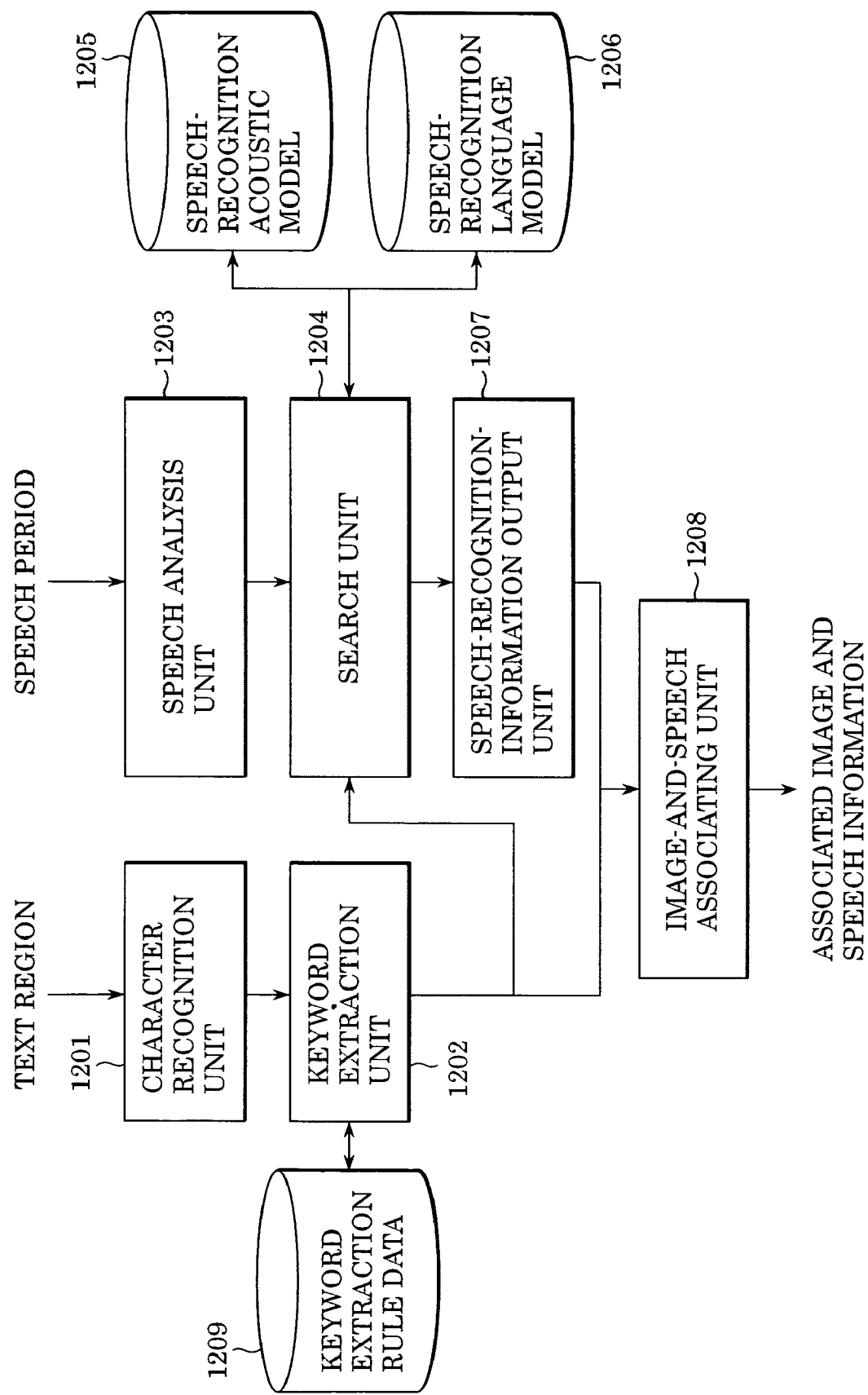
FIG. 22 is a block diagram showing the modular structure of a still image and speech recognition apparatus that extracts an important word from recognized text, which is used by a search unit, according to a seventh embodiment of the present invention.

FIG. 22 is a block diagram showing the modular structure of a still image and speech recognition apparatus that extracts an important word from recognized text, which is used by a search unit, according to a seventh embodiment of the present invention. A character recognition unit 1201 is equivalent to the character recognition unit 202 shown in FIG. 3, and a speech analysis unit 1203, a speech-recognition acoustic model 1205, a speech-recognition language model 1206, a speech-recognition-information output unit 1207 are equivalent to the speech analysis unit 401, the speech-recognition acoustic model 404, the speech-recognition language model 405, and the speech-recognition-information output unit 403, respectively, shown in FIG. 5. An image-and-speech associating unit 1208 is equivalent to the image-and-speech associating unit 205 shown in FIG. 3. Therefore, a description of these modules is omitted.

A keyword extraction unit 1202 extracts an important word from recognized characters using a rule or data (word dictionary) 1209. For example, character strings "we propose a statistical language model based approach" are recognized. When a morphemic analysis is used to extract independent words from the character strings, five words "propose", "statistical", "language", "model", "approach" are extracted as important words.

A search unit 1204 performs speech recognition using two models, that is, the speech-recognition acoustic model 1205 and the speech-recognition language model 1206, and also using the words extracted by the keyword extraction unit 1202. For example, the search unit 1204 may perform word-spotting speech recognition using the five words as keywords. Alternatively, the search unit 1204 may perform large vocabulary continuous speech recognition to extract a speech portion including the five words from the recognized speech, or may perform speech recognition with high probability value of the speech-recognition language model related to the five words. In the example described above, important words are extracted based on an independent-word extraction rule, but any other rule or algorithm may be used.

According to the seventh embodiment, therefore, a still image and speech can be associated with each other in a case where speech is not identical to recognized characters.

Eighth Embodiment

Generally, character information included in a still image includes not only simple character strings but also font information such as font sizes, font types, font colors, font styles such as italic and underlining, and effects. Such font information may be extracted and used for speech recognition, thus achieving more precise association of a still image and speech.

Figure 23:
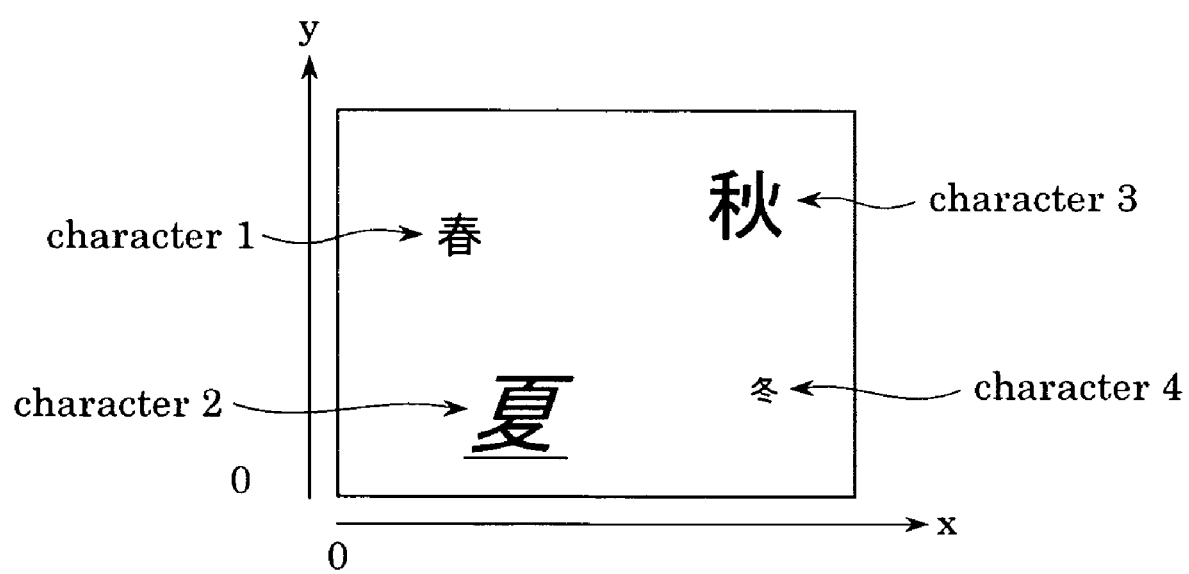
FIG. 23 is an illustration of a still image having various types of font information in an eighth embodiment of the present invention.
Figure 24:
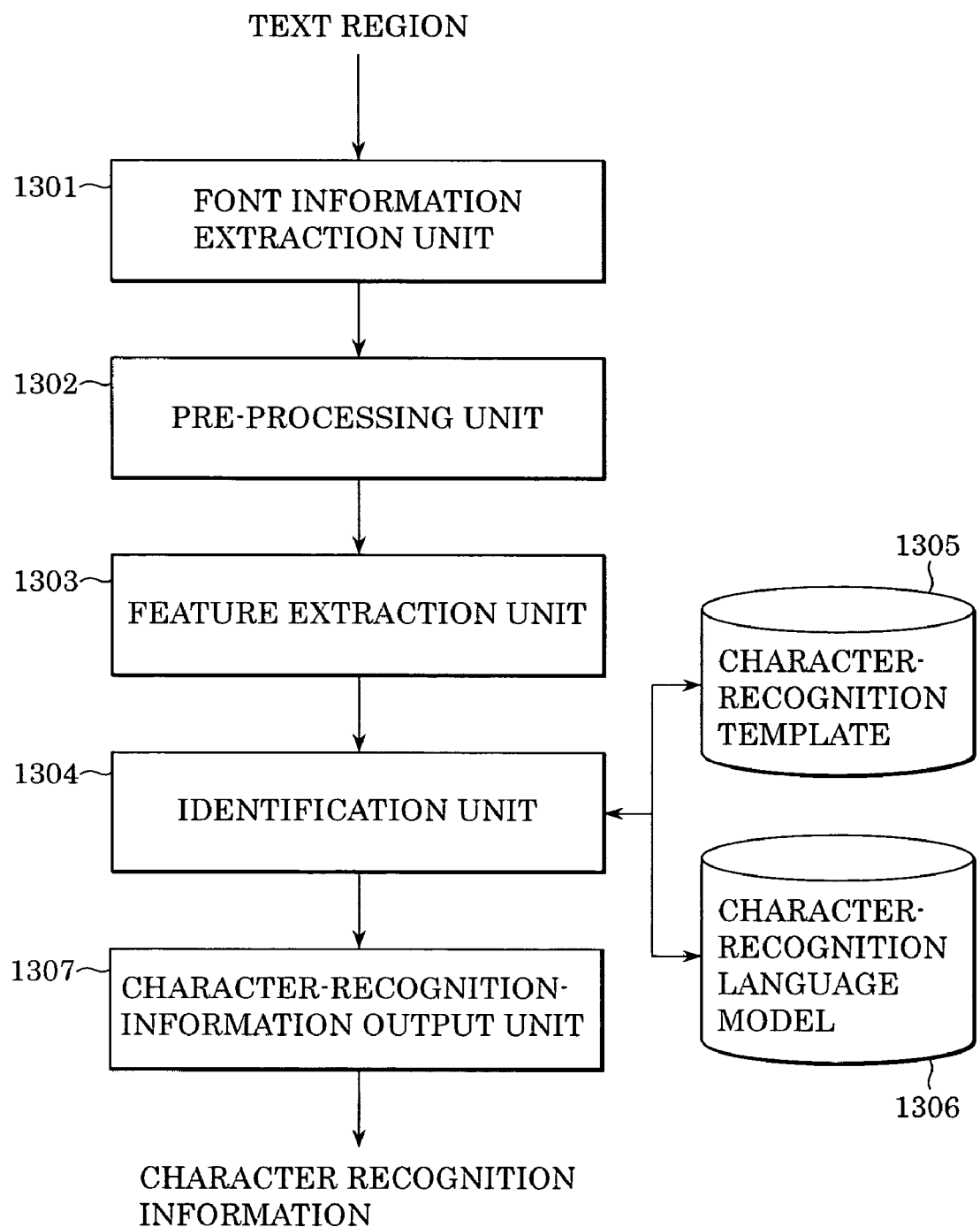
FIG. 24 is a block diagram showing the modular structure of a still image and speech recognition apparatus that extracts font information from a text region and that outputs the extracted font information as character recognition information according to the eighth embodiment.

For example, font information is extracted from a still image shown in FIG. 23, and the extracted font information is used for speech recognition. FIG. 24 is a block diagram showing the modular structure of a still image and speech recognition apparatus that extracts font information from a text region and that outputs the extracted font information as character recognition information according to the eighth embodiment.

A font information extraction unit 1301 extracts font information of a character portion, such as a font size, a font style, a font color, and a font type such as italic or underlining. Other modules are the same as those shown in FIG. 4, and a description thereof is thus omitted.

FIG. 25 is a table showing recognized characters and font information thereof in the still image shown in FIG. 23. The font information shown in FIG. 25 is used for speech recognition with a similar modular structure to that shown in FIG. 18, except that the character recognition unit 801 has the modular structure shown in FIG. 24.

The font information may be used for speech recognition in various ways. For example, an underlined italic character string having a large font size may be subjected to word-spotting speech recognition or speech recognition with high probability value of the statistical language model. Font color information other than black may be added to a vocabulary to be subjected to speech recognition.

According to the eighth embodiment, therefore, font information of a character portion included in a still image can be used for speech recognition, thus allowing more precise association of the still image with speech.

Ninth Embodiment

In the sixth embodiment described above, a character recognition result is used for speech recognition. Conversely, a speech recognition result may be used for character recognition.

Figure 26:
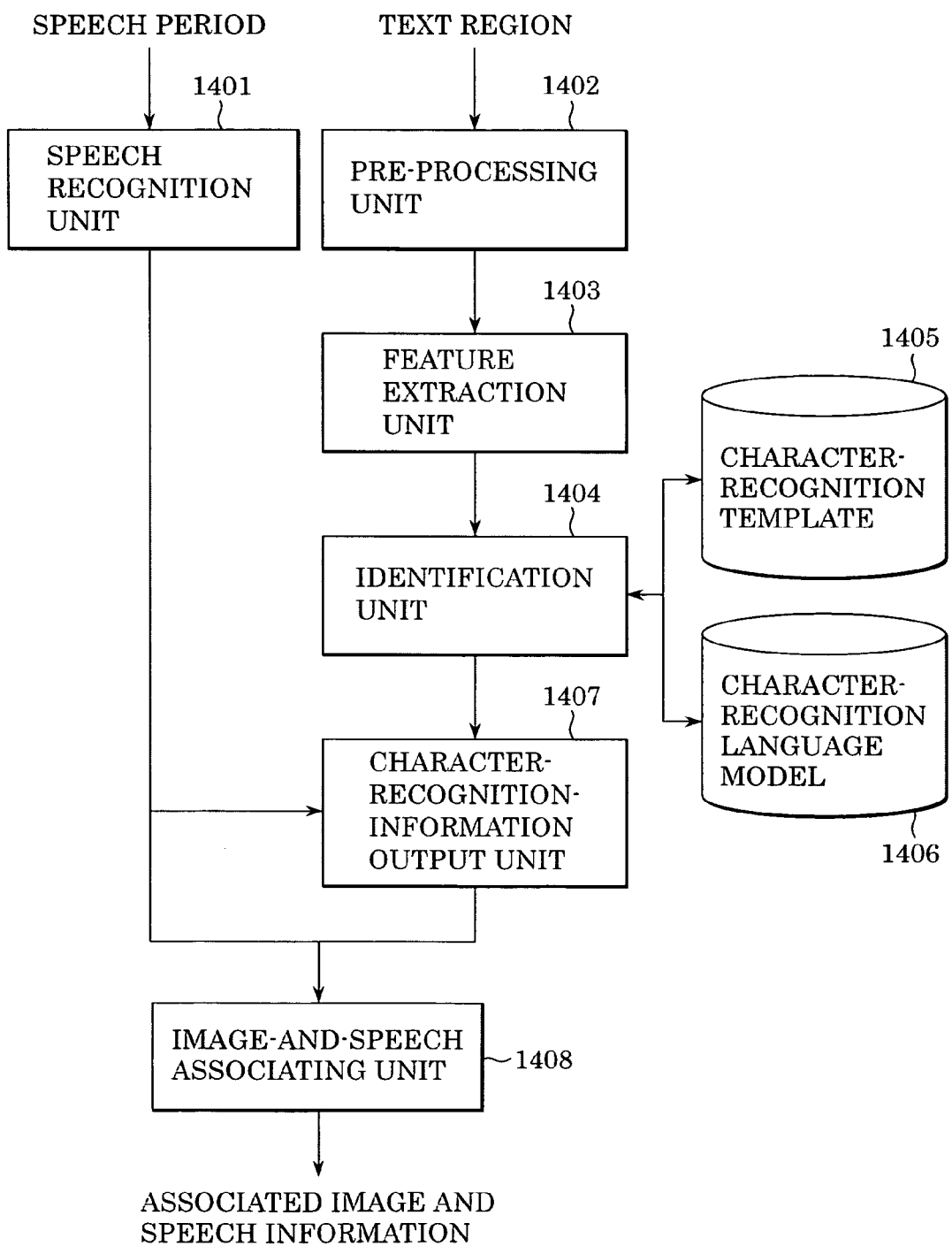
FIG. 26 is a block diagram showing the detailed modular structure of a character-recognition-information output unit according to a ninth embodiment of the present invention.

A speech recognition result may be used by a character-recognition-information output unit. FIG. 26 is a block diagram showing the detailed modular structure of a character-recognition-information output unit according to a ninth embodiment of the present invention. A speech recognition unit 1401 is equivalent to the speech recognition unit 204 shown in FIG. 3, and a pre-processing unit 1402, a feature extraction unit 1403, an identification unit 1404, a character-recognition template 1405, and a character-recognition language model 1406 are equivalent to the pre-processing unit 301, the feature extraction unit 302, the identification unit 303, the character-recognition template 305, and the character-recognition language model 306, respectively, shown in FIG. 4. An image-and-speech associating unit 1408 is equivalent to the image-and-speech associating unit 205 shown in FIG. 3. Therefore, a description of these modules is omitted.

A character-recognition-information output unit 1407 uses an identification result of the identification unit 1404 and a speech recognition result of the speech recognition unit 1401. For example, the eight character strings shown in FIG. 14A, given by RI12, RI13, RI21, RI23, RI32, RI33, RI41, and RI43, which are not included in the results shown in FIG. 14B, are not regarded as character candidates. These eight character strings need not undergo the calculation described above in the fourth embodiment.

Figure 27:
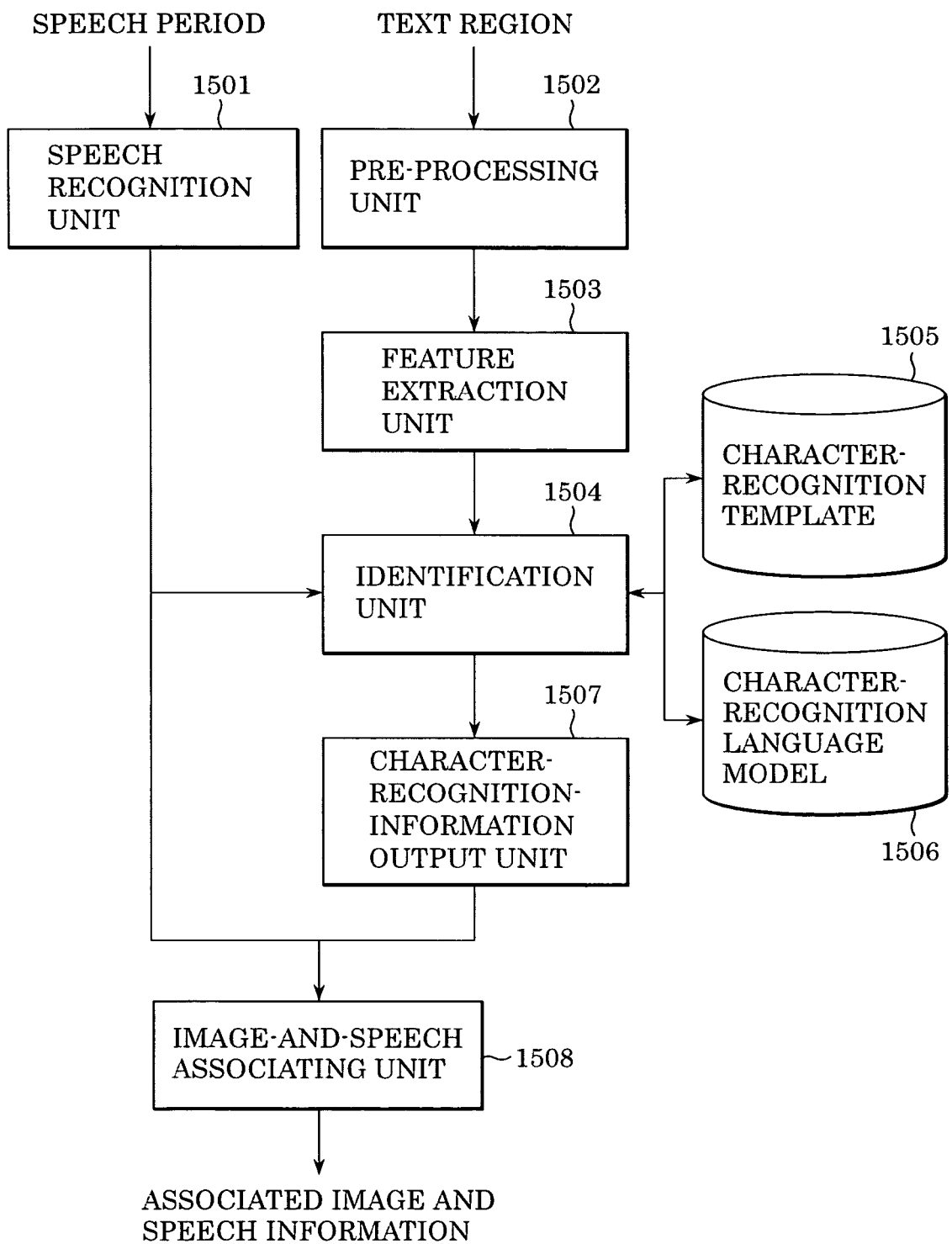
FIG. 27 is a block diagram showing the modular structure of a still image and speech recognition apparatus according to the ninth embodiment.

A speech recognition result may also be used by a character-recognition identification unit. FIG. 27 is a block diagram showing the modular structure of a still image and speech recognition apparatus according to the ninth embodiment. A speech recognition unit 1501 is equivalent to the speech recognition unit 204 shown in FIG. 3, and a pre-processing unit 1502, a feature extraction unit 1503, a character-recognition template 1505, a character-recognition language model 1506, and a character-recognition-information output unit 1507 are equivalent to the pre-processing unit 301, the feature extraction unit 302, the character-recognition template 305, the character-recognition language model 306, and the character-recognition-information output unit 304, respectively, shown in FIG. 4. An image-and-speech associating unit 1508 is equivalent to the image-and-speech associating unit 205 shown in FIG. 3. Therefore, a description of these modules is omitted.

An identification unit 1504 performs character recognition using two models, that is, the character-recognition template 1505 and the character-recognition language model 1506, and also using a speech recognition result of the speech recognition unit 1501. For example, when the twelve results shown in FIG. 14B are obtained as recognized speech, the identification unit 1504 refers to the character-recognition language model 1506 to identify these twelve character strings as the words to be recognized. Therefore, the amount of calculation to be performed by the identification unit is greatly reduced, and if a correct word is included in speech candidates, the character recognition performance can generally be improved compared to character recognition and speech recognition that are carried out independently.

Figure 28:
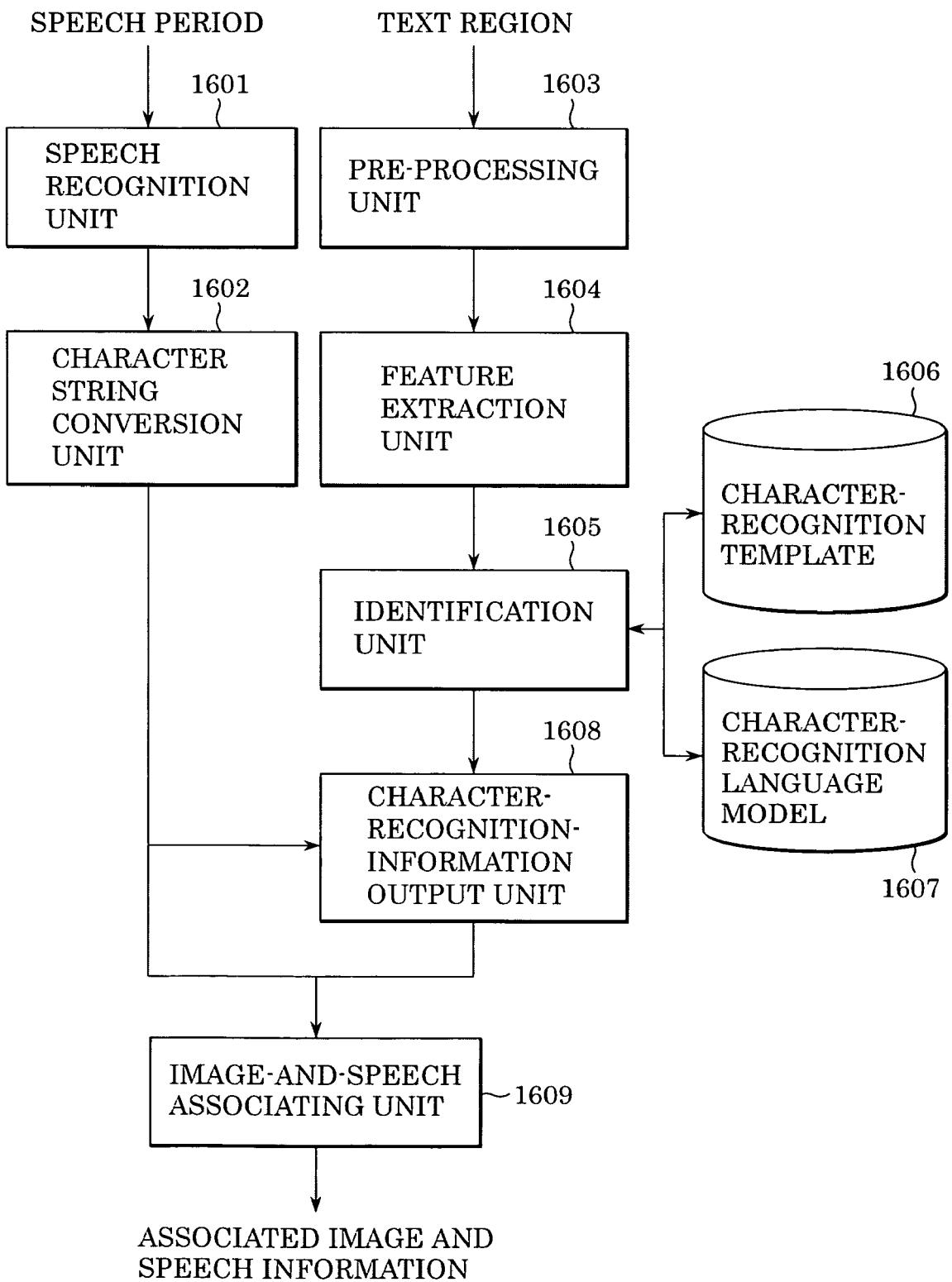
FIG. 28 is a block diagram showing the modular structure of a still image and speech recognition apparatus that converts recognized speech into a character string according to the ninth embodiment.

A speech recognition result may be converted into a character string, and the converted character string may be used by a character-recognition-information output unit. FIG. 28 is a block diagram showing the modular structure of a still image and speech recognition apparatus that converts recognized speech into a character string according to the ninth embodiment. A speech recognition unit 1601 is equivalent to the speech recognition unit 204 shown in FIG. 3, and a character string conversion unit 1602 is equivalent to the character string conversion unit 602 shown in FIG. 12. A pre-processing unit 1603, a feature extraction unit 1604, an identification unit 1605, a character recognition model 1606, and a character-recognition language model 1607 are equivalent to the pre-processing unit 301, the feature extraction unit 302, the identification unit 303, the character-recognition template 305, and the character-recognition language model 306, respectively, shown in FIG. 4. An image-and-speech associating unit 1609 is equivalent to the image-and-speech associating unit 205 shown in FIG. 3. Therefore, a description of these modules is omitted. In FIG. 28, the character conversion dictionary 603 shown in FIG. 12 necessary for the processing of the character string conversion unit 1602 is not shown.

A character-recognition-information output unit 1608 uses an identification result of the identification unit 1605 and a character string converted from a speech recognition result by the speech recognition unit 1602. For example, the seven character strings shown in FIG. 16A, given by RI12, RI21, RI23, RI32, RI33, RI41, and RI43, which are not included in the results shown in FIG. 16B, are not regarded as character candidates. These seven character strings need not undergo the calculation described above in the fourth embodiment.

Figure 29:
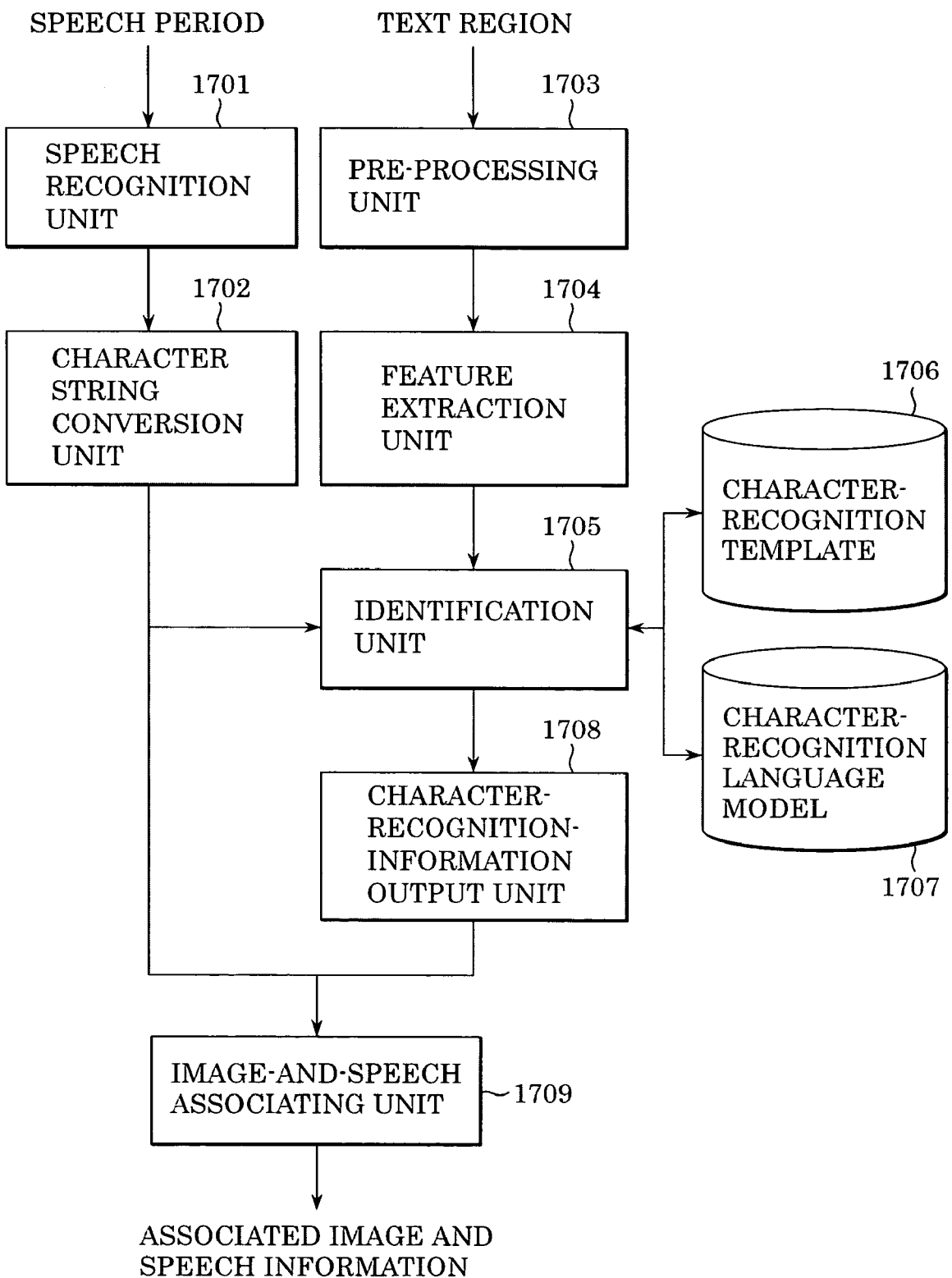
FIG. 29 is a block diagram showing the modular structure of a still image and speech recognition apparatus that performs character recognition using a character string obtained from recognized speech according to the ninth embodiment.

A character string generated from a speech recognition result may be used by a character-recognition identification unit. FIG. 29 is a block diagram showing the modular structure of a still image and speech recognition apparatus that performs character recognition using a character string obtained from recognized speech according to the ninth embodiment. A speech recognition unit 1701 is equivalent to the speech recognition unit 204 shown in FIG. 3, and a character string conversion unit 1702 is equivalent to the character string conversion unit 602 shown in FIG. 12. A pre-processing unit 1703, a feature extraction unit 1704, a character recognition model 1706, a character-recognition language model 1707, and a character-recognition-information output unit 1708 are equivalent to the pre-processing unit 301, the feature extraction unit 302, the character-recognition template 305, the character-recognition language model 306, and the character-recognition-information output unit 304, respectively, shown in FIG. 4. An image-and-speech associating unit 1709 is equivalent to the image-and-speech associating unit 205 shown in FIG. 3. Therefore, a description of these modules is omitted. In FIG. 29, the character conversion dictionary 603 shown in FIG. 12 necessary for the processing of the character string conversion unit 1702 is not shown.

An identification unit 1705 performs character recognition using two models, that is, the character recognition model 1706 and the character-recognition language model 1707, and also using a character string converted from a speech recognition result by the character string conversion unit 1702. For example, when the thirty-two character strings shown in FIG. 16B are obtained by speech recognition, the identification unit 1705 refers to the character recognition model 1706 and the character-recognition language model 1707 to identify these thirty-two character strings as the words to be recognized.

Therefore, the amount of calculation to be performed by the identification unit is greatly reduced, and if a correct word is included in character candidates as a result of speech recognition, the character recognition performance can generally be improved compared to character recognition and speech recognition that are carried out independently.

Figure 30:
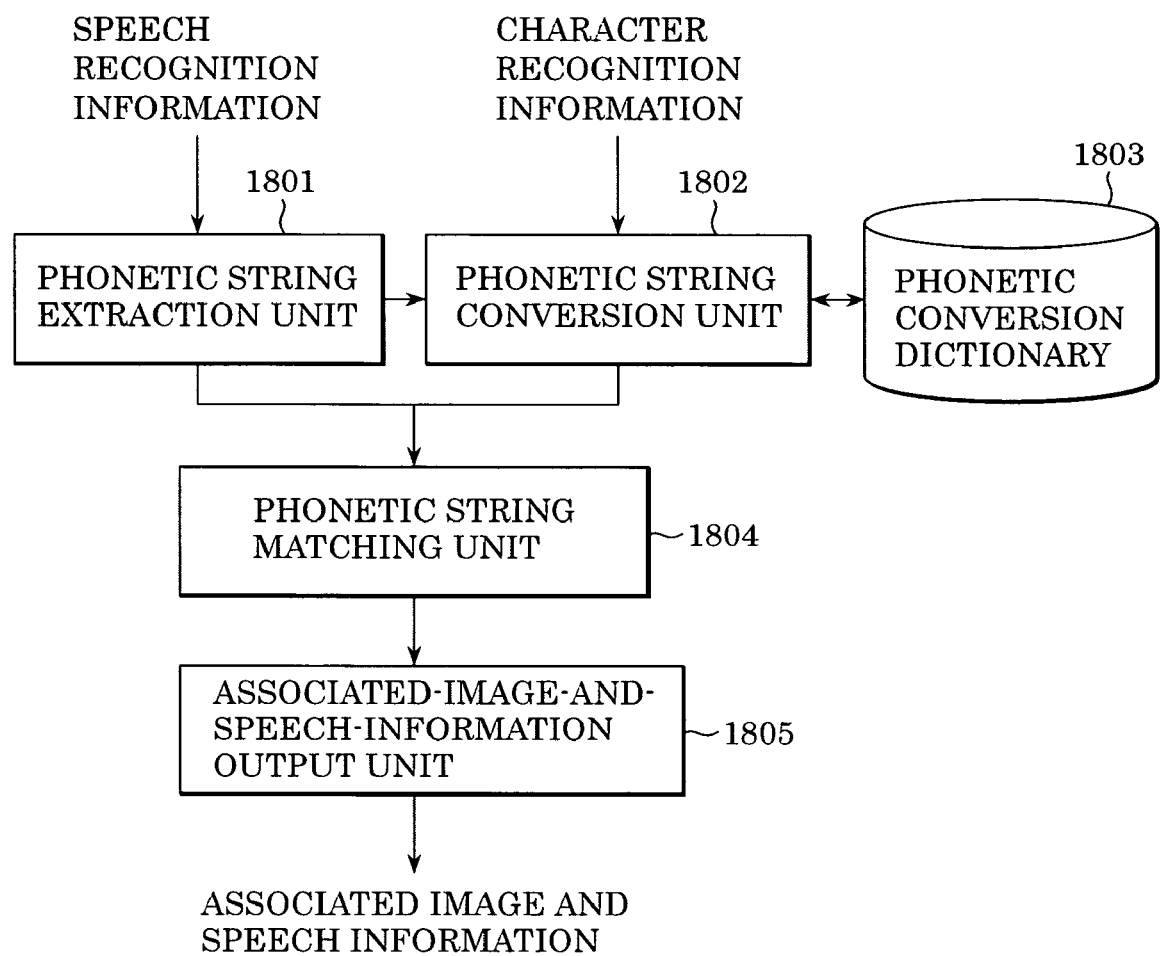
FIG. 30 is a block diagram showing the modular structure of a still image and speech recognition apparatus that converts a recognized character into a phonetic string using a phonetic string of recognized speech according to the ninth embodiment.

An image-and-speech associating unit may use a phonetic string of recognized speech to convert a recognized character into a phonetic string. FIG. 30 is a block diagram showing the modular structure of a still image and speech recognition apparatus that converts a recognized character into a phonetic string using a phonetic string of recognized speech according to the ninth embodiment. A phonetic string extraction unit 1801, a phonetic conversion dictionary 1803, a phonetic string matching unit 1804, and an associated-image-and-speech-information output unit 1805 are equivalent to the phonetic string extraction unit 503, the phonetic conversion dictionary 502, the phonetic string matching unit 504, and the associated-image-and-speech-information output unit 505, respectively, shown in FIG. 10, and a description of these modules is thus omitted.

A phonetic string conversion unit 1802 converts a recognized character into a phonetic string using character recognition information and a phonetic string extracted from recognized speech by the phonetic string extraction unit 1801. For example, when the twelve phonetic strings shown in FIG. 15B are extracted from recognized speech, the phonetic string conversion unit 1802 selects the recognized characters that can be converted into these twelve phonetic strings as phonetic string candidates, and converts only the selected characters into phonetic strings.

According to the ninth embodiment, therefore, a speech recognition result can be used for character recognition. Thus, the amount of calculation can be reduced, and the character recognition performance can be improved.

Tenth Embodiment

The still images shown in FIGS. 2A and 23 in the embodiments described above are simple. In the present invention, a more complex still image can be associated with speech. Such a complex still image is divided into a plurality of areas, and a text region is extracted from each of the divided image areas for character recognition.

Figure 8:
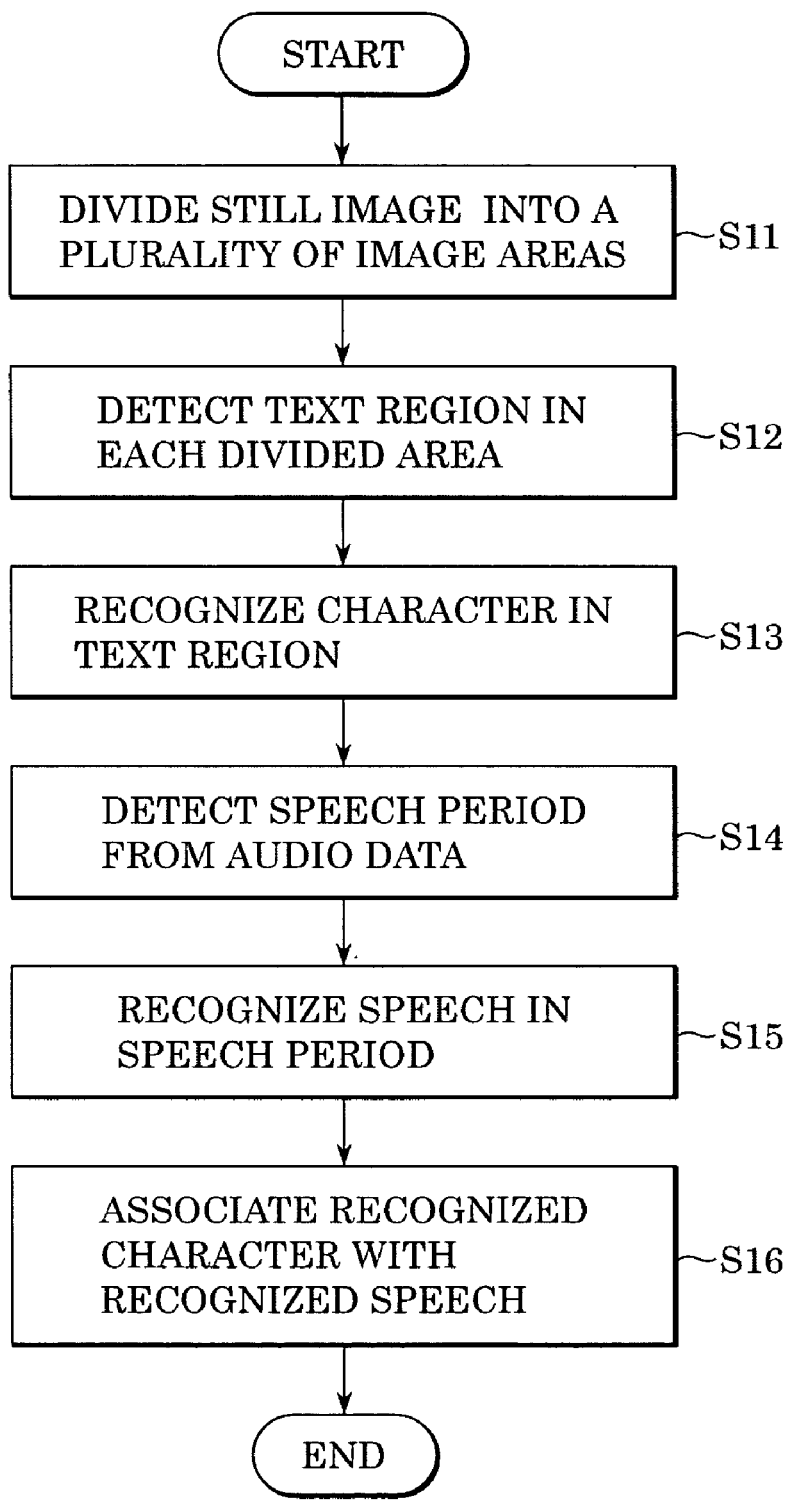
FIG. 8 is a flowchart showing the operation of a still image and speech recognition apparatus according to a tenth embodiment of the present invention.
Figure 31A:
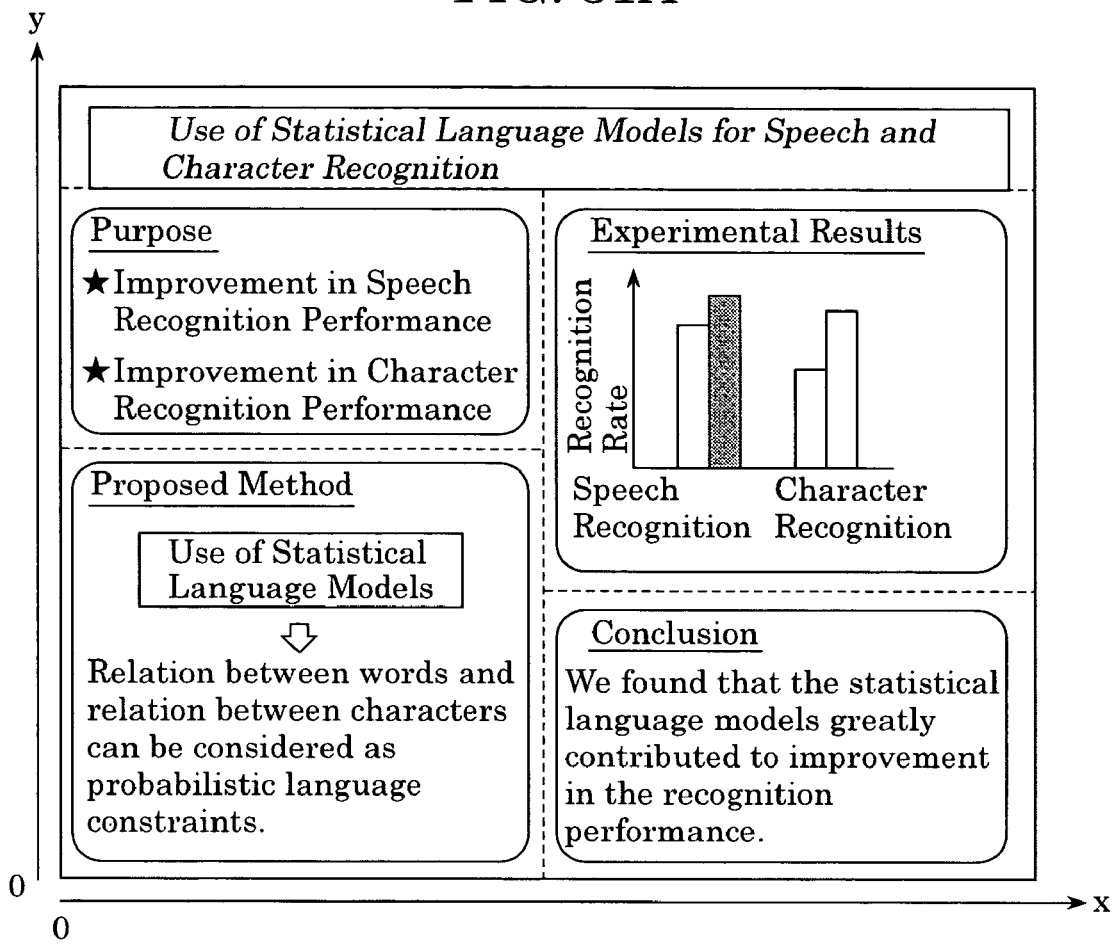
FIGS. 31A and 31B are illustrations of a complex still image and speech, respectively, to be associated with the still image.
Figure 31B:
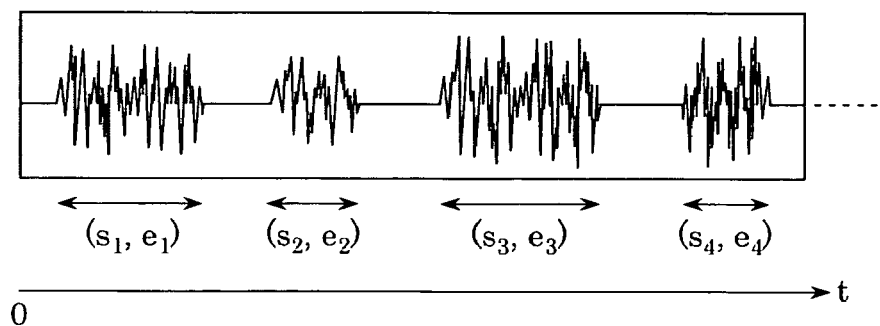

FIG. 31A shows a complex still image, and FIG. 31B shows speech to be associated with this still image. A still image and speech recognition apparatus according to a tenth embodiment of the present invention further includes an image dividing unit prior to the character detection unit 201 shown in FIG. 3, and will be described with reference to FIG. 3. FIG. 8 is a flowchart showing the operation of the still image and speech recognition apparatus according to the tenth embodiment.

The image dividing unit divides a single still image into a plurality of still image areas using any known technique (step S11).

Figures 34, 35:
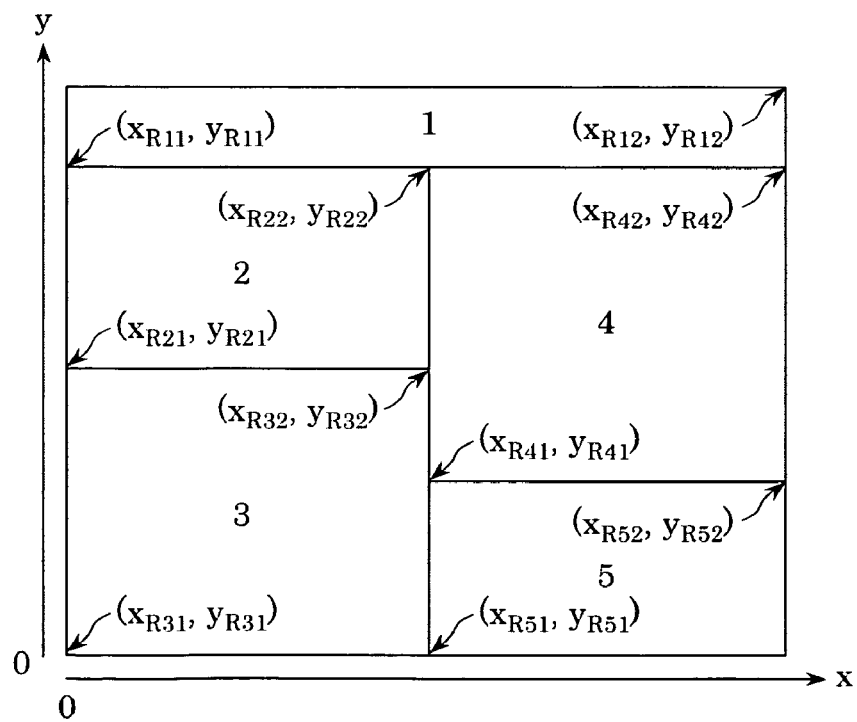
FIG. 34 is a table of area IDs assigned to the divided areas shown in FIG. 31A, and the coordinates of the divided areas.
FIG. 35 is a chart showing that the information shown in FIG. 34 is mapped to the illustration shown in FIG. 31A.

For example, the still image shown in FIG. 31A is divided into five areas, as indicated by dotted lines, by the image dividing unit. FIG. 34 shows area IDs assigned to the divided areas shown in FIG. 31A, and the coordinates of the divided areas. FIG. 35 is a chart showing that the information shown in FIG. 34 is mapped to the illustration shown in FIG. 31A.

Figure 36:
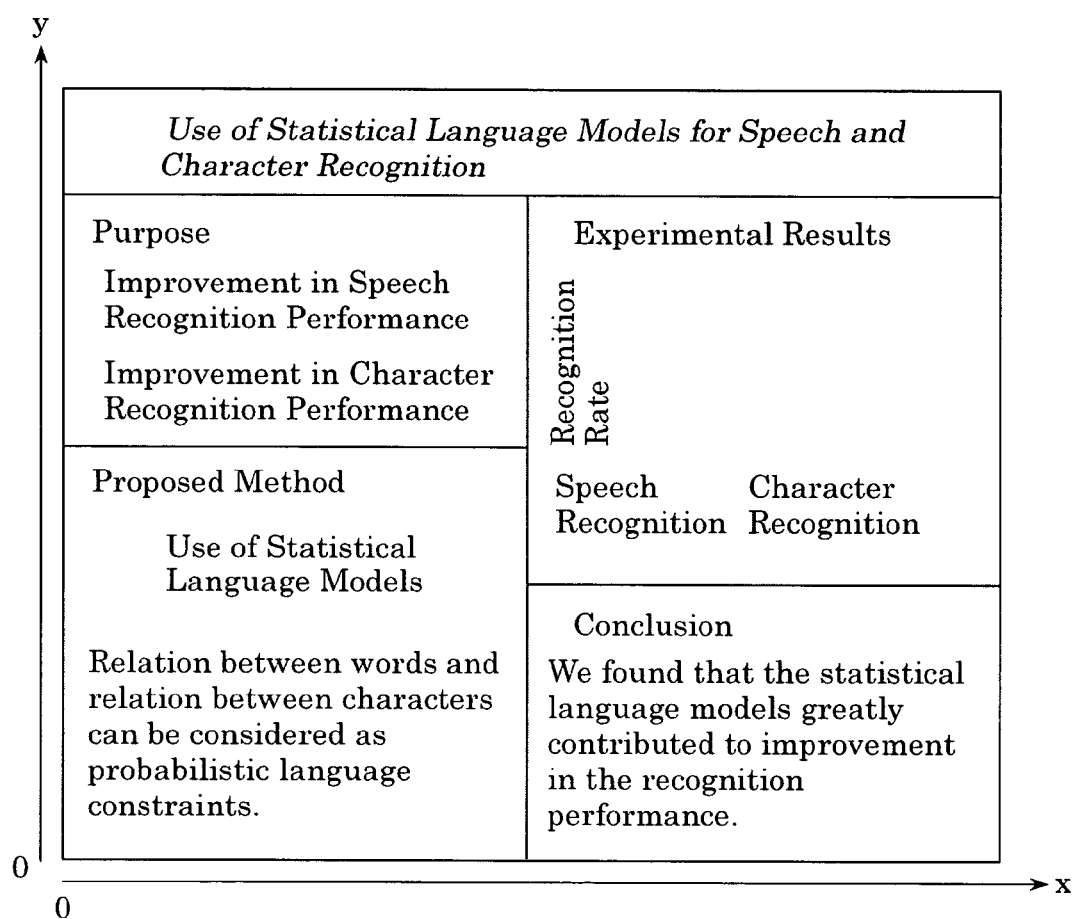
FIG. 36 is a chart showing text regions detected by a character detection unit 1902.

The character detection unit 201 detects a text region in each divided image (step S12). FIG. 36 shows text regions detected by the character detection unit 201. The character recognition unit 202 performs character recognition on the text region shown in FIG. 36 (step S13). The speech shown in FIG. 31B is detected by the speech detection unit 203 (step S14), and is recognized by the speech recognition unit 204 (step S15). The character recognition process in steps S11 to S13 and the speech recognition process in steps S14 and S15 may be performed in parallel, or either process may be performed first.

Figure 38:
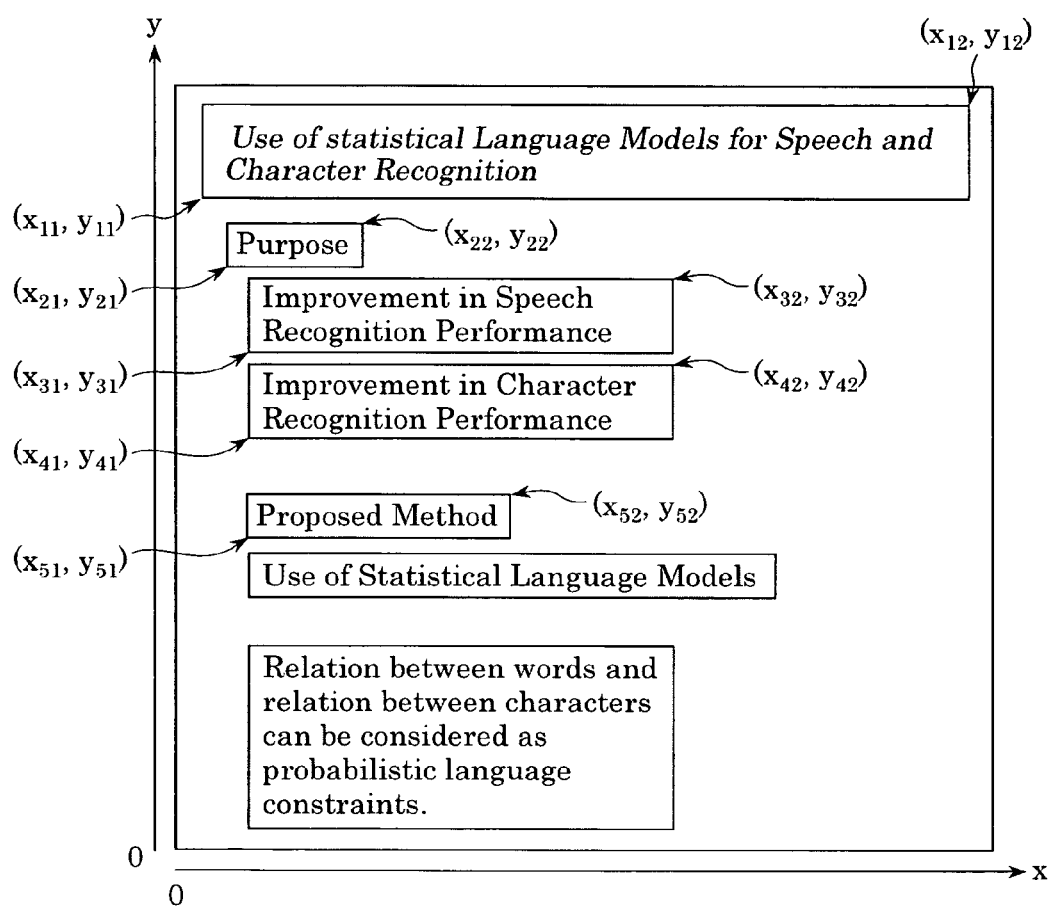
FIG. 38 is a chart showing the character recognition information mapped to the detected text regions shown in FIG. 36.

FIGS. 37A and 37B show character recognition information and speech recognition information obtained as a result of character recognition and speech recognition, respectively. The coordinate data of the character recognition information is indicated by two point coordinates as a rectangular region shown in FIG. 38. FIG. 38 shows the character recognition information mapped to the detected text regions shown in FIG. 36. The image-and-speech associating unit 205 associates recognized characters shown in FIG. 37A with recognized speech shown in FIG. 37B in a similar way to that described above in the embodiments described above, and associated image and speech information is obtained (step S16).

In this embodiment, the still image is divided only using still-image information. The still image may be divided using a speech period and speech recognition information. Specifically, the still image may be divided into areas depending upon the number of speech periods, and the still image may be divided into more areas if the likelihood of the overall speech recognition result is high.

According to the tenth embodiment, therefore, a still image is divided into areas. Thus, text regions of a complex still image can be associated with speech.

Eleventh Embodiment

The speech shown in FIG. 2B or 31B described above in the aforementioned embodiments includes sufficient silent intervals between speech periods, and the speech content is simple and is identical to any text region of a still image. However, actually, the speech content is not always identical to text content. In some cases, the speech related to a certain text region is not given, or speech having no relation with text is included. In other cases, speech related to a plurality of text regions is continuously given without sufficient silent intervals, or non-speech content such as noise or music is included. In the present invention, a speech period is precisely extracted, and recognized speech is flexibly matched to recognized text, thus allowing more general speech to be associated with a still image.

If non-speech portions, such as noise and music, are inserted in input speech, first, the speech is divided into a plurality of segments. Then, it is determined whether each speech segment is a speech segment or a non-speech segment, and speech periods are detected.

A still image and speech recognition apparatus according to an eleventh embodiment of the present invention further includes a speech dividing unit prior to the speech detection unit 203 shown in FIG. 3, and will be described with reference to FIG. 3.

The speech dividing unit divides speech into a plurality of segments. Specifically, spectrum data of an audio signal is determined by frame processing, and it is determined whether or not a target frame is set as a segment boundary based on the similarity of the spectrum of the plurality of frames.

The speech detection unit 203 determines whether or not each divided segment includes speech, and detects a speech period if speech is included. Specifically, GMMs (Gaussian Mixture Models) of speech segments and non-speech segments are generated in advance. Then, it is determined whether or not a certain segment includes speech using the spectrum data of input speech obtained by the frame processing and the generated GMM of this segment. If it is determined that a segment does not include speech, this segment is not subjected to speech recognition. If a segment includes speech, the speech detection unit 203 detects a speech period, and inputs the detected speech period to the speech recognition unit 204.

The number of segments may be determined depending upon speech using a standard likelihood relating to the speech spectrum across segments or at a segment boundary. Alternatively, the number of segments may be determined using still image division information, text region information, or character recognition information. Specifically, speech may be divided into segments using as the still image division information or the text region information depending upon the number of divided image areas or the number of text regions.

Figure 39:
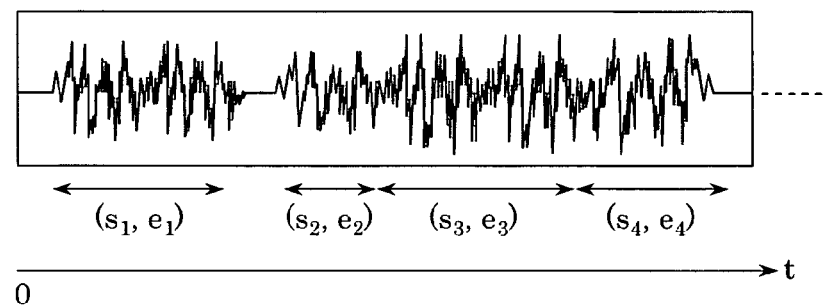
FIG. 39 is an illustration of speech related to the still image shown in FIG. 31A.

FIG. 39 shows speech related to the still image shown in FIG. 31A. In this example, the speech content is not identical to the content of the text regions shown in FIG. 36, and "in the past studies, . . . " in the third speech period shown in FIG. 39 has no relation to any text region of the still image. As shown in FIG. 39, no sufficient silent intervals are not inserted in the second to fourth speech periods.

When the speech shown in FIG. 39 is given, the speech dividing unit or the speech detection unit 203 is difficult to correctly divide the speech into segments corresponding to the text regions of the still image or to correctly detect the speech periods. In this case, the speech recognition unit 204 performs speech recognition on the speech period detected by the speech detection unit 203, and the speech period determined by the speech detection unit 203 is further divided based on a speech recognition result, if necessary.

FIGS. 41A and 41B are tables of the character recognition information and the speech recognition information, respectively, of the illustrations shown in FIGS. 31A and 31B. For example, the speech recognition unit 204 may perform large vocabulary continuous speech recognition on speech without sufficient silent intervals to determine sentence breaks by estimating the position of commas and periods. Thus, the speech can be divided into speech periods shown in FIG. 41B. If the speech related to the content of a text region is not included, or if speech having no relation to any text region is given, a speech recognition result and a character recognition result can be associated with each other by partial matching.

As described above in the seventh embodiment, an important word may be detected from recognized text. The speech recognition unit 204 may perform word-spotting speech recognition using the detected important word as a keyword. Thus, recognized text and recognized speech can be more directly associated with each other. FIG. 42 shows speech recognition information using word-spotting speech recognition in which important words are extracted as keywords. In the example shown in FIG. 42, important words "speech recognition", "character recognition", "statistical language model", "purpose", etc., extracted as keywords from recognized characters are subjected to word-spotting speech recognition. In FIG. 42, "*" indicates a speech period of a word other than these keywords, and "NO_RESULTS" indicates that no keyword is matched to the corresponding speech period. By matching a word-spotting speech recognition result to an important word obtained from recognized text, a text region and speech can be associated with each other.

According to the eleventh embodiment, therefore, text regions and speech can be associated with each other if non-speech portions such as noise and music are included in speech, if no sufficient silent intervals are inserted, if the speech related to a certain text region is not given, or if speech having no relation with any text region is given.

Twelfth Embodiment

In the tenth embodiment, text regions of a complex still image can be associated with speech by dividing the still image into plurality of areas. In a twelfth embodiment of the present invention, a still image is divided into still image areas a plurality of times so that the still image areas divided a different number of times have a hierarchical structure, thus realizing more flexible association.

Figure 43A:
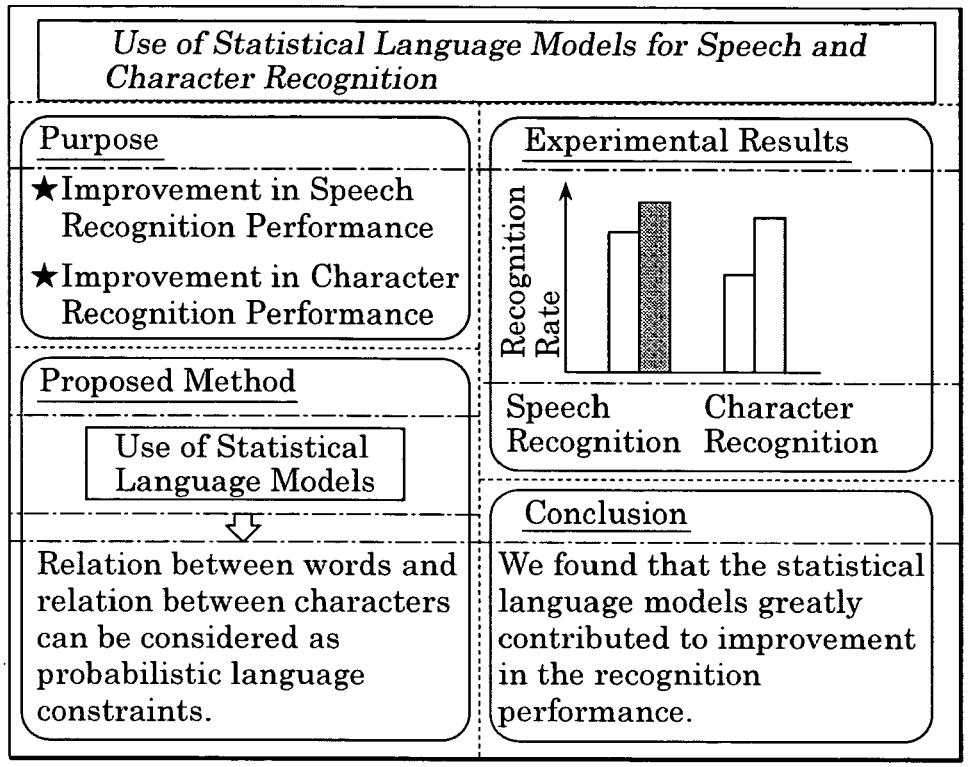
FIGS. 43A and 43B are illustrations of a still image as a result of division of the divided image areas shown in FIG. 31A.
Figure 43B:
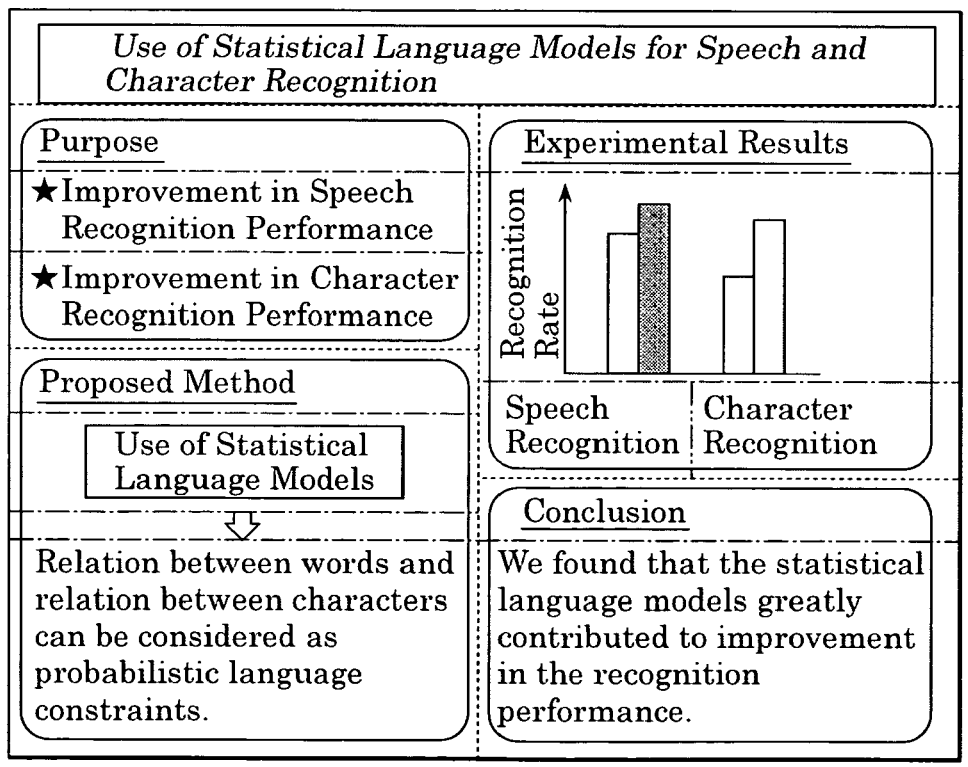

FIG. 43A shows a still image in which the divided still image areas shown in FIG. 31A are divided into subareas (as indicated by one-dot chain lines), and FIG. 43B shows a still image in which the divided still image areas shown in FIG. 43A are divided into subareas (as indicated by two-dot chain lines). The number of divisions can be controlled by changing a reference for determining whether or not division is performed (e.g., a threshold relative to a likelihood standard). As shown in FIGS. 43A and 43B, hierarchical divisions are performed.

Figure 44:
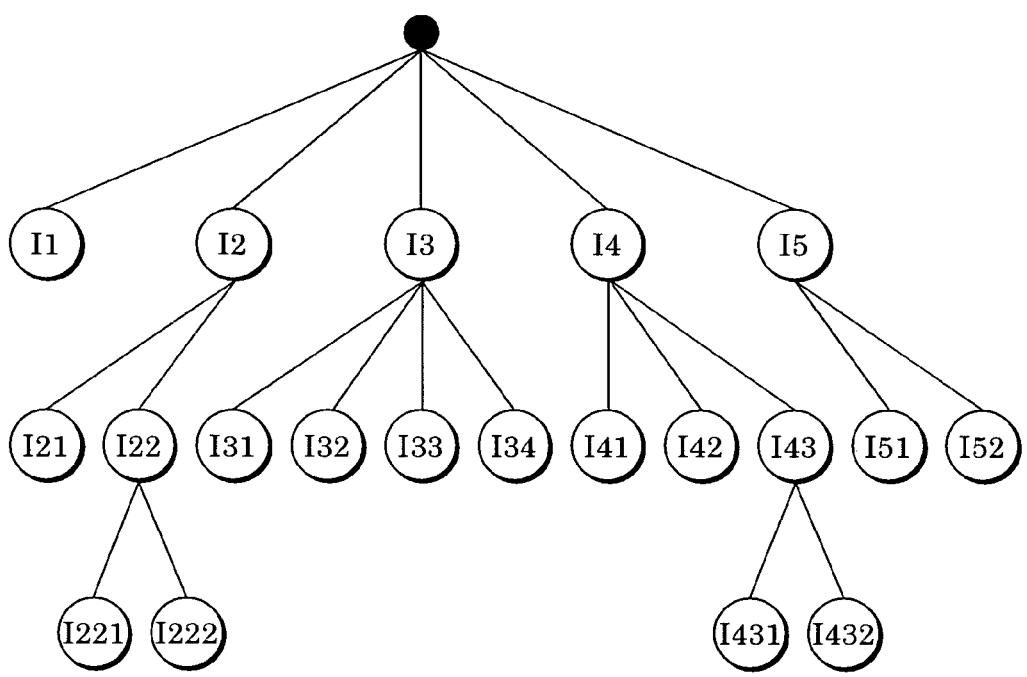
FIG. 44 is a hierarchical tree diagram of a divided still image.

FIG. 44 shows a hierarchical tree structure of a divided still image. In FIG. 44, a black circle is a root node indicating the overall still image. Five nodes I1 to I5 indicate the divided still image areas shown in FIG. 31A; the node I1 shows the image area including "Use of Statistical Language Models for Speech and Character Recognition" shown in FIG. 31A, the node I2 shows the image area including "Purpose", "Improvement in Speech Recognition Performance", and "Improvement in Character Recognition Performance", the node I3 shows the image area including "Proposed Method", "Use of Statistical Language Models", and "Relation between words and relation between characters can be . . . ", the node I4 shows the image area including "Experimental Results", "Recognition Rate", "Speech Recognition", and "Character Recognition", and the node I5 shows the image area including "Conclusion", and "We found that the statistical language models . . . ".

Eleven nodes I21 to I52 in the layer one layer below indicate the divided still image areas shown in FIG. 43A; the node I21 shows the image area including "Purpose", the node I22 shows the image area including "Improvement in Speech Recognition Performance" and "Improvement in Character Recognition Performance", the node I31 shows the image area including "Proposed Method", the node I32 shows the image area including "Use of Statistical Language Models", and the node I33 shows the image area including a white thick downward arrow. The image area indicated by the node I1 is not divided in FIG. 43A, and the node I1 has no branched nodes.

Four nodes I221 to I432 in the bottom layer indicate the divided still image areas shown in FIG. 43B, the node I221 shows the image area including "Improvement in Speech Recognition Performance", the node I222 shows the image area including "Improvement in Character Recognition Performance", the node I431 shows the image area including "Speech Recognition", and the node I432 shows the image area including "Character Recognition".

Figure 45A:
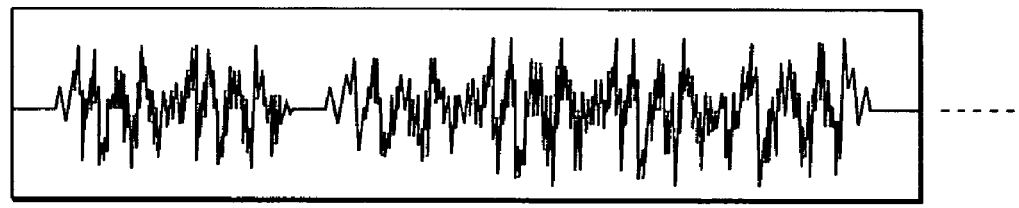
FIGS. 45A to 45D are illustrations of hierarchical speech divisions.
Figure 45B:
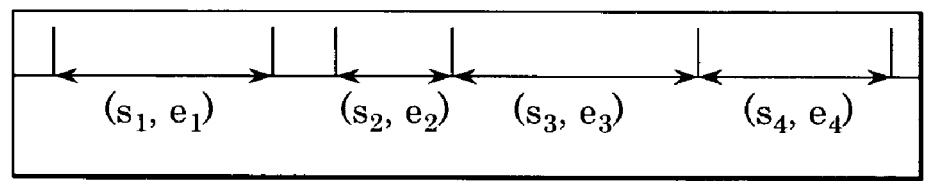
Figure 45C:
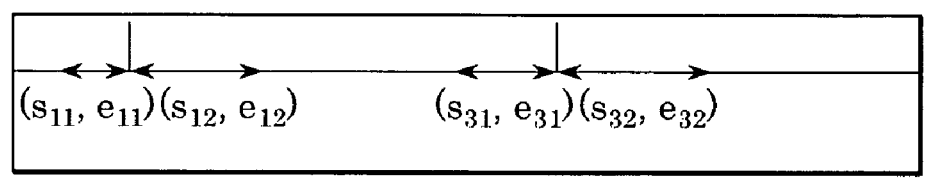
Figure 45D:
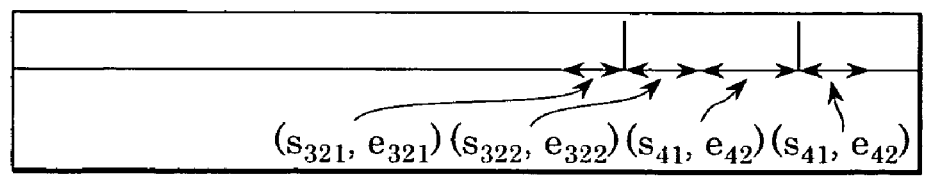
Figure 46:
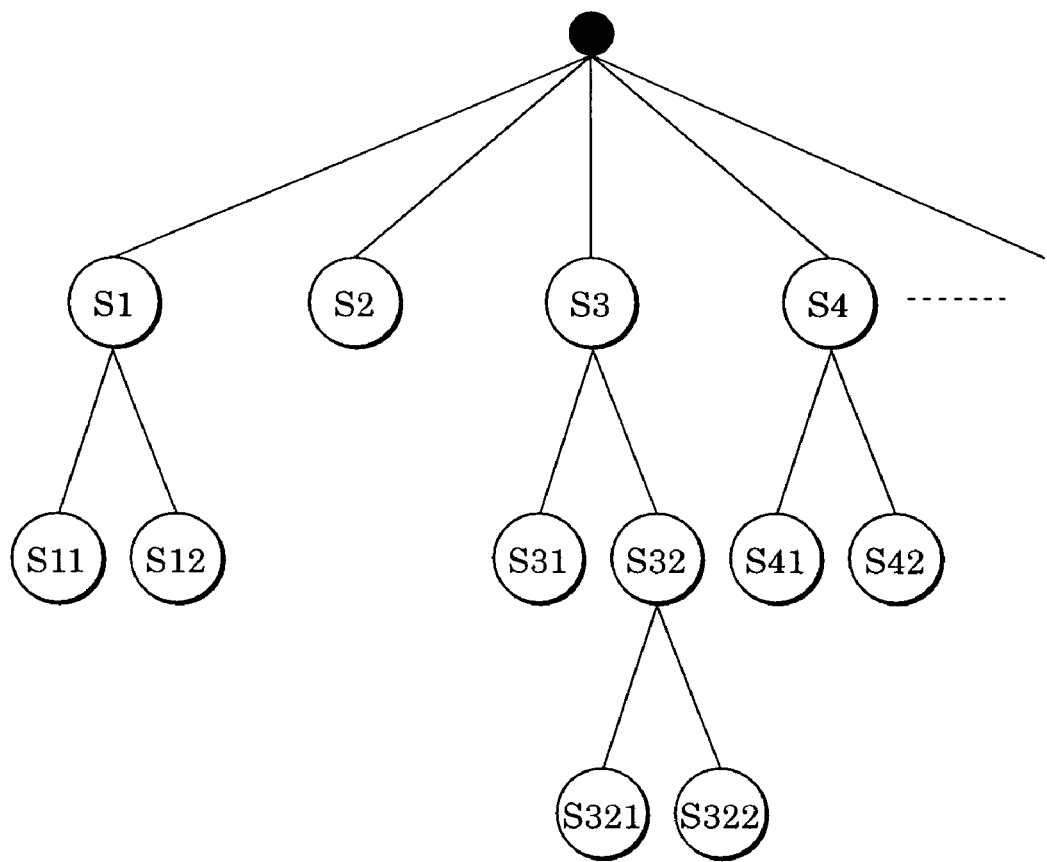
FIG. 46 is a hierarchical tree diagram of the divided speech shown in FIGS. 45A to 45D.

In the twelfth embodiment, speech is hierarchically divided into segments, although speech is not necessarily hierarchically divided into segments to detect speech periods. FIGS. 45A to 45D show hierarchical speech divisions. FIG. 45A shows a speech waveform, and FIGS. 45B to 45D show first to third speech divisions, respectively. FIG. 46 shows a hierarchical tree structure of the divided speech shown in FIGS. 45B to 45D.

A text region is extracted from the image areas indicated by the nodes shown in FIG. 44 using any method described above to perform character recognition, and character recognition information is obtained. A speech period is detected from the speech segments indicated by the nodes shown in FIG. 46 using any method described above to perform speech recognition, and speech recognition information is obtained.

The speech recognition information is associated with the obtained character recognition information using any method described above. One associating method utilizing the features of the tree structure is to associate the still image with speech in the order from the high-layer nodes to the low-layer nodes, while the associated high-layer nodes are used as constraints by which the low-layer nodes are associated. For example, when speech at a low-layer node is associated, speech included in the speech period associated at a high-layer node is selected by priority or restrictively. Alternatively, a longer speech period may be selected by priority at a higher-layer node, and a shorter speech period may be selected by priority at a lower-layer node.

Figure 48:
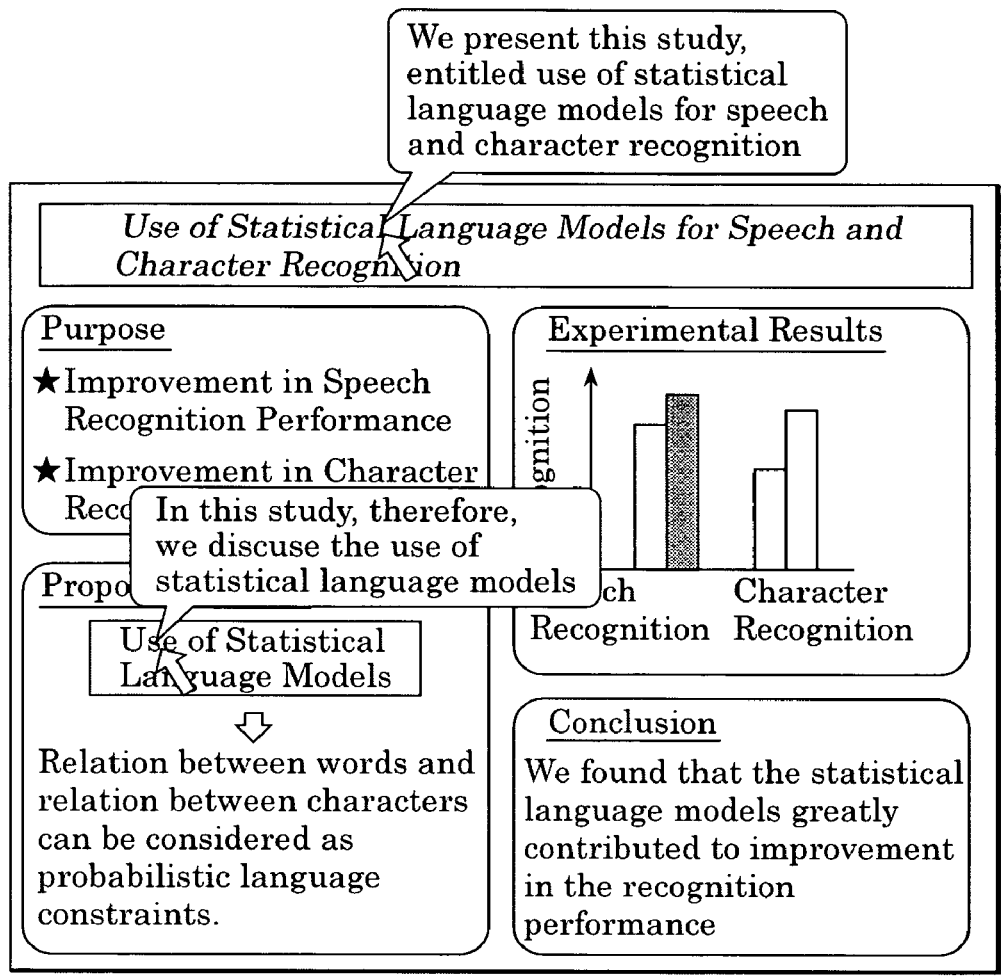
FIG. 48 is an illustration of the still image shown in FIG. 31A associated with speech according to an application.

FIG. 47 is a table showing the correspondence of tree nodes of a still image and a plurality of divided speech candidates. In FIG. 47, "NULL" indicates no candidate speech period, and, particularly, the node 133 is not associated with any speech period. FIG. 48 shows the still image shown in FIG. 31A associated with speech according to an application. In FIG. 48, when a mouse cursor (an arrow cursor) is brought onto a certain character portion of the still image, the audio data associated with this character is reproduced and output from an audio output device such as a speaker.

Figure 32A:
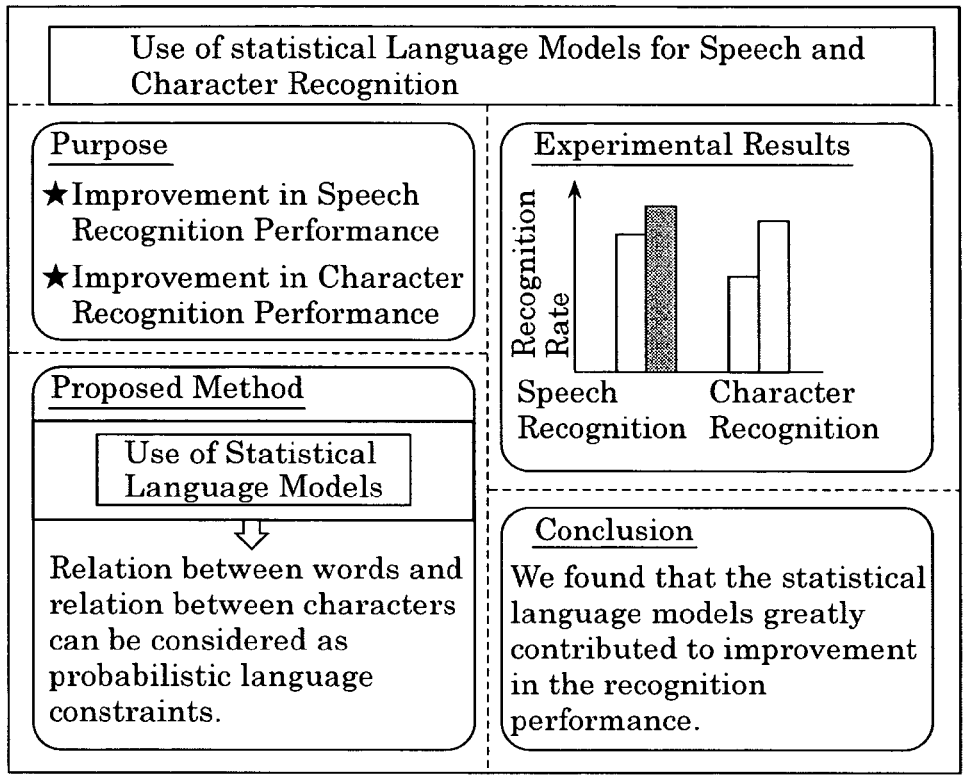
FIGS. 32A and 32B are illustrations of the still image shown in FIGS. 43A and 43B associated with speech according to another application.
Figure 32B:
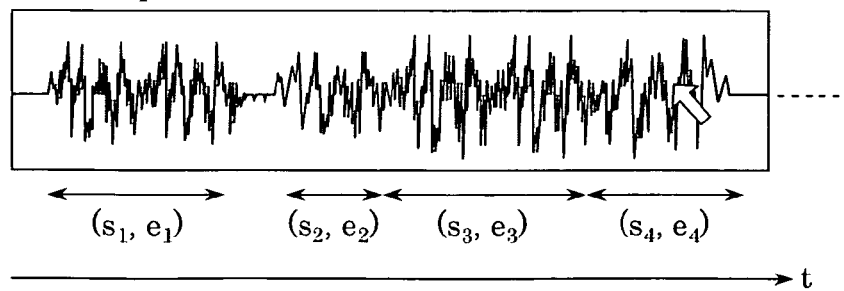

Conversely, the speech may be reproduced from the beginning or for a desired duration specified by a mouse or the like, and the still image area corresponding to the reproduced speech period may be displayed with a frame. FIGS. 32A and 32B are illustrations of the still image and the speech, respectively, shown in FIGS. 43A and 43B, according to another application. When the user brings a mouse cursor (or an arrow cursor) onto the speech period (the duration from s4 to e4) where the speech "in this study, therefore, we discuss . . . " is recognized, the text region corresponding to this speech period is displayed with a frame. Therefore, the user can understand which portion of the still image corresponds to the output speech.

Figure 49:
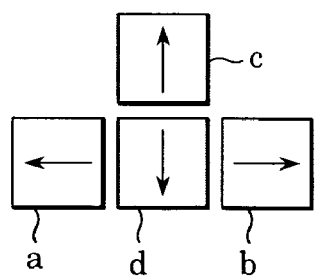
FIG. 49 is a diagram showing a user interface used for a still-image tree and a plurality of speech candidates.

The tree structure of a still image and association of the still image with a plurality of speech candidates in the twelfth embodiment are particularly useful when an error can be included in the associated still image and speech. FIG. 49 shows a user interface used for a still-image tree and a plurality of speech candidates. In FIG. 49, a left arrow key (a) is allocated to speech output of a high-layer candidate, and a right arrow key (b) is allocated to speech output of a low-layer candidate. An up arrow key (C) is allocated to speech output of the first-grade candidate after moving to a parent node of the still image, and a down arrow key (d) is allocated to output speech of the first-grade candidate after moving to a child node of the still image. When the user selects (or clicks) a desired image area using the mouse or the like, the text region corresponding to the bottom node of an image area included in the selected area is surrounded by a frame and is displayed on the screen, and speech of the first-grade candidate is output. If the speech or image area is not the desired one, another candidate may be efficiently searched and selected simply using the four arrow keys.

Thirteenth Embodiment

In the embodiments described above, recognized text or important words extracted from the recognized text are matched to recognized speech. In this case, character strings obtained from the recognized text and character strings obtained from the recognized speech must be at least partially identical. For example, the speech "title" is not associated with a recognized word "subject", or the speech "hot" is not associated with a recognized word "summer". In a thirteenth embodiment of the present invention, such a still image and speech can be associated with each other.

Figure 50A:
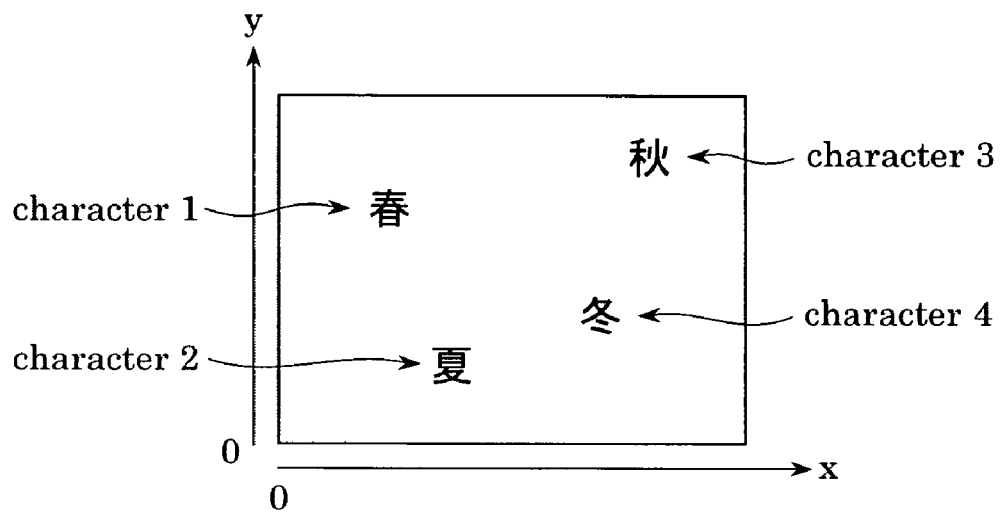
FIGS. 50A and 50B are illustrations of a still image and speech, respectively, according to a thirteenth embodiment of the present invention.
Figure 50B:
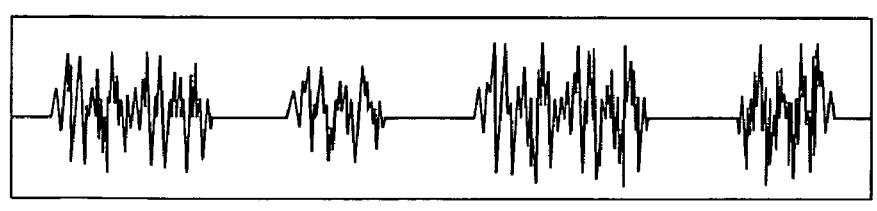

FIGS. 50A and 50B show a still image and speech according to the thirteenth embodiment, respectively. Words included in the still image, indicated by characters 1, 2, 3, and 4 shown in FIG. 50A, are not included in the speech shown in FIG. 50B. In this case, the recognized words and the recognized speech are converted into abstracts or concepts, and matching is performed at the conceptual level. Thus, a still image including the words shown in FIG. 50A can be associated with the speech shown in FIG. 50B.

Figure 51:
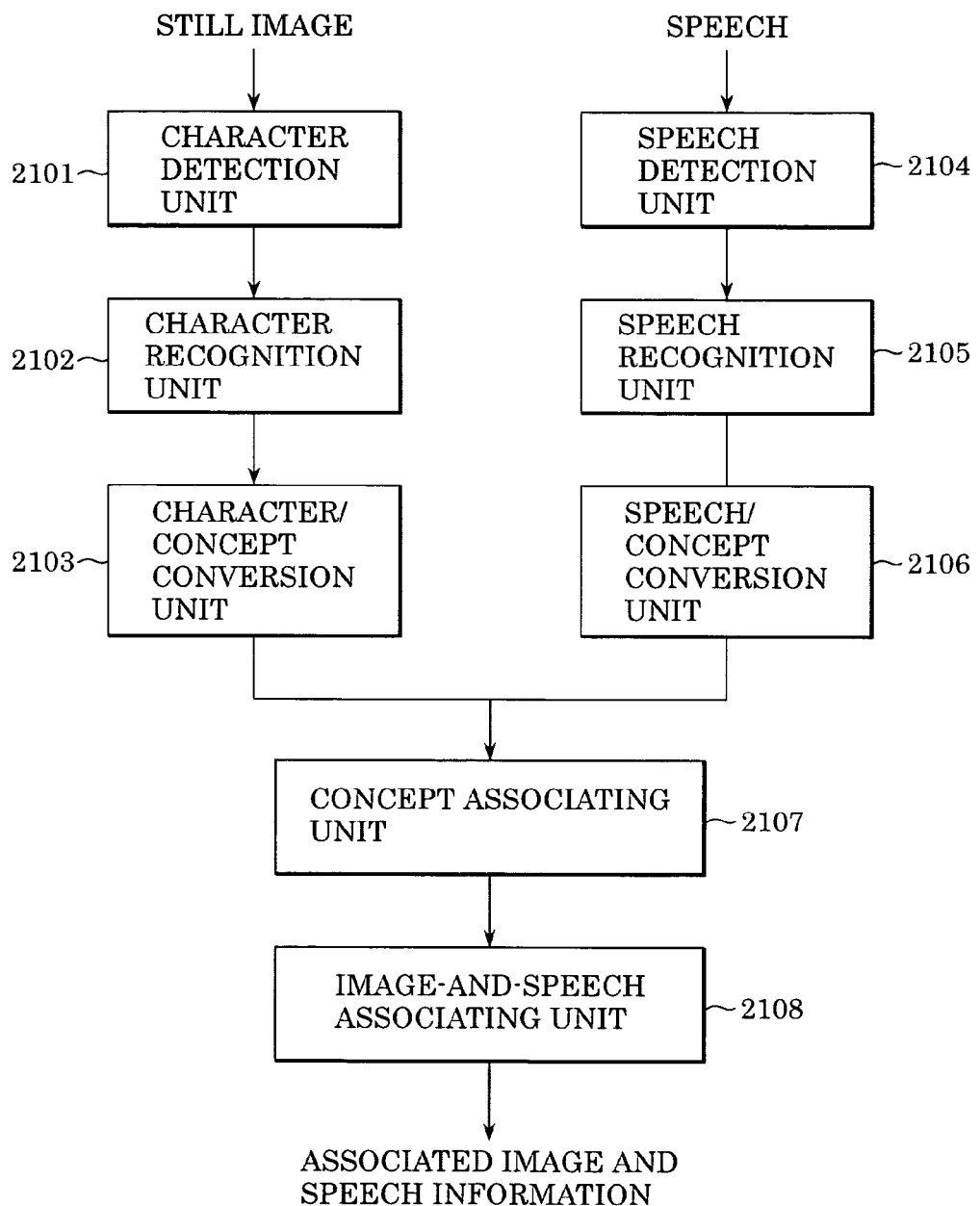
FIG. 51 is a block diagram showing the modular structure of a still image and speech recognition apparatus having character-to-concept and speech-to-concept conversion functions according to the thirteenth embodiment.

FIG. 51 is a block diagram showing the modular structure of a still image and speech recognition apparatus having character-to-concept and speech-to-concept conversion functions according to the thirteenth embodiment. A character detection unit 2101, a character recognition unit 2102, a speech detection unit 2104, and a speech recognition unit 2105 are equivalent to the corresponding modules of the still image and speech recognition apparatus shown in FIG. 3, and a description of these modules is thus omitted. A character-to-concept conversion unit 2103 abstracts a recognized character obtained by the character recognition unit 2102 into a predetermined concept.

A speech-to-concept conversion unit 2106 abstracts recognized speech obtained by the speech recognition unit 2105 into a predetermined concept. A concept associating unit 2107 matches the concept determined by the character-to-concept conversion unit 2103 to the concept determined by the speech-to-concept conversion unit 2106. An image-and-speech associating unit 2108 associates the still image with the speech based on the conceptual-level matching by the concept associating unit 2107.

For example, four concepts, e.g., $SPRING, $SUMMER, $AUTUMN, and $WINTER, are defined, and the concepts are defined by character strings as $SPRING={character 1, spring, cherry, ceremony, . . . }, $SUMMER={character 2, summer, hot, . . . }, $AUTUMN={character 3, autumn, fall, leaves, . . . }, and $WINTER={character 4, winter, cold, . . . }. FIG. 52A is a table showing character-to-concept conversion results and the coordinate data of the still image shown in FIG. 50A, and FIG. 52B is a table showing speech-to-concept conversion results and the time data of the speech shown in FIG. 50B. In this example, speech in Japanese can be recognized.

The concept associating unit 2107 associates the concepts $SPRING, $SUMMER, etc., of the recognized text and the recognized speech, and the image-and-speech associating unit 2108 associates the image area of the character 1 with the speech "it is an entrance ceremony . . . ", the image area of the character 2 with the speech "it becomes hotter . . . ", the image area of the character 3 with the speech "viewing colored leaves . . . ", and the image area of the character 4 with the speech "With the approach . . . ".

According to the thirteenth embodiment, therefore, matching is performed based on the conceptual level rather than the character string level, and a text region can be associated with speech in a case where character strings recognized in characters recognition are not completely matched to character strings obtained from speech recognition.

Fourteenth Embodiment

In the embodiments described above, while only a text portion of a still image can be associated with speech, non-text objects of the still image, e.g., figures such as circles and triangles, humans, vehicles, etc., are not associated with speech. In a fourteenth embodiment of the present invention, such non-text objects of a still image can be associated with speech.

Figure 53A:
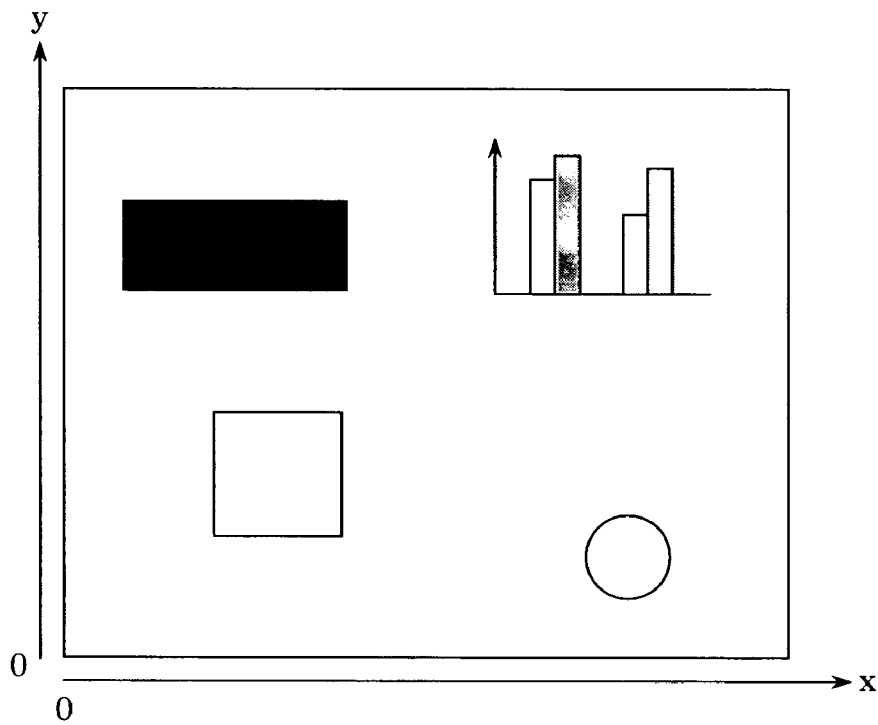
FIGS. 53A and 53B are illustrations of a still image and speech to be associated with the still image according to a fourteenth embodiment of the present invention.
Figure 53B:
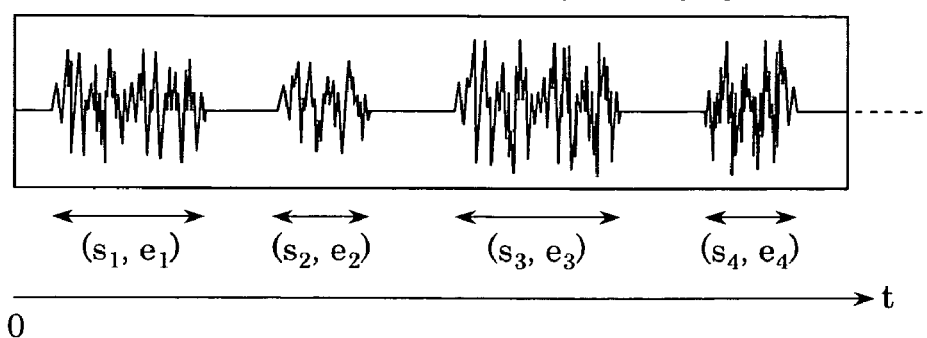

FIGS. 53A and 53B show a still image and speech to be associated with the still image, respectively, according to the fourteenth embodiment. The still image shown in FIG. 53A does not include a character string. In this case, object recognition is performed instead of character recognition as in the embodiments described above, and the recognized objects are matched to recognized speech. Thus, a still image including the objects shown in FIG. 53A can be associated with the speech shown in FIG. 53B.

Figure 54:
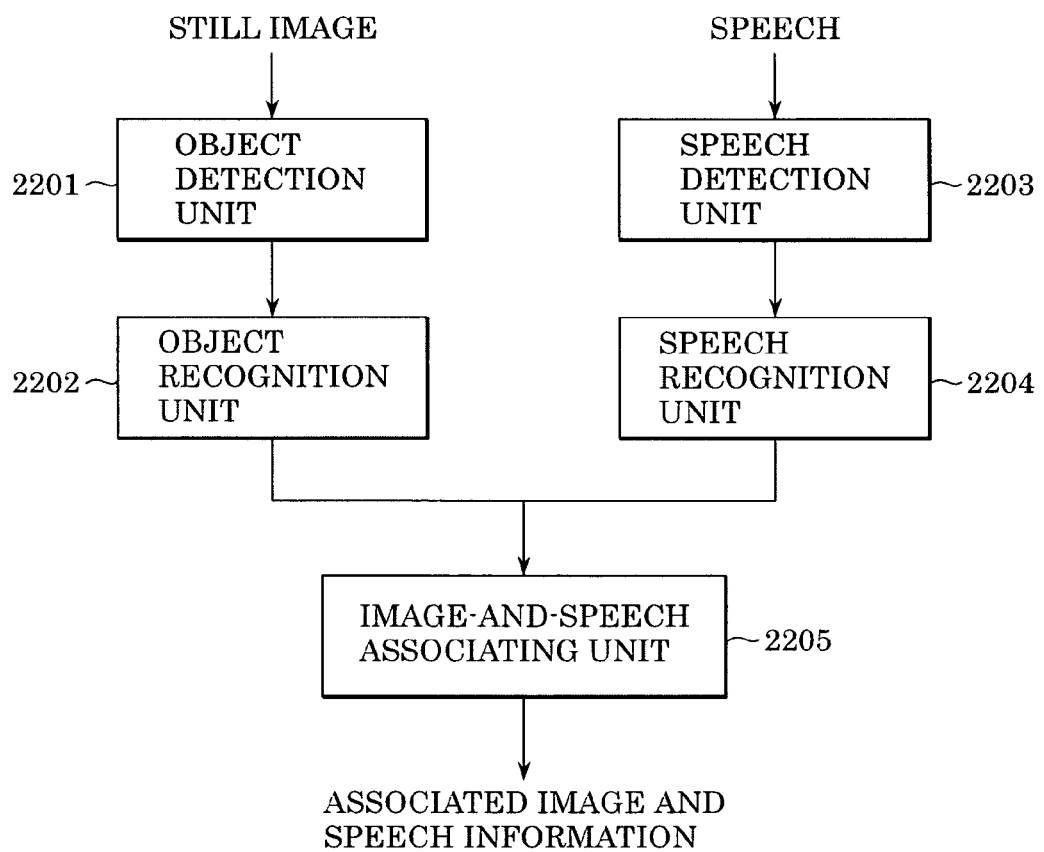
FIG. 54 is a block diagram showing the modular structure of a still image and speech processing apparatus having an object recognition function according to the fourteenth embodiment.

FIG. 54 is a block diagram showing the modular structure of a still image and speech processing apparatus having an object recognition function according to the fourteenth embodiment. A speech detection unit 2203 and a speech recognition unit 2204 are equivalent to the corresponding modules shown in FIG. 3, and a description of these modules is thus omitted. An object detection unit 2201 extracts an object region from a still image. An object recognition unit 2202 recognizes the object extracted by the object detection unit 2201. An object detection and recognition may be performed using a known technique.

In the fourteenth embodiment, objects, e.g., the shape of figures such as circle, triangle, rectangle, and square, the shape of graphs such as a bar graph, a line graph, and a circle graph, and typical colors of the figures and graphs, can be detected and recognized. For example, the object recognition information shown in FIG. 55A is obtained from the still image shown in FIG. 53A.

Figures 55A, 55B:
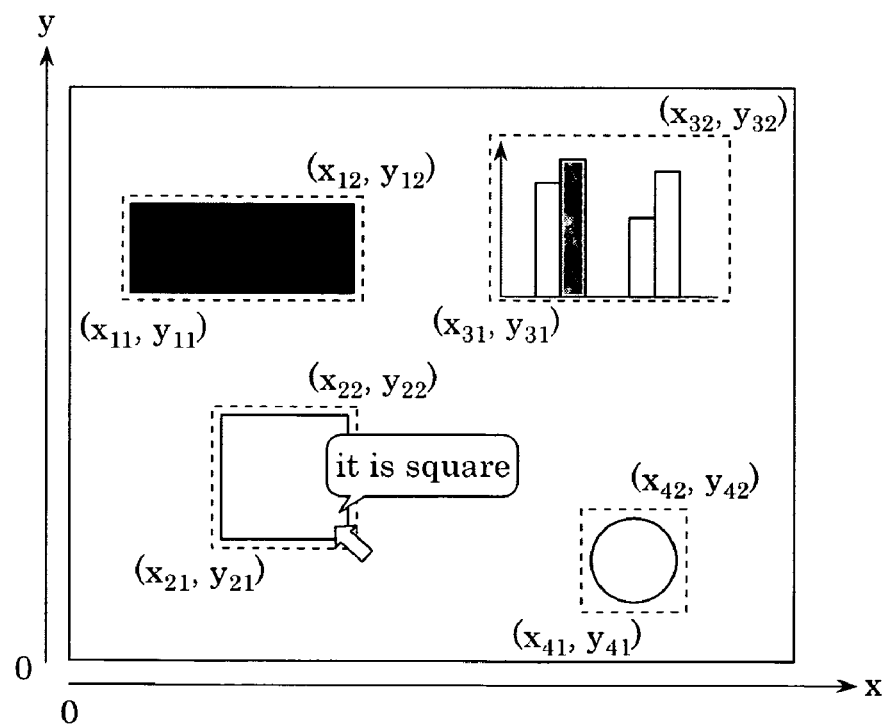
FIG. 55A is a table showing object recognition information.
FIG. 55B is an illustration of an image area obtained from the object recognition information shown in FIG. 55A.

FIG. 55B shows image areas obtained from the object recognition information shown in FIG. 55A. As shown in FIGS. 55A and 55B, words indicating the shape and color of objects, such as "rectangle", "black", "square", and "white", obtained as recognized objects are represented by character strings. An image-and-speech associating unit 2205 compares these character strings and speech recognition results to associate the still image with the speech. Thus, the objects of the still image are associated with speech in the manner shown in FIG. 55B.

According to the fourteenth embodiment, therefore, the object detection and recognition function allows a still image including no character string to be associated with speech.

Fifteenth Embodiment

In the embodiments described above, speech is recognized and the speech is associated with a still image. If the still image includes an image of a user who can be identified or whose class can be identified, and the speech is related to this user or user class, the still image and the speech can be associated by identifying a speaker or the class of the speaker without performing speech recognition.

Figure 56A:
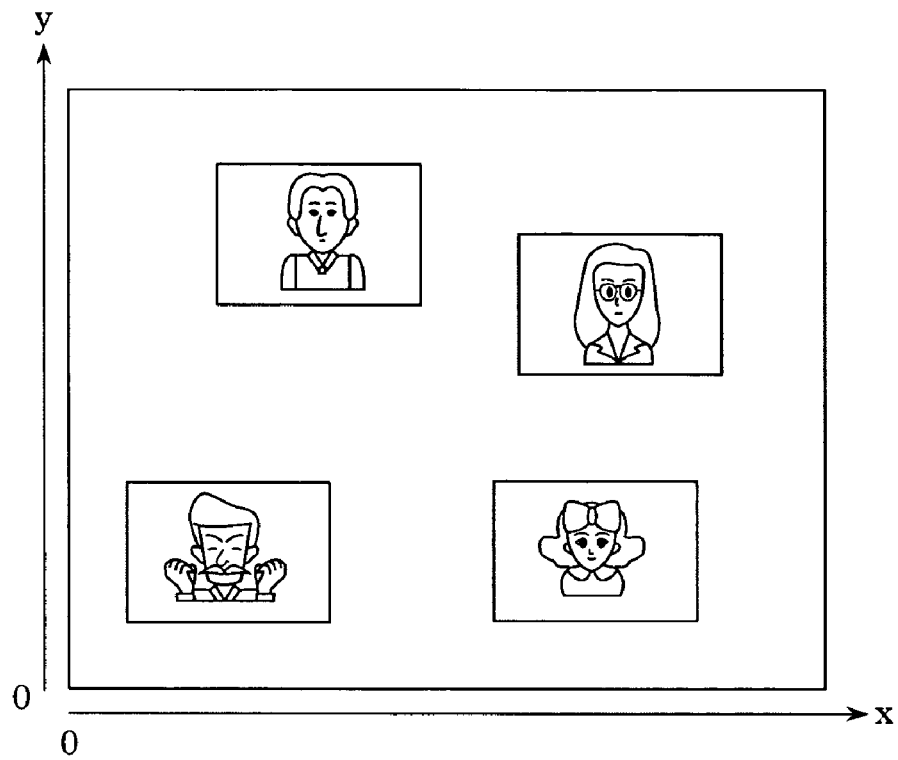
FIGS. 56A and 56B are illustrations of a still image and speech to be associated with the still image, respectively, according to a fifteenth embodiment of the present invention.
Figure 56B:
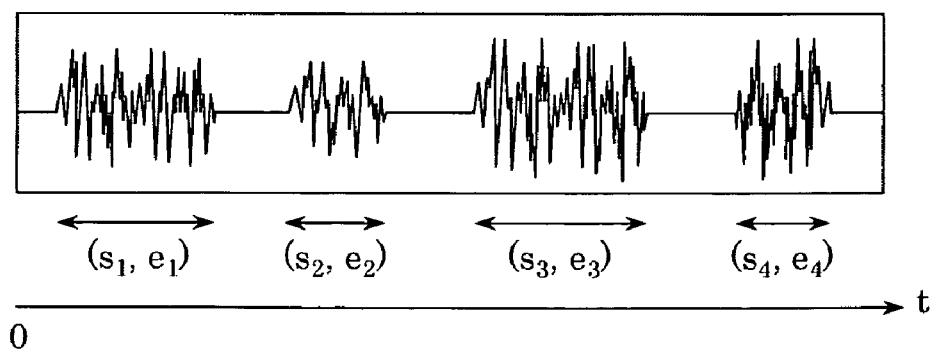

FIGS. 56A and 56B show a still image and speech to be associated with the still image, respectively, according to a fifteenth embodiment of the present invention. The still image shown in FIG. 56A does not include a character string. The speech shown in FIG. 56B includes "During the war . . ." given by an older adult male, "I will take an exam next year . . ." given by a young adult male, "Today's school lunch will be . . ." given by a female child, and "Tonight's drama will be . . ." given by a female adult.

Figure 57:
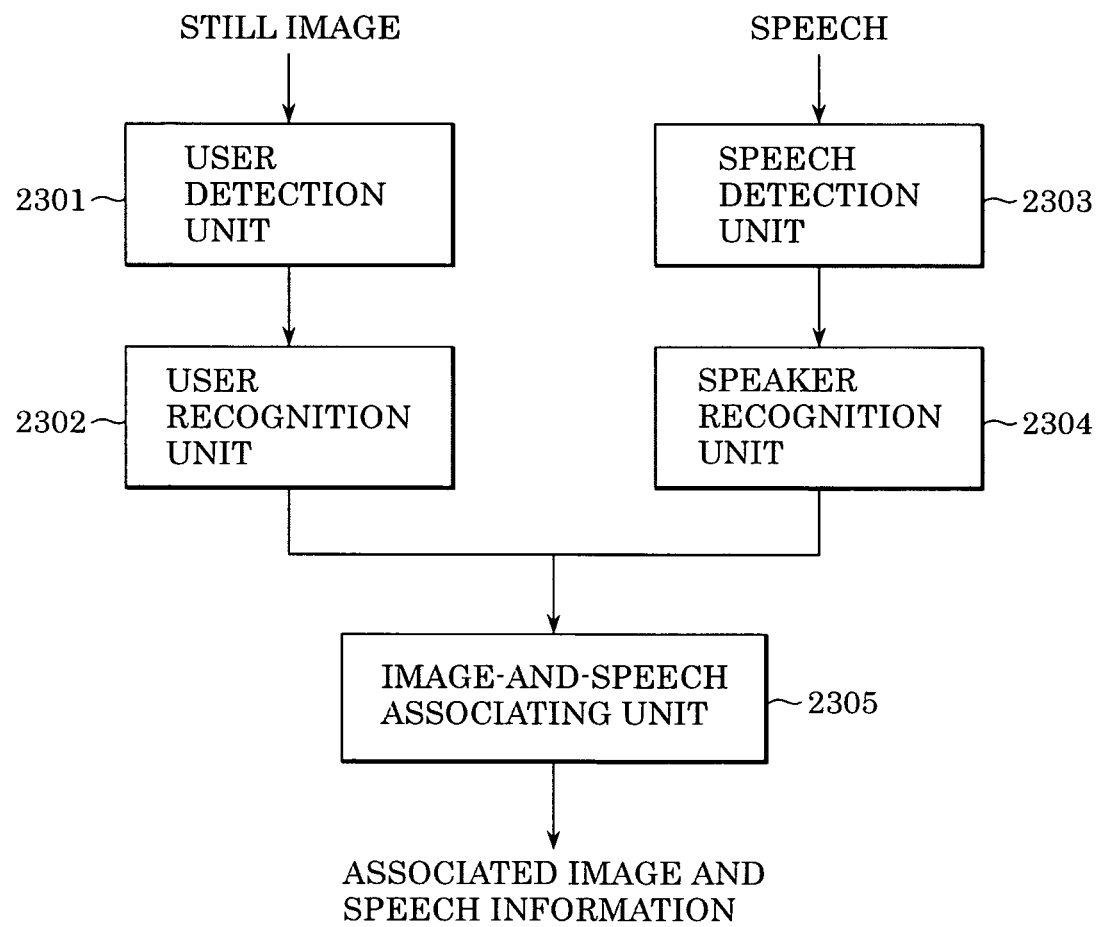
FIG. 57 is a block diagram showing the modular structure of a still image and speech recognition apparatus having user and speaker recognition functions according to the fifteenth embodiment.

FIG. 57 is a block diagram showing the modular structure of a still image and speech recognition apparatus having user and speaker recognition functions according to the fifteenth embodiment. A user detection unit 2301 detects a user image area from a still image. A user recognition unit 2302 recognizes a user or a user class in the image area detected by the user detection unit 2301. A speech detection unit 2303 detects a speech period. A speaker recognition unit 2304 recognizes a speaker or a speaker class in the speech period detected by the speech detection unit 2303.

Figure 40:
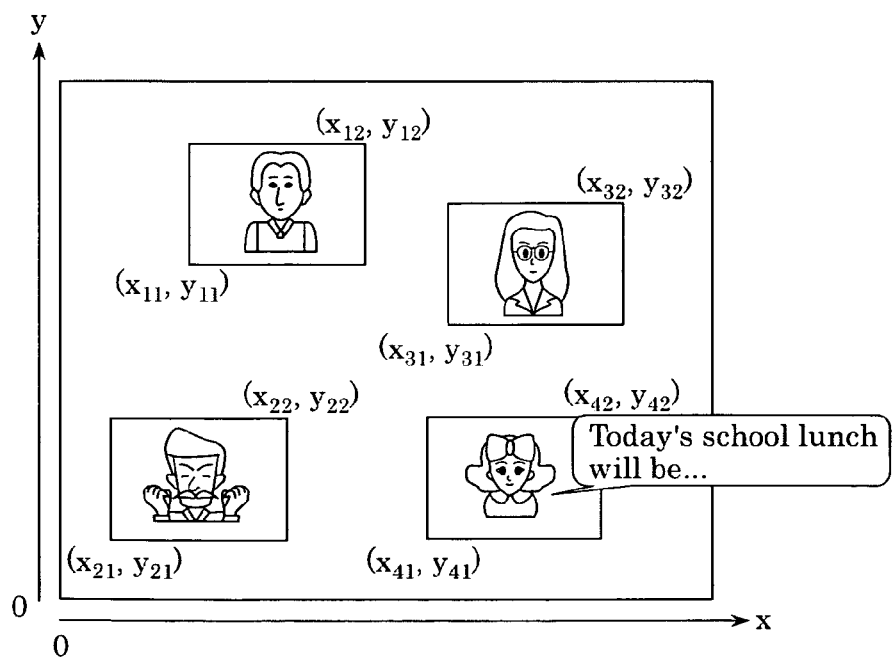
FIG. 40 is an illustration of an image area obtained from user recognition information.

For example, the user recognition unit 2302 recognizes user classes including gender, i.e., male or female, and age, e.g., child, adult, or older adult, and the speaker recognition unit 2304 also recognizes speaker classes including gender, i.e., male or female, and age, e.g., child, adult, or older adult. FIGS. 58A and 58B are tables showing user recognition information and speaker recognition information, respectively, according to the fifteenth embodiment. An image-and-speech associating unit 2305 performs matching between a user class and a speaker class, and associates the still image with speech in the manner shown in FIG. 40.

According to the fifteenth embodiment, therefore, the function of detecting and recognizing a user or a user class and the function of recognizing a speaker or a speaker class allow a still image including no character string to be associated with speech without performing speech recognition.

Sixteenth Embodiment

In the embodiments described above, one still image is associated with one speech portion. The present invention is not limited to this form, and any number of still images and speech portions, e.g., two still images and three speech portions, may be associated with each other.

In the first to fifteenth embodiments described above, a still image is associated with speech. In the present invention, a desired motion picture may be retrieved. In this case, the motion picture is divided into, for example, a plurality of categories, and the present invention is applied to a representative frame (still image) in each category.

Seventeenth Embodiment

While specific embodiments have been described, the present invention may be implemented by any other form, such as a system, an apparatus, a method, a program, or a storage medium. The present invention may be applied to a system constituted by a plurality of devices or an apparatus having one device.

The present invention may be achieved by directly or remotely supplying a program (in the illustrated embodiments, the program corresponding to the flowcharts) of software implementing the features of the above-described embodiments to a system or an apparatus and by reading and executing the supplied program code by a computer of the system or the apparatus.

In order to realize the features of the present invention on a computer, the program code installed in this computer also constitute the present invention. The present invention also embraces a computer program itself that implements the features of the present invention.

In this case, any form having a program function, such as an object code, a program executed by an interpreter, and script data to be supplied to an OS, may be embraced.

Recording media for supplying the program may be, for example, a floppy disk, a hard disk, an optical disk, a magneto-optical disk, a magneto-optical (MO), a CD-ROM, a compact disk-recordable (CD-R), a compact disk-rewriteable (CD-RW), a magnetic tape, a non-volatile memory card, a ROM, a DVD (including a DVD-ROM and a DVD-R), and so on.

The program may also be supplied by connecting to an Internet homepage using a browser of a client computer and downloading a computer program of the present invention, or a file having the compressed version of a computer program of the present invention and an auto installation function, to a recording medium, such as a hard disk, from the homepage. Alternatively, program code constituting the program of the present invention may be divided into a plurality of files, and these files may be downloaded from different homepages. Therefore, a WWW (World Wide Web) server that allows a program file for implementing the features of the present invention on a computer to be downloaded to a plurality of users is also embraced in the present invention.

Alternatively, a program of the present invention may be encoded and stored in a storage medium such as a CD-ROM, and the storage medium may be offered to a user. A user who satisfies predetermined conditions may be allowed to download key information for decoding the program via the Internet from a homepage, and may execute the encoded program using the key information, which is installed in a computer.

A computer may execute the read program, thereby implementing the features of the embodiments described above. Alternatively, an OS running on a computer may execute a portion of or the entirety of the actual processing according to commands of the program, thereby implementing the features of the embodiments described above.

A program read from a recording medium is written into a memory provided for function expansion board inserted into a computer or a function expansion unit connected to a computer, and then a portion of or the entirety of the actual processing is executed by a CPU provided for the function expansion board or the function expansion unit in accordance with commands of the program, thereby implementing the features of the embodiments described above.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-381637 filed Nov. 11, 2003, which is hereby incorporated by reference herein.

What is claimed is:

1. An information processing method for associating image data with speech data, the information processing method comprising:
   using a processor to perform steps comprising:
   detecting partial image data from the image data;
   detecting partial speech data from the speech data;
   obtaining first information from the partial image data;
   obtaining second information from the partial speech data;
   matching the first information to the second information;
   associating the first information with the second information that was matched to the first information;
   displaying the image data;
   specifying the second information in the speech data;
   selecting the first information associated with the second information specified; and
   emphasizing the partial image data including the first information on the image data displayed.

2. An information processing method for associating image data with speech data, the information processing method comprising:
   using a processor to perform steps comprising:
   detecting partial image data from the image data;
   detecting partial speech data from the speech data;
   obtaining first information from the partial image data;
   obtaining second information from the partial speech data;
   matching the first information to the second information;
   associating the first information with the second information that was matched to the first information;
   displaying the image data;
   specifying the first information of the image data displayed;
   selecting the second information associated with the first information specified; and
   outputting speech of the partial speech data including the selected second information.

3. An information processing method for associating image data with speech data, the information processing method comprising:
   using a processor to perform steps comprising:
   detecting partial image data from the image data;
   detecting partial speech data from the speech data;
   obtaining first information from the partial image data;
   obtaining second information from the partial speech data;
   matching the first information to the second information; and
   associating the first information with the second information that was matched to the first information;
   wherein the image data includes text,
   detecting partial image data from the image data comprises detecting a text region from the image data as the partial image data,
   obtaining first information from the partial image data comprises obtaining text information included in the text region detected as the first information,
   obtaining second information from the partial speech data comprises obtaining speech information as the second information,
   matching the first information to the second information comprises matching the text information to the speech information,
   and associating the first information with the second information comprises associating the text information with the speech information.

4. The method according to claim 3, further comprising converting the text information into a phonetic string,
   wherein matching the text information to the speech information comprises matching the phonetic string converted from the text information to a phonetic string of the speech information.

5. The method according to claim 3, further comprising converting the speech information into a character string,
   wherein matching the text information to the speech information comprises matching a character string of the text information to the character string converted from the speech information.

6. The method according to claim 3, further comprising:
   converting the text information into a phonetic string; and
   converting the speech information into a character string, wherein matching the text information to the speech information comprises matching the phonetic string converted from the text information to a phonetic string of the speech information and matching a character string of the text information to the character string converted from the speech information.

7. The method according to claim 3, wherein obtaining text information included in the text region detected as the first information comprises obtaining a plurality of text information candidates from the text region and levels of the text information candidates,
obtaining speech information as the second information comprises obtaining a plurality of speech information candidates from the partial speech data and levels of the speech information candidates,
the method further comprises calculating a degree of relation between the text information candidates and the speech information candidates based on the levels of the text information candidates and the levels of the speech information candidates, and
associating the text information with the speech information comprises associating the text information candidates with the speech information candidates based on the degree of relation.

8. The method according to claim 7, wherein the levels of the text information candidates and the levels of the speech information candidates comprise recognition probability or recognition likelihood of the candidates.

9. The method according to claim 7, wherein calculating the degree of relation between the text information candidates ad the speech information candidates comprises calculating the degree of relation between the text information candidates and the speech information candidates by weighting the text information candidates or the speech information candidates.

10. The method according to claim 3, wherein obtaining speech information comprises obtaining the speech information using the text information obtained.

11. The method according to claim 10, wherein obtaining speech information further comprises converting the speech information obtained into a character string, and removing speech information that does not include a character string of the text information obtained.

12. The method according to claim 10, wherein obtaining speech information comprises obtaining the speech information from the partial speech data using a phonetic string into which the text information obtained is converted.

13. The method according to claim 3, further comprising extracting an important word included in the text information,
wherein obtaining speech information comprises obtaining speech information from the partial speech data using the important word.

14. The method according to claim 3, further comprising extracting font information of the text information obtained,
wherein obtaining speech information comprises obtaining speech information from the partial speech data using the extracted font information.

15. The method according to claim 3, wherein obtaining text information comprises obtaining text information using the speech information obtained.

16. The method according to claim 15, wherein obtaining text information comprises obtaining text information from the text region using a character string into which the speech information obtained is converted.

17. The method according to claim 3, further comprising dividing the image data into a plurality of image areas,
wherein the text information and the speech information are recognized for each of the image areas.

18. The method according to claim 17, wherein dividing the image data into a plurality of image areas comprises dividing the image data into the plurality of image areas based on information about the partial speech data of the speech data or recognized speech.

19. The method according to claim 17, further comprising further dividing the image areas into sub-areas in at least one layer,
wherein the image data is expressed by a tree structure in which the divided image areas and sub-areas in the at least one layer are nodes.

20. The method according to claim 17, further comprising dividing the speech data into a plurality of partial speech data using at least one of the divided image areas of the image data, the text region, and the recognized text information,
wherein detecting partial speech data comprises detecting the partial speech data from the partial speech data.

21. The method according to claim 3, further comprising:
converting the text information obtained into a text concept expression;
converting the speech information obtained into a speech concept expression; and
matching the text concept expression to the speech concept expression,
wherein associating the text information with the speech information comprises associating the text concept expression with the speech concept expression.

22. An information processing apparatus that associates image data with speech data, the information processing apparatus comprising:
first detecting means for detecting partial image data from the image data;
second detecting means for detecting partial speech data from the speech data;
first obtaining means for obtaining first information from the partial image data;
second obtaining means for obtaining second information from the partial speech data; and
associating means for matching the first information obtained by the first obtaining means to the second information obtained by the second obtaining means, and associating the first information with the second information that was matched to the first information,
wherein the image data includes text,
detecting partial image data from the image data by the first detecting means comprises detecting a text region from the image data as the partial image data,
obtaining first information from the partial image data by the first obtaining means comprises obtaining text information included in the text region detected as the first information,
obtaining second information from the partial speech data by the second obtaining means comprises obtaining speech information as the second information,
matching the first information to the second information by the associating means comprises matching the text information to the speech information,
and associating the first information with the second information by the associating means comprises associating the text information with the speech information.

23. A computer-readable medium having stored thereon a program for causing a computer that associates image data with speech data to execute computer executable instructions for:
detecting partial image data from the image data;
detecting partial speech data from the speech data;
obtaining first information from the partial image data;

obtaining second information from the partial speech data;

matching the first information obtained to the second information obtained; and associating the first information with the second information that was matched to the first information, wherein the image data includes text, detecting partial image data from the image data comprises detecting a text region from the image data as the partial image data, obtaining first information from the partial image data comprises obtaining text information included in the text region detected as the first information, obtaining second information from the partial speech data comprises obtaining speech information as the second information, matching the first information to the second information comprises matching the text information to the speech information, and associating the first information with the second information comprises associating the text information with the speech information.

* * * * *